US012746692B2

(12) United States Patent
Hirai et al.

(10) Patent No.: US 12,746,692 B2
(45) Date of Patent: Sep. 29, 2026

(54) INFORMATION PROCESSING SYSTEM, INFORMATION PROCESSING METHOD, AND PROGRAM

(71) Applicant: Sony Group Corporation, Tokyo (JP)

(72) Inventors: Takayoshi Hirai, Tokyo (JP); Noboru Shibuya, Tokyo (JP); Naoyuki Hirota, Tokyo (JP); Soichi Fukasawa, Tokyo (JP); Taro Azuma, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 70 days.

(21) Appl. No.: 18/693,709

(22) PCT Filed: Mar. 23, 2022

(86) PCT No.: PCT/JP2022/013359
§ 371 (c)(1),
(2) Date: Mar. 20, 2024

(87) PCT Pub. No.: WO2023/053520
PCT Pub. Date: Apr. 6, 2023

(65) Prior Publication Data

US 2024/0391112 A1 Nov. 28, 2024

(30) Foreign Application Priority Data

Sep. 30, 2021 (JP) ................................ 2021-161513

(51) Int. Cl.
*B25J 13/06* (2006.01)
*B25J 9/16* (2006.01)
(Continued)

(52) U.S. Cl.
CPC ............ *B25J 13/06* (2013.01); *B25J 9/1689* (2013.01); *B25J 13/006* (2013.01); *G06Q 10/063112* (2013.01)

(58) Field of Classification Search
CPC ........ B25J 13/06; B25J 9/1689; B25J 13/006; G06Q 10/063112; G06Q 50/10
(Continued)

(56) References Cited

U.S. PATENT DOCUMENTS

| | | | | |
|---|---|---|---|---|
| 9,457,468 | B1 * | 10/2016 | Elazary | B25J 9/161 |
| 10,832,583 | B2 * | 11/2020 | Bouillet | G09B 5/12 |

(Continued)

FOREIGN PATENT DOCUMENTS

| | | |
|---|---|---|
| JP | 2019-032589 A | 2/2019 |
| JP | 2020-042764 A | 3/2020 |

(Continued)

OTHER PUBLICATIONS

International Search Report and Written Opinion mailed on Jun. 28, 2022, received for PCT Application PCT/JP2022/013359, filed on Mar. 23, 2022, 9 pages including English Translation.

*Primary Examiner* — Kira Nguyen
(74) *Attorney, Agent, or Firm* — XSENSUS LLP

(57) ABSTRACT

The present technology relates to an information processing system, an information processing method, and a program for enabling appropriate matching between a robot and an operator who performs remote operation.
The information processing system is an information processing system for executing matching related to remote operation by a robot that can be remotely operated and an operation terminal that can operate the robot via a network. The information processing system includes: a matching unit configured to select the operator who performs remote operation of the robot, on the basis of a selection condition including an operation environment necessary for remotely operating the robot to execute work and on the basis of an operation environment of the operator each. The present
(Continued)

technology can be applied to, for example, a server that intermediates remote operation between an operation terminal and a robot.

18 Claims, 40 Drawing Sheets

(51) Int. Cl.
*B25J 13/00* (2006.01)
*G06Q 10/0631* (2023.01)

(58) Field of Classification Search
USPC .......................................................... 700/264
See application file for complete search history.

(56) References Cited

U.S. PATENT DOCUMENTS

| | | | | |
|---|---|---|---|---|
| 12,508,715 | B1 * | 12/2025 | Abrams | B25J 11/0005 |
| 2019/0050786 | A1 * | 2/2019 | Muser | G06Q 10/063116 |
| 2021/0023711 | A1 * | 1/2021 | Lee | B25J 9/163 |
| 2021/0072759 | A1 * | 3/2021 | Baek | G05D 1/0214 |
| 2021/0323168 | A1 * | 10/2021 | Hashimoto | B25J 9/0084 |
| 2022/0331967 | A1 * | 10/2022 | Kimura | B25J 9/1689 |

FOREIGN PATENT DOCUMENTS

| | | | |
|---|---|---|---|
| WO | 2008/140011 | A1 | 11/2008 |
| WO | 2020/032211 | A1 | 2/2020 |
| WO | 2020/032264 | A1 | 2/2020 |
| WO | 2021/019787 | A1 | 2/2021 |

* cited by examiner

FIG. 5

| WORK CONTENT | COMMUNICATION AMOUNT | COMMUNICATION SPEED | Ping VALUE | ALLOWABLE DELAY | OPERATION TERMINAL | DISPLAY |
|---|---|---|---|---|---|---|
| SUSHI ROBOT CONTROL | 1GB | 100MB/s | 500 | 500msec | GAME MACHINE X | FHD |
| PICKUP ROBOT CONTROL | 1GB | 100MB/s | 400 | 500msec | GAME MACHINE X | FHD |
| PET ROBOT CONTROL | 0.5GB | 500MB/s | 3000 | 1000msec | SMARTPHONE | FHD |
| SURGICAL ROBOT CONTROL | 100GB | 10MB/s | 20 | 50msec | DEDICATED TERMINAL Y | 4K |
| VEHICLE CONTROL | 5GB | 10MB/s | 50 | 100msec | SMARTPHONE | FHD |
| DRONE CONTROL | 1GB | 10MB/s | 50 | 100msec | SMARTPHONE | FHD |
| WORK ROBOT CONTROL | 100GB | 20MB/s | 20 | 100msec | GAME MACHINE X | 4K |

FIG. 8

| OPERATOR ID | ABILITY INFORMATION | | | OPERATION ENVIRONMENT INFORMATION | | |
|---|---|---|---|---|---|---|
| | QUALIFICATION A | QUALIFICATION B | ・・・ | OPERATION TERMINAL A | OPERATION TERMINAL B | ・・・ |
| 000001 | POSSESSED | POSSESSED | ・・・ | POSSESSED | NONE | ・・・ |
| 000002 | NONE | POSSESSED | ・・・ | POSSESSED | NONE | ・・・ |
| 000003 | NONE | NONE | ・・・ | POSSESSED | POSSESSED | ・・・ |
| 000004 | POSSESSED | NONE | ・・・ | NONE | POSSESSED | ・・・ |
| 000005 | NONE | NONE | ・・・ | POSSESSED | NONE | ・・・ |

FIG. 37

| SKILL CODE | CLINICAL DEPARTMENT | PROCEDURE | SKILL |
|---|---|---|---|
| 001 | UROLOGY DEPARTMENT | TOTAL PROSTATECTOMY | hand-eye coordination<br>BY REMOTE OPERATION FROM CONSOLE |
| 002 | . . . | . . . | . . . |

FIG. 38

| SKILL CODE | PRESENCE OR ABSENCE OF SKILL | SKILL LEVEL |
|---|---|---|
| 001 | PRESENT | A |
| 002 | ABSENT | D |
| ... | ... | ... |

FIG. 39

| SKILL CODE | PROCESS | SKILL |
|---|---|---|
| 001 | VEHICLE BODY COATING | UNIFORM COATING |
| 002 | . . . | . . . |

FIG. 40

| SKILL CODE | VEHICLE RANK CODE | SKILL |
|---|---|---|
| 001 | 001 | ENSURING OF SAFETY |
| 002 | 001 | WORK A |
| ... | ... | ... |

FIG. 41

| OPERATOR CODE | SKILL LEVEL | | | REWARD RANK |
|---|---|---|---|---|
| | VEHICLE RANK 001 | VEHICLE RANK 002 | . . . | |
| 001 | A | D | . . . | B |
| 002 | B | A | . . . | A |
| . . . | . . . | . . . | . . . | . . . |

FIG. 42

| | WORK A | WORK B | WORK C |
|---|---|---|---|
| 09:00—12:00 | ○ | | |
| 13:00—15:00 | | ○ | |
| 16:00—19:00 | | | ○ |

INFORMATION PROCESSING SYSTEM, INFORMATION PROCESSING METHOD, AND PROGRAM

CROSS-REFERENCE TO RELATED APPLICATIONS

This application is a national stage of International Patent Application No. PCT/JP2022/013359, filed Mar. 23, 2022, which claims priority from Japanese Patent Application No. 2021-161513, filed Sep. 30, 2021, the entire contents of each are incorporated herein by reference.

TECHNICAL FIELD

The present technology relates to an information processing system, an information processing method, and a program, and particularly relates to an information processing system, an information processing method, and a program suitable for use in a case of remotely operating a robot.

BACKGROUND ART

There is known a technique of connecting an operation terminal used by an operator at a remote location and a robot at a site and controlling the robot by the operator in a remote environment.

Furthermore, in order to effectively utilize a robot that can be remotely operated, a matching system between an operator and a robot has been proposed (see, for example, Patent Document 1).

CITATION LIST

Patent Document

Patent Document 1: International Publication No. 2020/032264

SUMMARY OF THE INVENTION

Problems to be Solved by the Invention

On the other hand, an operator or a requester who requests work desires appropriate matching between the operator and the robot.

The present technology has been made in view of such a situation, and an object thereof is to appropriately perform matching between a robot and an operator who performs remote operation.

Solutions to Problems

An information processing system according to one aspect of the present technology is an information processing system for executing matching related to remote operation by a robot that can be remotely operated and an operation terminal that can operate the robot via a network, the information processing system including: a matching unit configured to select the operator who performs remote operation of the robot, on the basis of a selection condition including an operation environment necessary for remotely operating the robot to execute work and on the basis of an operation environment of the operator each.

An information processing method according to one aspect of the present technology includes, by an information processing system for executing matching related to remote operation by a robot that can be remotely operated and an operation terminal that can operate the robot via a network: selecting the operator who performs remote operation of the robot, on the basis of a selection condition including an operation environment necessary for remotely operating the robot to execute work and on the basis of an operation environment of the operator each.

A program according to one aspect of the present technology is a program for causing a computer to execute processing, the computer being configured to execute matching related to remote operation by a robot that can be remotely operated and an operation terminal that can operate the robot via a network, the processing including: selecting the operator who performs remote operation of the robot, on the basis of a selection condition including an operation environment necessary for remotely operating the robot to execute work and on the basis of an operation environment of the operator each.

BRIEF DESCRIPTION OF DRAWINGS

FIG. 5 is a table illustrating a configuration example of a work condition DB.

FIG. 8 is a table illustrating a configuration example of an operator DB.

FIG. 37 is a view illustrating a configuration example of a skill table for remote operation of a surgical robot.

FIG. 38 is a view illustrating a configuration example of a possessed-skill table.

FIG. 39 is a view illustrating a configuration example of a skill table in a case where remote operation of an industrial robot is performed.

FIG. 40 is a view illustrating a configuration example of a possessed-skill table for remote operation of a vehicle.

FIG. 41 is a view illustrating a configuration example of a reward table.

FIG. 42 is a view for explaining a modification of the matching processing.

MODE FOR CARRYING OUT THE INVENTION

Hereinafter, modes for carrying out the present technology will be described. The description will be given in the following order.

1. Example of vision desired to be achieved
2. First Embodiment
3. Second Embodiment
4. Third Embodiment
5. Application example
6. Modification
7. Others

1. Example of Vision Desired to be Achieved

A decrease in a production labor population is a common social problem, and a decrease in a labor population, a shortage of workers, separation of people from dangerous work, and the like are serious situations in some regions. In particular, it is very difficult for essential workers and skilled workers accompanying actual work on site to work remotely. Therefore, securing of workers and improvement of productivity by a new work style have been issues. On the other hand, for example, utilizing robot operation by remote operation can be mentioned as a solution.

Figure 1:
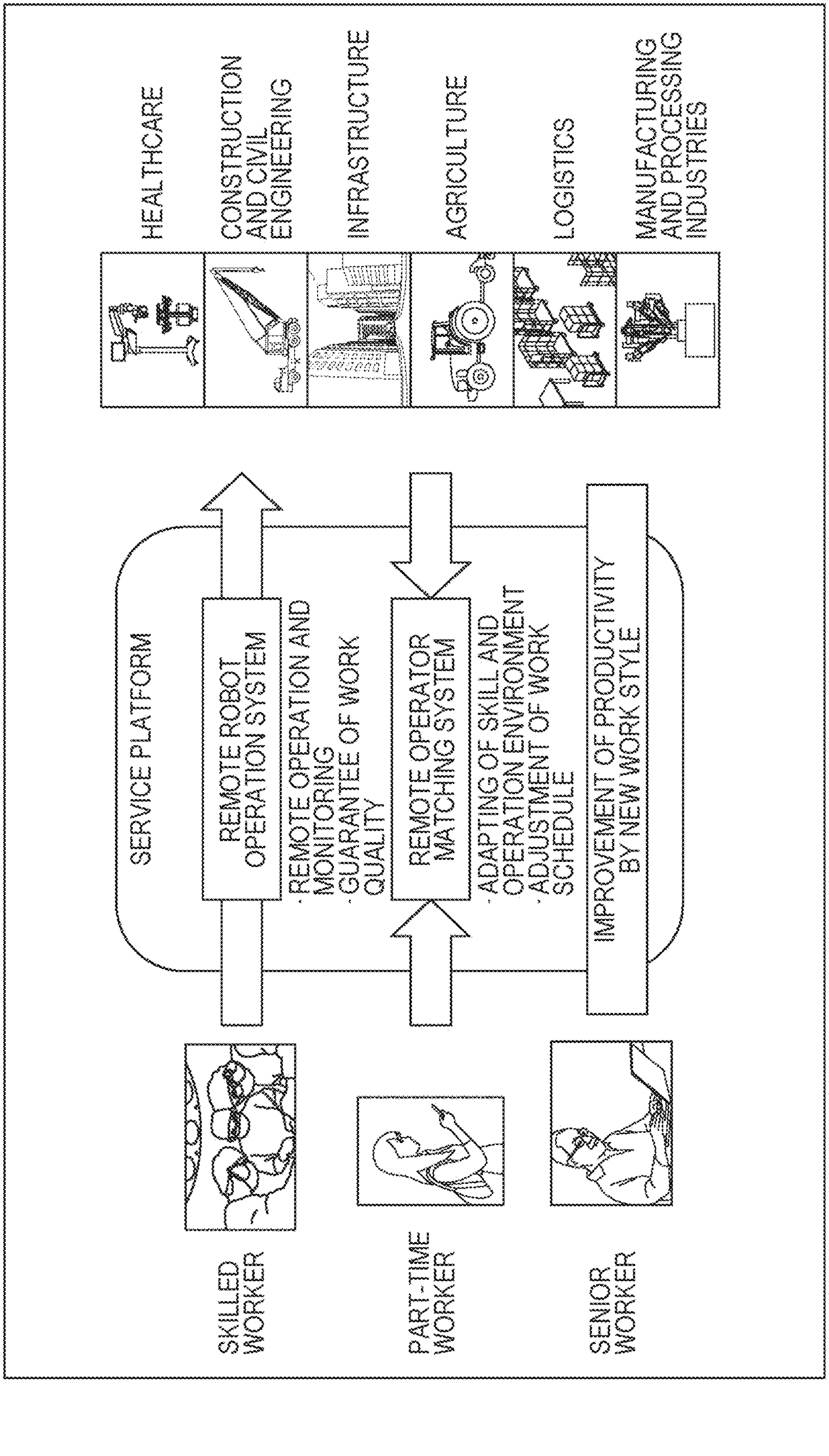
FIG. 1 is a diagram illustrating an example of vision aimed by applying the present technology.

FIG. 1 illustrates an example of vision aimed by applying the present technology. Specifically, FIG. 1 illustrates an embodiment of a service platform connecting a requester (business operator) and an operator (remote worker) of remote operation. The service platform includes a remote robot operation system and a remote operation matching system.

The remote robot operation system is a system that enables remote operation, remote monitoring, device management, and the like of each robot, and enables guarantee of work quality.

The remote operation matching system is a system that performs matching between an operator (remote worker) and a requester (business operator) by adapting a skill, an operation environment, a schedule, and the like. For example, the remote operation matching system performs matching of an operator consistent with a work request by the requester, user management for managing a work content and a skill and an operation environment of the operator, and performs work evaluation for evaluating work of the operator. For example, the remote operation matching system schedules an operator so that the operator can effectively use free time.

The operator is a worker who performs remote operation of the robot. For example, examples of the operator include: a skilled worker having high skills, such as a skilled mechanic and a specialist; a part-time worker who provides labor by using free time; and a senior worker who is physically limited by age and disease but can provide labor. These operators perform various types of work by remotely operating robots in individual fields of healthcare, construction and civil engineering, infrastructure, agriculture, logistics, and manufacturing and processing industries, for example, via the service platform.

This service platform embodies "3R technology" that remotely implements reality/real-time technology, and achieves a new work style. For example, by providing a new work style, securing of workers and improvement of productivity are achieved, and a new remote society is achieved in which all people who want to work can work. In this way, this service platform contributes to solving social problems due to the decrease in the production labor population.

2. First Embodiment

Next, with reference to FIGS. 2 to 34, a first embodiment of the present technology will be described.

Configuration Example of Information Processing System 1

First, with reference to FIGS. 2 to 5, a configuration example of an information processing system 1 to which the present technology is applied will be described.

Figure 2:
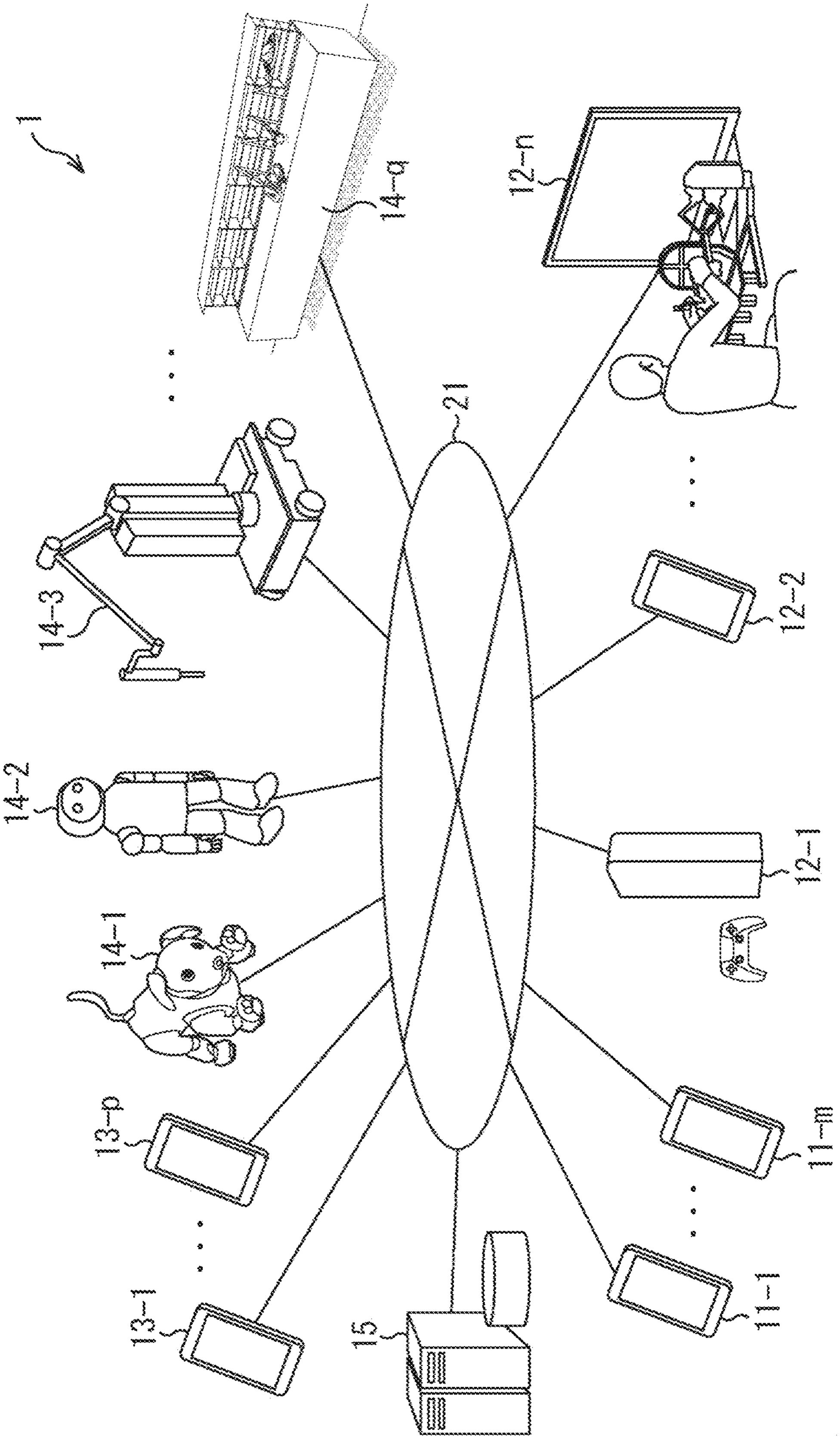
FIG. 2 is a schematic diagram of a first embodiment of an information processing system to which the present technology is applied.

FIG. 2 is a schematic diagram of the information processing system 1 according to the first embodiment of the present technology.

The information processing system 1 includes a communication terminal 11-1 to a communication terminal 11-*p*, an operation terminal 12-1 to an operation terminal 12-*q*, a requester terminal 13-1 to a requester terminal 13-*m*, a robot 14-1 to a robot 14-*n*, and a management server 15.

Note that, hereinafter, the communication terminal 11-1 to the communication terminal 11-*p* will be simply referred to as a communication terminal 11 in a case where it is not necessary to individually distinguish from each other. Hereinafter, the operation terminal 12-1 to the operation terminal 12-*q* will be simply referred to as an operation terminal 12 in a case where it is not necessary to individually distinguish from each other. Hereinafter, the requester terminal 13-1 to the requester terminal 13-*m* will be simply referred to as a requester terminal 13 in a case where it is not necessary to individually distinguish from each other. Hereinafter, the robot 14-1 to the robot 14-*n* are simply referred to as a robot 14 in a case where it is not necessary to individually distinguish from each other.

The communication terminal 11-1 to the communication terminal 11-*p*, the operation terminal 12-1 to the operation terminal 12-*q*, the requester terminal 13-1 to the requester terminal 13-*m*, the robot 14-1 to the robot 14-*n*, and the management server 15 are connected via a network 21, and can communicate with each other.

Note that each operation terminal 12 and each robot 14 may be connected to the network 21 via an intermediate device. The intermediate device is, for example, an IP converter having a communication function.

The information processing system 1 is a system that implements the above-described service platform. The information processing system 1 performs matching between the operation terminal 12 that performs remote operation and the robot 14 as a remote operation target, via the management server 15. That is, the information processing system 1 implements the remote operation matching system described above. Note that the matching between the operation terminal 12 and the robot 14 includes not only matching between terminals but also matching between an operator who performs the remote operation and a requester who requests the robot 14 or work using the robot 14. Furthermore, the information processing system 1 implements remote control of each robot 14 by each operation terminal 12 via the management server 15. That is, the information processing system 1 implements the remote robot operation system described above.

Note that, in the present embodiment, the information processing system 1 implements matching and remote control of the robot 14 by the operation terminal 12, but the system that performs matching and the system that performs remote control may be separate bodies.

The communication terminal 11 is an information processing device used by an operator to undertake work or the like. The communication terminal 11 is, for example, a smartphone, a personal computer (PC), a tablet terminal, or the like.

The operation terminal 12 is an information processing device capable of remotely operating the robot 14. Here, an example is illustrated in which the operation terminal 12 is a game device (operation terminal 12-1) such as the play station 5 (registered trademark), a smartphone (operation terminal 12-2), or a surgical robot console (operation terminal 12-*q*). In addition, the operation terminal 12 may be, for example, a PC, a tablet terminal, a dedicated terminal, or the like.

Note that one operator may own a plurality of communication terminals 11 or may own a plurality of operation terminals 12. Furthermore, a plurality of operators may share the communication terminal 11 and the operation terminal 12. Moreover, the operation terminal 12 is not necessarily owned by the operator. For example, a case is also assumed in which the operator borrows the operation terminal 12 or a related person associated with the operator owns the operation terminal 12.

Furthermore, for example, the operator can also undertake work or the like by using the operation terminal 12 without using the communication terminal 11. That is, the communication terminal 11 and the operation terminal 12 may be one terminal.

The requester terminal 13 is an information processing terminal used by the requester to request work or the like. The requester terminal 13 is, for example, a smartphone, a PC, a tablet terminal, or the like.

The robot 14 is a robot including at least one or more movable units and capable of being remotely controlled. That is, the robot 14 is a robot whose movable unit can be operated by remote operation.

The robot 14 is, for example, an entertainment robot (robot 14-1), a general-purpose robot (robot 14-2), a surgical robot (robot 14-3), or a picking robot (cooking robot, robot 14-*q*). In addition, the robot 14 may be, for example, a rescue robot, a cleaning robot, a wall surface work robot, a security robot, a guidance robot, a wheelchair robot, a sushi robot, a care robot, a medical robot, or the like. Furthermore, the robot 14 may be, for example, a movable body that can be remotely operated, such as a vehicle or a drone.

Note that the robot 14 is not necessarily required to execute all operations by remote operation. For example, the robot 14 may be a semi-autonomous robot that autonomously operates on the basis of an input by the operator. Specifically, for example, the robot 14 may be a semi-autonomous operable robot that autonomously performs picking work of an object designated by the operator.

Note that one requester may own a plurality of requester terminals 13 or may own a plurality of robots 14. Furthermore, a plurality of requesters may share the requester terminal 13 and the robot 14. Moreover, the robot 14 is not necessarily owned by the requester. For example, a case is also assumed in which the requester borrows the robot 14 or a related person associated with the requester owns the robot 14.

Furthermore, for example, the requester can request work or the like by using the robot 14 without using the requester terminal 13.

Note that the requester is not necessarily a natural person, and may be an organization such as a corporation.

The management server 15 is implemented, for example, by one computer or cooperation of a plurality of computers. The management server 15 executes matching processing between the operator or the operation terminal 12 and the requester or the robot 14, intermediation processing of remote operation between the operation terminal 12 and the robot 14, and the like. For example, the matching processing, the remote operation intermediation processing, and the like are implemented by execution of a predetermined application in a cloud service such as Amazon Web Services (AWS, registered trademark) or Azure (registered trademark).

The network 21 is a data-communicable network. For example, the network 21 includes the Internet, a local area network (LAN), a wide area network (WAN), and the like.

Figure 3:
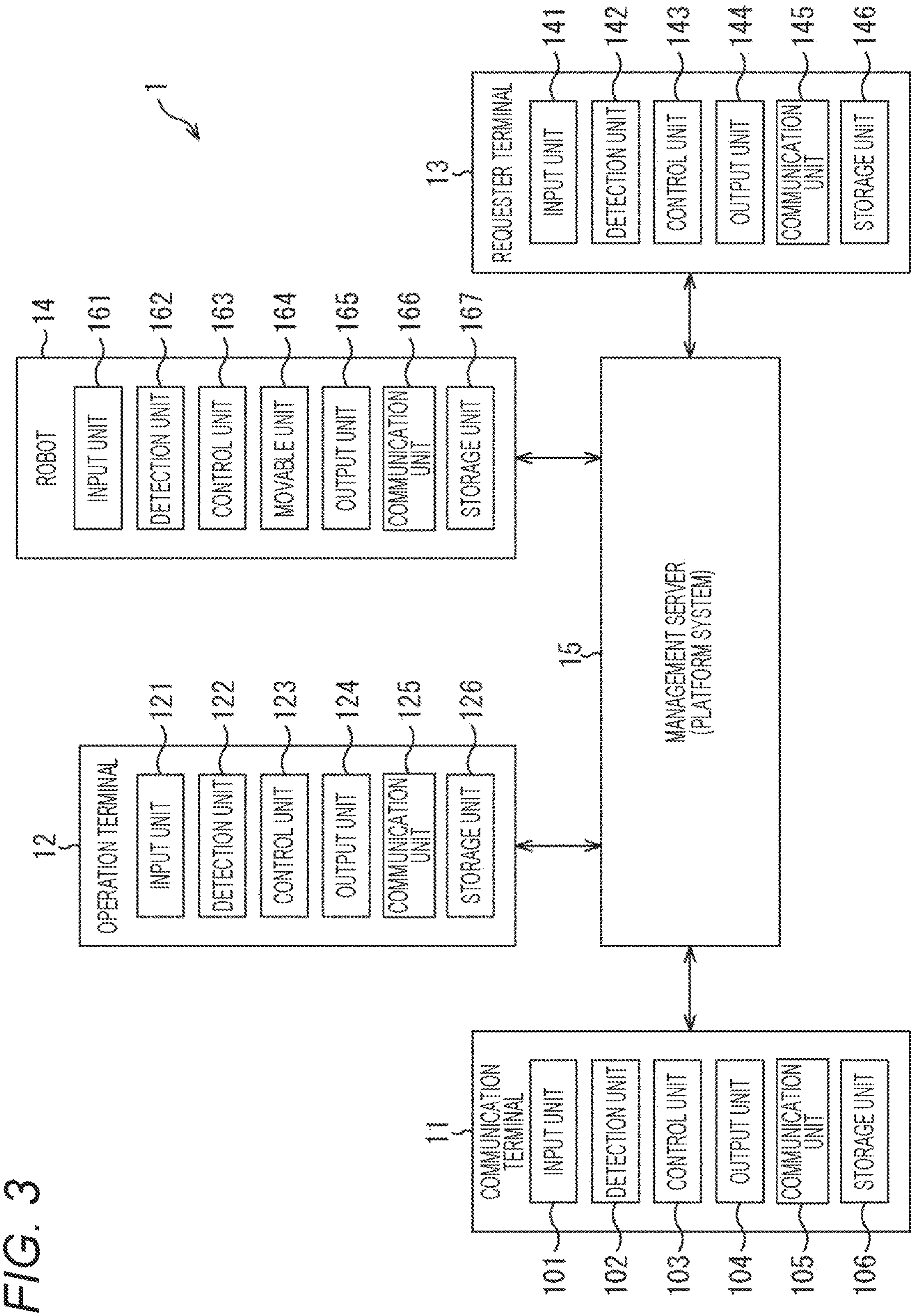
FIG. 3 is a block diagram illustrating a configuration example of functions of the first embodiment of the information processing system to which the present technology is applied.

FIG. 3 illustrates a configuration example of functions of the communication terminal 11, the operation terminal 12, the requester terminal 13, and the robot 14 of the information processing system 1. Note that, for easy understanding of the figure, FIG. 3 illustrates only one communication terminal 11, one operation terminal 12, one requester terminal 13, and one robot 14, and the network 21 is not illustrated.

The communication terminal 11 includes an input unit 101, a detection unit 102, a control unit 103, an output unit 104, a communication unit 105, and a storage unit 106.

The input unit 101 includes, for example, various input devices and operation devices. The input unit 101 is used, for example, for operation of the communication terminal 11, and for input of commands, data, and the like to the communication terminal 11.

The detection unit 102 includes various sensors, for example, detects a user (for example, the operator), a surrounding situation, and the like, and outputs sensor data indicating a detected result. For example, the detection unit 102 includes a camera for capturing an image of the user (a still image, a moving image). For example, the detection unit 102 includes sensors for detecting a position and a movement of the communication terminal 11, such as, for example, a global navigation satellite system (GNSS) receiver, an acceleration sensor, an angular velocity sensor, and the like. For example, the detection unit 102 includes a sensor that detects biometric information (for example, fingerprint, iris, voice, and the like) used for authentication of the user and biometric information (for example, a perspiration amount, a heart rate, a blood pressure, and the like) indicating a state of the user.

The control unit 103 includes a processor such as a central processing unit (CPU), for example. The control unit 103 executes control of the communication terminal 11, various types of information processing, and the like.

The output unit 104 includes, for example, various output devices (for example, a display device, a speaker, a haptics device, or the like). The output unit 104 outputs, for example, various types of information (for example, visual information, auditory information, tactile information, and the like).

The communication unit 105 includes, for example, various communication devices. The communication unit 105 communicates with another communication terminal 11, the operation terminal 12, the requester terminal 13, the robot 14, the management server 15, and the like via the network 21 or without via the network 21.

The storage unit 106 includes, for example, a nonvolatile memory, a volatile memory, and the like, and stores a program and data necessary for processing of the communication terminal 11.

The operation terminal 12 includes an input unit 121, a detection unit 122, a control unit 123, an output unit 124, a communication unit 125, and a storage unit 126.

The detection unit 122, the output unit 124, the communication unit 125, and the storage unit 126 of the operation terminal 12 are configured similarly to the detection unit 102, the output unit 104, the communication unit 105, and the storage unit 106 of the communication terminal 11, respectively.

The input unit 121 includes, for example, various input devices and operation devices. The input unit 121 is used for operation of the operation terminal 12 and input of commands, data, and the like to the operation terminal 12. Furthermore, the input unit 121 is used for remote operation of the robot 14.

The control unit 123 includes, for example, a processor such as a CPU. The control unit 103 executes control of the operation terminal 12, various types of information processing, and the like. For example, the control unit 123 executes processing related to remote operation of the robot 14.

The requester terminal 13 includes an input unit 141, a detection unit 142, a control unit 143, an output unit 144, a communication unit 145, and a storage unit 146.

The input unit 141 to the storage unit 146 of the requester terminal 13 are configured similarly to the input unit 101 to the storage unit 106 of the communication terminal 11, respectively, for example.

The robot 14 includes an input unit 161, a detection unit 162, a control unit 163, a movable unit 164, an output unit 165, a communication unit 166, and a storage unit 167.

The input unit 161, the output unit 165, the communication unit 166, and the storage unit 167 of the robot 14 are configured similarly to the input unit 101, the output unit 104, the communication unit 105, and the storage unit 106 of the communication terminal 11, respectively, for example.

The detection unit 162 includes various sensors, for example, detects the robot 14, a surrounding situation, and the like, and outputs sensor data indicating a detected result. For example, the detection unit 162 includes a camera for capturing an image of a work site of the robot 14. For example, the detection unit 162 includes sensors for detecting a position and a movement of the robot 14, such as, for example, a GNSS receiver, an acceleration sensor, an angular velocity sensor, and the like.

The control unit 163 includes, for example, a processor such as a CPU. The control unit 103 executes control of the robot 14, various types of information processing, and the like. Furthermore, the control unit 163 executes processing corresponding to the remote operation by the operation terminal 12.

The movable unit 164 is a portion that can be moved by the robot 14 to perform various types of work. The operation and configuration of the movable unit 164 are not particularly limited, and are different from each other in accordance with use of each robot 14 and the like.

Figure 4:
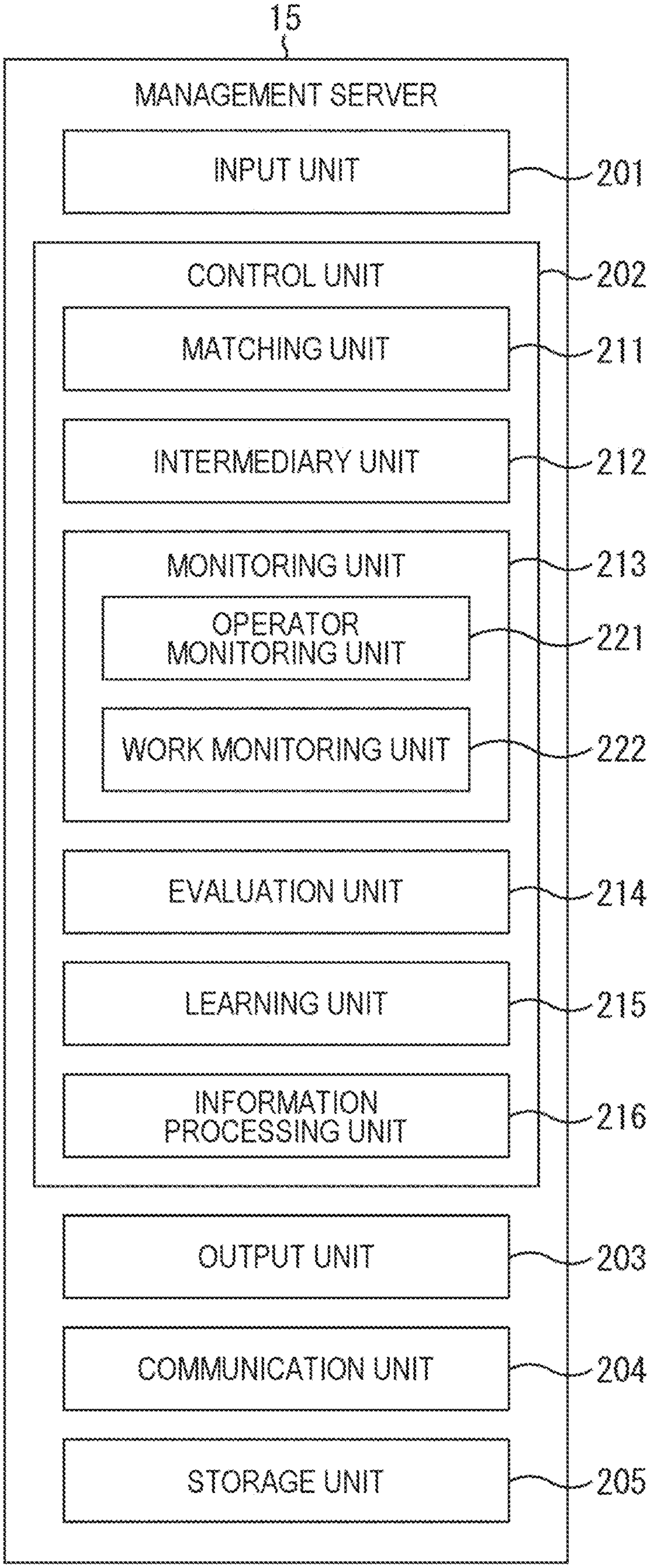
FIG. 4 is a block diagram illustrating a configuration example of functions of a management server.

FIG. 4 illustrates a configuration example of functions of the management server 15. The management server 15 includes an input unit 201, a control unit 202, an output unit 203, a communication unit 204, and a storage unit 205.

The input unit 201, the output unit 203, and the communication unit 204 are configured similarly to the input unit 101, the output unit 104, and the communication unit 105 of the communication terminal 11 in FIG. 3, respectively.

The control unit 202 includes a matching unit 211, an intermediary unit 212, a monitoring unit 213, an evaluation unit 214, a learning unit 215, and an information processing unit 216.

The matching unit 211 executes matching processing between the operator or the operation terminal 12 and the requester or the robot 14.

The intermediary unit 212 executes intermediation processing of remote operation between the operation terminal 12 and the robot 14.

The monitoring unit 213 includes an operator monitoring unit 221 and a work monitoring unit 222.

The operator monitoring unit 221 monitors operation competency of each operator on the basis of information from the operation terminal 12 and the robot 14. That is, the operator monitoring unit 221 monitors whether or not a competent operator is operating work requested by the requester.

The work monitoring unit 222 monitors a status of work executed by the robot 14 by each operator using the operation terminal 12, on the basis of information from the operation terminal 12 and the robot 14.

The evaluation unit 214 evaluates the operator, work executed by remote operation of the operator, and the like. For example, the evaluation unit 214 evaluates a work content of each operator on the basis of monitoring results and the like obtained by the operator monitoring unit 221 and the work monitoring unit 222, and updates ability information about each operator on the basis of the evaluation on the work content of each operator. For example, the evaluation unit 214 updates an evaluation score (described later) of the operator on the basis of evaluation by the requester. For example, the evaluation unit 214 determines a reward to be given to the operator on the basis of the evaluation on the work content by the operator and the evaluation on the work by the requester.

The learning unit 215 executes various kinds of learning processing. For example, the learning unit 215 executes learning processing of automatic control of each robot 14. Specifically, the learning unit 215 generates learning data, and causes the storage unit 205 to accumulate the learning data. The learning unit 215 generates a learning model for executing automatic control of each robot 14, by using the learning data accumulated in the storage unit 205.

The information processing unit 216 executes various types of information processing necessary for the processing of the management server 15.

The storage unit 205 includes, for example, a nonvolatile memory, a volatile memory, and the like, and stores a program and data necessary for processing of the management server 15. For example, the storage unit 205 accumulates data regarding work executed by each robot 14. For example, the storage unit 205 accumulates a work condition database (DB), a work request DB, and the like to be described later. The work condition DB is a DB that stores data regarding conditions necessary for remote operation of each work. The work request DB is a DB that stores data related to work requested by the requester.

For example, the storage unit 205 accumulates data regarding the operator and the requester, which are users of the information processing system 1. The storage unit 205 accumulates, for example, an operator DB, a requester DB, a skill table, a possessed-skill table, a reward table, and the like to be described later. The operator DB is a DB that stores data regarding each operator. The requester DB is a DB that stores data regarding each requester. The skill table is a table that defines a skill necessary for each work. The possessed-skill table is a table indicating a skill possessed by each operator. The reward table is a table indicating a reward to be given to each operator.

For example, the storage unit 205 accumulates learning data to be used for learning processing of automatic control of each robot 14.

Data Configuration Example of Work Condition DB

FIG. 5 illustrates a configuration example of data of the work condition DB accumulated in the storage unit 205 of the management server 15. The work condition DB is a DB that stores data regarding conditions necessary for remote operation of each work.

The work condition DB includes a work content, a communication amount, a communication speed, a Ping value, an allowable delay, an operation terminal, and a display.

The work content indicates an outline of each work. Here, work of controlling the robot 14 as a remote operation target is illustrated as an example.

The communication amount indicates a communication amount of the operation terminal 12 necessary for execution of each work. For example, in a case where the operation terminal 12 is a smartphone, the communication amount may be limited by a contract or the like with a communication company. Specifically, in a case where the communication amount of the smartphone exceeds a monthly capacity limit, a communication speed may be limited and rapidly decrease. In this regard, the communication amount is provided as a condition as a criterion for preventing the communication amount of the operation terminal 12 from exceeding the limited capacity. As a result, it is possible to prevent the communication amount of the operation terminal 12 from exceeding the limit capacity and the communication speed from rapidly decreasing during remote operation, and stability of communication of the operation terminal 12 is improved.

The communication speed indicates a minimum value of a communication speed of the operation terminal 12 necessary for executing each work.

The Ping value indicates an allowable value (maximum value) of a Ping value between the operation terminal 12 and the robot 14, which is required in each work. The Ping value is provided as a condition as a criterion for measuring and evaluating a time period required for transmission and reception of data between the operation terminal 12 and the robot 14.

The allowable delay indicates an allowable value (maximum value) of delay time (latency) of communication between the operation terminal 12 and the robot 14, which is required in each work. The delay time is, for example, a time period required for the robot 14 to receive a control signal for controlling the robot 14 via the network 21 and the management server 15, after the control signal is transmitted from the operation terminal 12.

The operation terminal indicates a type of the operation terminal 12 that can be used for remote operation of each work. For example, since the required input device, performance, and the like in the operation terminal 12 differ depending on a type, a specification, and the like of the robot 14, the type of the operation terminal is provided as a condition.

The display indicates a resolution of a display necessary for remote operation of each work. For example, since the required resolution of the display varies depending on accuracy, fineness, and the like of the work by the robot 14, the resolution of the display is provided as a condition.

First Embodiment of Processing of Information Processing System 1

Next, with reference to FIGS. 6 to 29, a first embodiment of processing of the information processing system 1 will be described.

Figure 6:
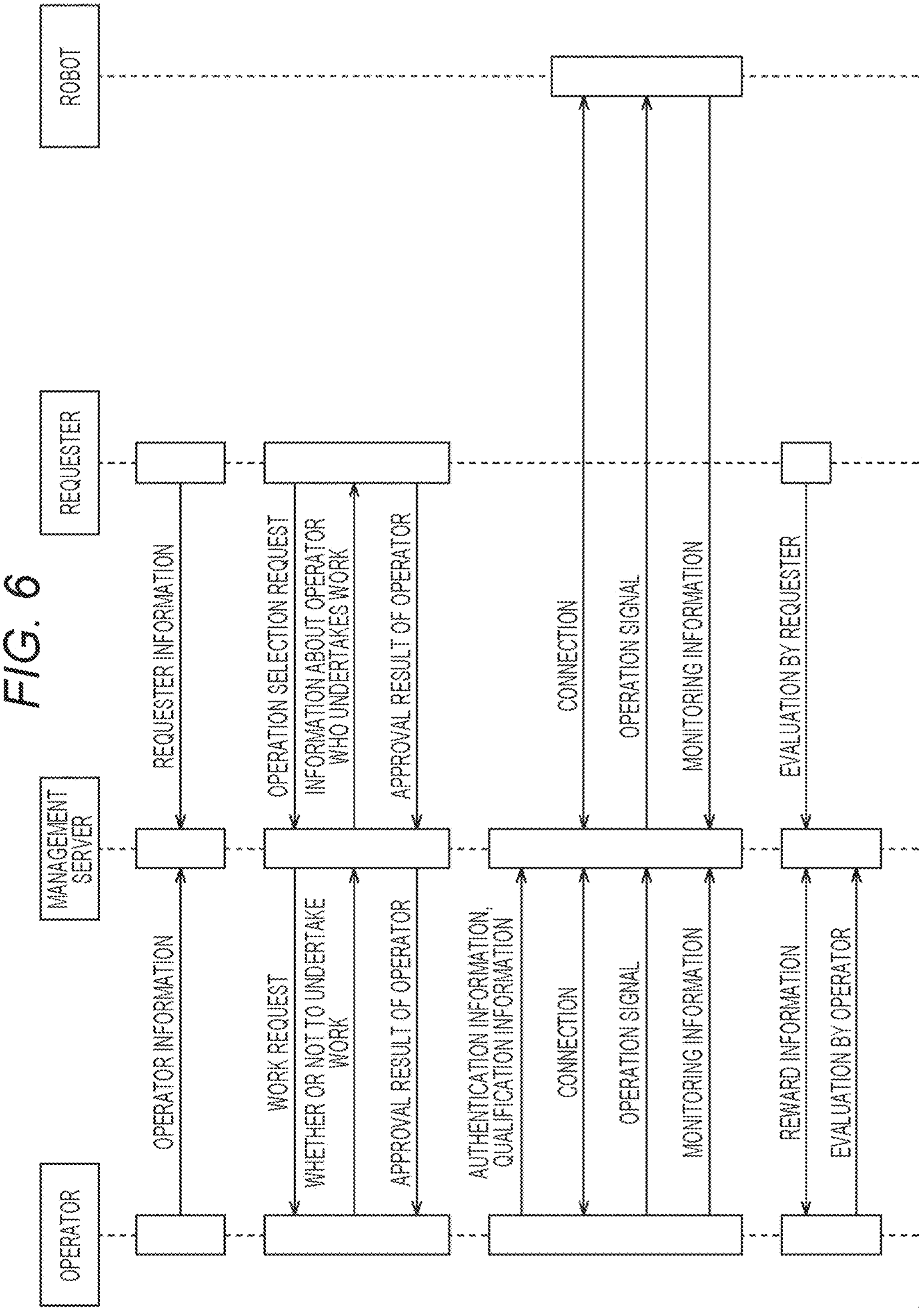
FIG. 6 is a sequence diagram for explaining an outline of the first embodiment of processing of the information processing system.

Outline of Processing of Information Processing System 1 According to First Embodiment First, with reference to a sequence diagram of FIG. 6, an outline of the first embodiment of the processing of the information processing system 1 will be described. The sequence diagram of FIG. 6 illustrates a sequence diagram between the operator, the management server 15, the requester, and the robot 14. Note that the operator executes processing illustrated in the sequence diagram by using the communication terminal 11 and the operation terminal 12.

The requester executes the processing illustrated in the sequence diagram by using the requester terminal 13.

First, matching processing between the operator (operation terminal 12) and the requester (robot 14) is executed.

Specifically, for example, the requester transmits requester information regarding the requester, to the management server 15. Note that a specific example of the requester information will be described later.

The operator transmits operator information regarding the operator to the management server 15. Note that, a specific example of the operator information will be described later.

On the other hand, the management server 15 registers the requester information and the operator information.

Note that, in this figure, a flow is illustrated in which the requester information and the operator information are registered at the same time, but the requester information and the operator information are registered at any timings.

Next, the requester requests the management server 15 to select an operator to execute a desired work.

The management server 15 selects an operator to which work is to be requested on the basis of ability and an operation environment of the operator, a content of the work, and the like, and requests the selected operator to perform the work.

The operator determines whether or not to undertake the work, and notifies the management server 15 of a determination result.

In a case where the operator undertakes work, the management server 15 notifies the requester of information regarding the operator, thereby recommending the operator to the requester.

Note that, in a case where the operator does not undertake the work, the management server 15 performs the selection of the operator again.

The requester determines whether or not to approve the operator, that is, whether or not to actually request the work to the operator, on the basis of the information regarding the recommended operator. The requester notifies the management server 15 of an approval result of the operator.

The management server 15 notifies the operator of the approval result of the operator by the requester.

Note that, in a case where the requester does not approve the operator, the management server 15 starts from the selection of the operator again.

Next, the operator remotely operates the robot 14 by using the operation terminal 12, to execute remote control processing of executing the work requested by the requester.

Specifically, the operator transmits the authentication information to the management server 15. At this time, in a case where the operator is to execute work that requires a qualification, the operator transmits, to the management server 15, qualification information that certifies possession of the qualification.

When the authentication of the operator is successful, the management server 15 intermediates connection between the operation terminal 12 operated by the operator and the robot 14 executing the work.

The operator transmits an operation signal for remotely operating the robot 14 to the management server 15 by using the operation terminal 12.

The management server 15 transmits the operation signal received from the operation terminal 12, to the robot 14.

The robot 14 executes work under the remote operation of the operator on the basis of the received operation signal.

The operator (operation terminal 12) constantly transmits monitoring information for monitoring the operator and the operation environment, to the management server 15 during the execution of the operation.

During execution of work, the robot 14 constantly transmits, to the management server 15, monitoring information for monitoring work by the robot 14 and a work environment.

The management server 15 monitors operation competency of the operator and a work status, on the basis of the monitoring information received from the operation terminal 12 and the robot 14. On the basis of a monitoring result, the management server 15 assists the operation or the work and warns the operator, or stops intermediation of the remote operation at some midpoint, as necessary.

Next, post-work processing is executed.

For example, the requester evaluates the operator and the work executed by the operator by the remote operation, and notifies the management server 15 of an evaluation result.

The management server 15 determines a reward to be given to the operator on the basis of evaluation or the like by the requester, and notifies the operator of reward information regarding the reward.

The operator evaluates the requester and the work requested by the requester, and notifies the management server 15 of an evaluation result.

<Matching Processing>

Next, with reference to the flowchart of FIG. 7, details of the matching processing executed by the information processing system 1 will be described.

In step S101, the requester terminal 13 transmits requester information. Specifically, the control unit 143 generates the requester information on the basis of information or the like input by the requester via the input unit 141.

The requester information includes, for example, attribute information and work environment information.

The attribute information is information regarding attributes of the requester. For example, the requester information includes personal information such as a name of the requester. Note that, in a case where the requester is an organization such as a corporation other than a natural person, for example, the attribute information includes information regarding the organization such as an organization name. Furthermore, the attribute information includes, for example, information about a bank account of the requester.

The work environment information is information regarding an environment for executing work that is a target of remote operation requested by the requester. For example, the work environment information includes robot information and communication status information.

The robot information is information regarding the robot 14 that executes work that is a target of the requested remote operation. The robot information includes, for example, one or more of identification information, a type, a specification, position information (for example, an installation position or the like), an operation status, an error occurrence status, and the like of the robot 14.

The identification information of the robot 14 is information for identifying the robot 14. The identification information includes, for example, one or more of a manufacturing number, a media access control (MAC) address, and the like of the robot 14.

The specification of the robot 14 includes, for example, a function, a performance, other specifications, and the like of the robot 14.

The operation status of the robot 14 includes, for example, information regarding a day of the week, a time zone, and the like during which the robot 14 can operate. The error occurrence status of the robot 14 includes, for example, a content, an occurrence rate, and the like of an error that may occur.

The communication status information is, for example, information regarding a communication status between the robot 14 and the management server 15. For example, the communication status information includes one or more of a communication speed, delay time, a communication capacity, a communication band, a packet loss rate, and the like in a case where the robot 14 is connected to the management server 15 via the network 21.

The control unit 143 transmits the requester information to the management server 15 via the communication unit 145, and requests registration of the requester information.

In step S111, the communication terminal 11 transmits operator information. Specifically, the control unit 103 generates the operator information on the basis of information input by the operator via the input unit 101, sensor data obtained by the detection unit 102, and the like.

The operator information is information regarding the operator or the operation terminal 12. The operator information is, for example, information including attribute information, authentication information, and operation environment information.

The attribute information is information regarding attributes of the operator. The attribute information is, for example, information including personal information and ability information.

The personal information is information regarding the operator. The personal information is, for example, information including a name, gender, age, nationality, occupation, affiliation, and the like of the operator.

The ability information is information regarding ability of the operator to perform work. The ability information includes, for example, a possessed qualification and a possessed skill of the operator, and a skill level of the skill possessed by the operator. As the skill level, for example, a result of a predetermined skill test, the number of years of experience of the skill, and the like can be used.

The authentication information is information to be used for authentication of the operator. The authentication information includes, for example, at least one of biometric information or a password.

The biometric information is information to be used for biometric authentication of the operator, and is extracted from, for example, sensor data acquired by the detection unit 102. For example, the biometric information is assumed to be face image data obtained by capturing an image of the face of the operator, fingerprint image data obtained by capturing an image of a fingerprint, vein image data obtained by capturing an image of a vein, iris image data obtained by capturing an image of an iris, voice data obtained by recording voice of the operator, and the like.

Note that, for example, instead of the face image data of the operator, a copy image of a personal certificate (for example, a passport, a driver's license, and the like) including a face photograph of the operator can be used.

Furthermore, the control unit 103 may anonymize the biological information in consideration of security, to transmit the biological information to the management server 15. For example, the control unit 103 may use, as the biological information, a feature amount extracted from image data or voice data indicating biological information of the operator.

Note that, hereinafter, an example of a case where biometric information is used as the authentication information will be described.

The operation environment information is information regarding an environment in which the operator executes the remote operation. For example, the operation environment information includes operation terminal information and communication status information.

The operation terminal information is information regarding the operation terminal 12 used by the operator. The operation terminal information includes, for example, one or more of identification information, a type, a specification, a state, position information, a connection status between with the communication terminal 11, and the like of the operation terminal 12.

The identification information of the operation terminal 12 is information for identifying the operation terminal 12. The identification information includes, for example, one or more of a manufacturing number, a MAC address, and the like of the operation terminal 12.

The specification of the operation terminal 12 includes, for example, a function, a performance, other specifications, and the like of the operation terminal 12.

The state of the operation terminal 12 includes, for example, the presence or absence of occurrence of abnormality of the operation terminal 12, and the like.

The communication status information is, for example, information regarding a communication status between the operation terminal 12 and the management server 15. For example, the communication status information includes one or more of a communication speed, delay time, a communication capacity, a communication band, a packet loss rate, and the like in a case where the operation terminal 12 is connected to the management server 15 via the network 21.

The control unit 103 transmits the operator information to the management server 15 via the communication unit 105, and requests registration of the operator information.

On the other hand, in step S121, the management server 15 registers the requester information and the operator information.

Specifically, the communication unit 204 receives the requester information from the requester terminal 13, and receives the operator information from the communication terminal 11. The information processing unit 216 adds the received requester information to the requester DB accumulated in the storage unit 205. The information processing unit 216 adds the received operator information to the operator DB accumulated in the storage unit 205.

FIG. 8 illustrates a part of a configuration example of data of the operator DB. The operator DB includes an operator ID, ability information, and operation environment information of each operator.

The operator ID is an ID for identifying each operator.

The ability information includes, for example, the presence or absence of possession of each qualification necessary for remote operation of each robot 14, and the like.

The operation environment information includes, for example, a type of the operation terminal held by each operator, and the like.

Note that the operator DB also includes, for example, an evaluation score of each operator, and the like. The evaluation score is, for example, a score indicating evaluation on each operator by the requester who has requested the work. An operator with higher evaluation by the requester has a higher evaluation score, and an operator with lower evaluation by the requester has a lower evaluation score.

Note that the ability information and the operation environment information of each operator may be stored in one DB as illustrated in FIG. 8, or may be stored in different DBs.

In a case where the ability information and the operation environment information are stored in one DB, the information is unified, so that an access speed for the information by each operator increases, while the risk of leakage of the information increases. Whereas, in a case where the ability information and the operation environment information are stored in different DBs, the information is distributed, so that the access speed for the information by each operator decreases, while the risk of leakage of the information decreases.

Note that, here, in order to simplify the description, an example is illustrated in which the management server 15 simultaneously registers the requester information and the operator information. However, in practice, each of the requester terminals 13 and each of the communication terminals 11 transmits the requester information and the operator information at any timings. Then, the management server 15 registers each piece of information every time the requester information or the operator information is received.

In step S102, the requester terminal 13 requests selection of an operator. Specifically, the control unit 143 generates work request information on the basis of information or the like input by the requester via the input unit 141.

The work request information includes, for example, identification information of the robot 14 as the operation target, a work content and work time to be requested, a delivery date, a reward, conditions necessary for the operator, required quality of the work, and the like.

The conditions necessary for the operator include, for example, ability required for the operator. The ability required for the operator is indicated by, for example, one or more of a possessed qualification, a possessed skill, a skill level, and the like.

Note that the conditions required for the operator may include, for example, attributes of the operator such as gender, age, nationality, and occupation as necessary.

The requested quality of the work is indicated by, for example, one or more of a speed of the work, accuracy of the work, and quality of a deliverable (for example, a product or the like) obtained by the work.

The control unit 143 transmits the work request information to the management server 15 via the communication unit 145, and requests selection of the operator.

On the other hand, in step S122, the management server 15 executes operator selection processing.

Here, with reference to the flowchart of FIG. 9, the operator selection processing will be described in detail.

In step S151, the management server 15 generates a selection condition on the basis of a work request content.

Specifically, the communication unit 204 receives the work request information from the requester terminal 13.

On the basis of the received work request information and the work condition DB (FIG. 7) accumulated in the storage unit 205, the matching unit 211 generates an operator selection condition. The operator selection condition includes, for example, a condition related to an operator and a condition related to an operation environment.

The condition related to an operator includes, for example, a condition related to ability of the operator. The condition related to ability of the operator includes, for example, at least one of a possessed qualification, a possessed skill, or a skill level of the operator.

The condition related to an operation environment includes an operation environment necessary for remotely operating the robot 14 requested by the requester to execute work. The condition related to an operation environment is set on the basis of, for example, one or more of a type of the robot 14, a specification of the robot 14, and a content of work to be executed by the robot 14.

More specifically, the condition related to an operation environment includes, for example, at least one of a condition related to the operation terminal 12 used by the operator or a condition related to a communication status of the operation terminal 12. The condition related to the operation terminal 12 includes, for example, a type and a specification (for example, a function, performance, and the like) of the operation terminal 12 that can be used. The condition related to a communication status of the operation terminal 12 includes, for example, at least one of a communication speed, allowable delay time, a communication capacity, a communication band, or an allowable packet loss rate in a case where the operation terminal 12 is connected to the management server 15 via the network 21.

Note that the selection condition generation processing may be executed using, for example, a machine learning model obtained by machine learning such as a neural network, or may be executed on the basis of a condition input by the requester.

In step S152, the matching unit 211 selects an operator to be a determination target. Specifically, the matching unit 211 selects one operator who has not yet been subjected to determination as to whether or not the selection condition is satisfied, among the operators registered in the operator DB.

In step S153, the matching unit 211 determines whether or not the operation environment and ability of the operator satisfy the selection condition.

For example, in a case where the selection condition includes an essential condition, the matching unit 211 determines whether or not the operation environment and the ability of the selected operator satisfy the essential condition. For example, a possessed qualification, a type of the operation terminal 12 used for remote operation, and the like are set as the essential condition.

In a case where the operator satisfies the essential condition or a case where there is no essential condition, the matching unit 211 calculates a matching degree between the selection condition generated in step S151 and the ability and the operation environment of the operator.

At this time, for example, the matching unit 211 may set a priority order in the selection condition, to calculate the matching degree in accordance with the priority order. For example, in a case of calculating the matching degree, the matching unit 211 increases a weight of the matching degree for the selection condition with a high priority order and decreases a weight of the matching degree for the selection condition with a low priority order.

In a case where the calculated matching degree is a predetermined threshold value or more, the matching unit 211 determines that the selection condition is satisfied, and the processing proceeds to step S154.

In step S154, the matching unit 211 adds the selected operator as a candidate of the operator to which work is to be requested.

Thereafter, the processing proceeds to step S156.

Whereas, in step S153, in a case where the matching degree of the operator is less than the predetermined threshold value or in a case where the operator does not satisfy the essential condition, the matching unit 211 determines that the selection condition is not satisfied, and the processing proceeds to step S155.

In step S155, the matching unit 211 remove the selected operator from candidates of the operator to which the work is to be requested.

Thereafter, the processing proceeds to step S156.

In step S156, the matching unit 211 determines whether or not the determination has been performed on all the operators. In a case where it is determined that not all the operators have been subjected to the determination yet, the processing returns to step S152.

Thereafter, the processing in step S152 to S156 is repeatedly executed until it is determined in step S156 that the determination has been executed on all the operators. As a result, it is determined whether or not the selection condition is satisfied for all the operators registered in the operator DB.

Note that, it is not always necessary to perform determination for all the operators, and the matching unit 211 may narrow down the number of operators to be the determination target. For example, the matching unit 211 may narrow down the number of operators to be the determination target in accordance with a condition such as age, or may randomly select operators to narrow down the number of operators to be the determination target.

Whereas, in a case where it is determined in step S156 that the determination has been performed on all the operators, the processing proceeds to step S157.

In step S157, the matching unit 211 determines the operator to which the work is to be requested. For example, among the operator candidates extracted using the selection condition, the matching unit 211 determines the operator having the highest matching degree as the operator to which the work is to be requested.

Note that, for example, in a case where there is a plurality of operators with the highest matching degree, the operator is selected on the basis of a distance between the operation terminal 12 to be used and the robot 14 as the remote operation target. For example, an operator who uses the operation terminal 12 being present at a position closer to the robot 14 as the remote operation target is preferentially selected. This is because the communication time between the operation terminal 12 and the robot 14 is likely to be shorter as the position of the operation terminal 12 is closer to the position of the robot 14.

Note that, in a case where there is no operator satisfying the selection condition, for example, the matching unit 211 notifies the requester terminal 13 that there is no operator satisfying the selection condition.

Returning to FIG. 7, in step S123, the matching unit 211 offers the selected operator to undertake the work. Specifically, the matching unit 211 transmits the work request information to the communication terminal 11 of the selected operator via the communication unit 204, and inquires whether or not to undertake the work.

On the other hand, in step S112, the communication terminal 11 presents a work request. Specifically, the communication unit 105 receives the work request information from the management server 15. The output unit 104 presents the work request information to the operator under the control of the control unit 103.

In step S113, the communication terminal 11 acquires and notifies of whether or not to undertake the work.

Specifically, the operator determines whether or not to undertake the presented work, and inputs a determination result to the communication terminal 11 by using the input unit 101.

In a case where the control unit 103 determines that the operator is to undertake the requested work, the control unit 103 extracts, for example, authentication information of the operator from sensor data from the detection unit 122. The authentication information extracted at this time is, for example, authentication information of the same type as the authentication information registered in the operator DB held by the management server 15 or information serving as a basis of the authentication information of the operator DB. For example, in a case where the authentication information of the operator DB is a feature amount of face image data, the information serving as a basis of the authentication information of the operator DB corresponds to the face image data.

The control unit 103 transmits the authentication information to the management server 15 via the communication unit 105, and notifies that the operator is to undertake the work.

Whereas, in a case where the control unit 103 determines that the operator is not to undertake the requested work, the control unit 103 notifies the management server 15 that the operator is not to undertake the work via the communication unit 105.

On the other hand, in step S124, the management server 15 executes authentication of the operator. Specifically, in a case where the communication terminal 11 has notified the communication unit 204 that the operator is to undertake work, the communication unit 204 receives the authentication information transmitted simultaneously from the communication terminal 11. The matching unit 211 executes personal authentication of the operator on the basis of the received authentication information and the authentication information of the operator registered in the operator DB. In a case where the personal authentication of the operator is successful, that is, in a case where the operator selected by the matching unit 211 matches the operator who undertakes the work, the processing proceeds to step S125.

Note that, for example, in a case where the communication terminal 11 notifies that the operator is not to undertake the work or in a case where the personal authentication of the operator fails, the processing in and after step S122 is executed again. As a result, a new operator is selected, and the selected operator is offered to undertake the work.

In step S125, the matching unit 211 transmits information regarding the operator who undertakes the work. Specifically, the matching unit 211 generates information (hereinafter, referred to as undertaking operator information) including information regarding ability and an operation environment of the operator who undertakes the work. The communication unit 204 transmits the undertaking operator information to the requester terminal 13.

On the other hand, in step S103, the requester terminal 13 presents information regarding the operator who undertakes the work. Specifically, the communication unit 145 receives the undertaking operator information from the management server 15.

Under the control of the control unit 143, the output unit 144 presents information regarding the operator who undertakes the work to the requester, on the basis of the undertaking operator information. As a result, the operator selected by the management server 15 is recommended to the requester.

In step S104, the requester terminal 13 acquires and transmits an approval result for the operator.

Specifically, the requester determines whether or not to approve the operator on the basis of the presented information regarding the operator, and inputs a determination result to the requester terminal 13 by using the input unit 141.

The communication unit 145 notifies the management server 15 of the approval result of the requester for the operator.

On the other hand, in step S126, the management server 15 notifies of the approval result for the operator. Specifically, the communication unit 204 notifies the communication terminal 11 of the approval result for the operator of which the requester terminal 13 has notified.

Note that, for example, in a case where the requester does not approve the operator, the processing in and after step S122 is executed again. As a result, a new operator is selected, and the selected operator is offered to undertake the work.

On the other hand, in step S114, the communication terminal 11 presents the approval result to the operator. Specifically, the output unit 104 presents, to the requester, the approval result for the operator of which the management server 15 has notified, under the control of the control unit 103.

<Remote Control Processing>

Next, with reference to FIGS. 10 to 28, remote control processing executed by the information processing system 1 will be described.

<Processing of Management Server 15>

First, with reference to flowcharts of FIGS. 10 and 11, processing of the management server 15 in the remote control processing will be described.

In step S201, the management server 15 requests transmission of authentication information of the operator. Specifically, the intermediary unit 212 requests, via the communication unit 204, the operation terminal 12 used by the operator to transmit the authentication information of the operator who is to execute the requested work.

On the other hand, as will be described later, the operation terminal 12 transmits the authentication information of the operator to the management server 15. The authentication information transmitted at this time is, for example, information similar to the authentication information transmitted from the communication terminal 11 in the processing in step S113 of FIG. 7 described above.

In step S202, the management server 15 executes operator authentication processing.

Figure 12:
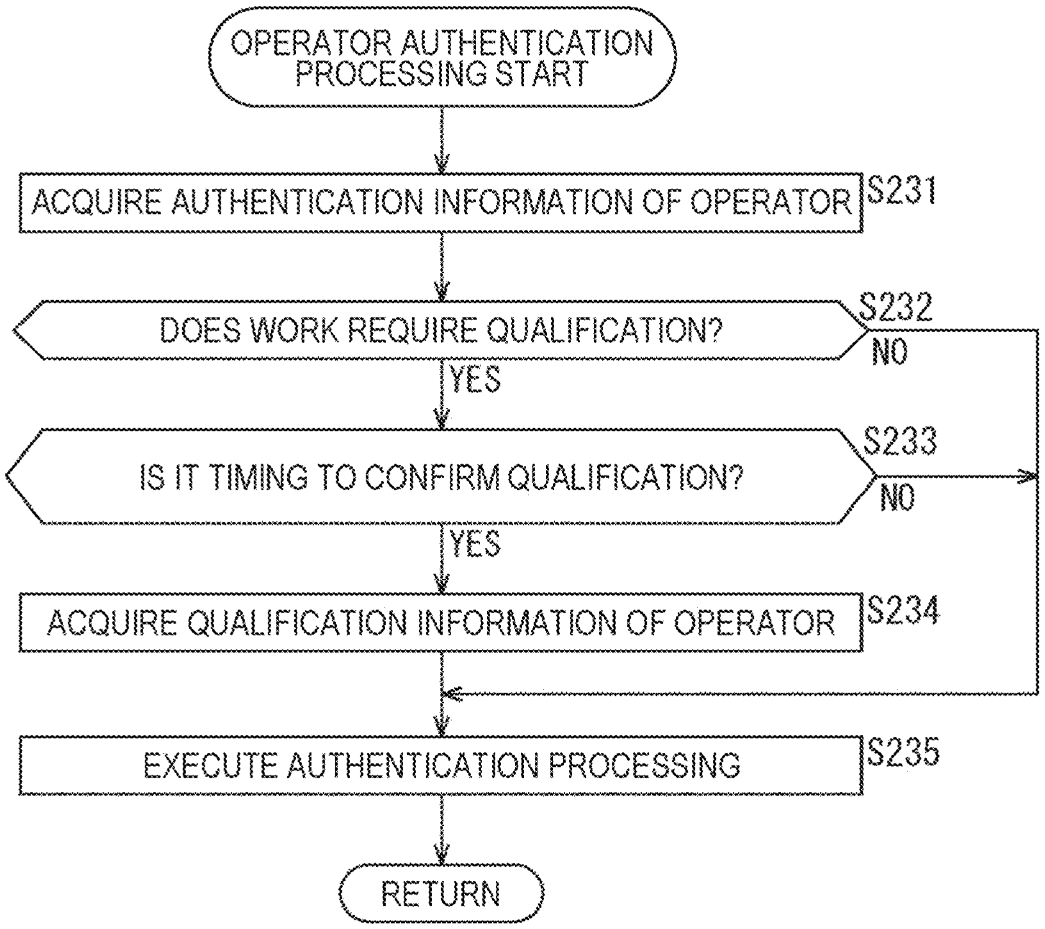
FIG. 12 is a flowchart for explaining details of operator authentication processing.

Here, with reference to the flowchart of FIG. 12, details of the operator authentication processing will be described.

In step S231, the management server 15 acquires the authentication information of the operator. That is, the communication unit 204 receives the authentication information of the operator from the operation terminal 12.

In step S232, the operator monitoring unit 221 determines whether or not the work requires a qualification. In a case where it is determined that the work requires a qualification, the processing proceeds to step S223.

In step S233, the operator monitoring unit 221 determines whether or not it is a timing to confirm the qualification. In a case where it is determined that it is a timing to confirm the qualification, the processing proceeds to step S234.

For example, start time of work is set to the timing to confirm the qualification. For example, work to be executed by the operator is divided into a plurality of work units, and a separation between the work units is set to the timing to confirm the qualification.

In step S234, the operator monitoring unit 221 acquires qualification information of the operator. Specifically, the communication unit 204 requests the operation terminal 12 used by the operator to transmit the qualification information regarding the qualification necessary for execution of the work.

On the other hand, the operation terminal 12 transmits the requested qualification information.

The qualification information is information indicating that the operator has the qualification necessary for execution of the work. The qualification information is, for example, information recorded in an IC card with an IC chip provided to a person who has the qualification. For example, a copy of a certificate that certifies possession of the qualification, an ID given to a person who has the qualification, and the like are assumed as the qualification information.

On the other hand, the communication unit 204 receives the qualification information transmitted from the operation terminal 12.

Thereafter, the processing proceeds to step S234.

Whereas, in a case where it is determined in step S233 that the work does not require a qualification, the processing in step S234 is skipped, and the processing proceeds to step S235.

Furthermore, in a case where it is determined in step S232 that the work does not require a qualification, the processing in steps S233 and S234 is skipped, and the processing proceeds to step S235.

In step S235, the operator monitoring unit 221 executes authentication processing. Specifically, the operator monitoring unit 221 executes personal authentication of the operator on the basis of the acquired authentication information and the authentication information of the operator registered in the operator DB. Furthermore, in a case where it is the timing to confirm the qualification, the operator monitoring unit 221 checks whether or not the operator has the qualification necessary for the work on the basis of the qualification information.

In a case where it is the timing to confirm the qualification, the operator monitoring unit 221 determines that the authentication of the operator is successful, in a case where the personal authentication of the operator is successful and it can be confirmed that the operator has the qualification necessary for the work. Whereas, in a case where it is the timing to confirm the qualification, the operator monitoring unit 221 determines that the authentication of the operator has failed, in a case where the personal authentication of the operator has failed or in a case where it has failed to be confirmed that the operator has the qualification necessary for the work. Furthermore, in a case where it is not the timing to confirm the qualification, the operator monitoring unit 221 determines that the authentication of the operator is successful in a case where the personal authentication of the operator is successful.

Thereafter, the operator authentication processing ends.

Returning to FIG. 10, in step S203, the intermediary unit 212 determines whether or not to permit remote operation. Specifically, in a case where the authentication of the operator is successful in the processing in step S202, the intermediary unit 212 determines to permit the remote operation, and the processing proceeds to step S204.

In step S204, the intermediary unit 212 connects the operation terminal 12 and the robot 14. Specifically, the intermediary unit 212 instructs the operation terminal 12 and the robot 14 as the remote operation target to connect to each other via the communication unit 204. Then, the intermediary unit 212 causes the operation terminal 12 and the robot 14 to be connected with each other via the network 21 and the management server 15, to be able to communicate with each other.

In step S205, the management server 15 executes remote operation intermediation processing.

Figure 13:
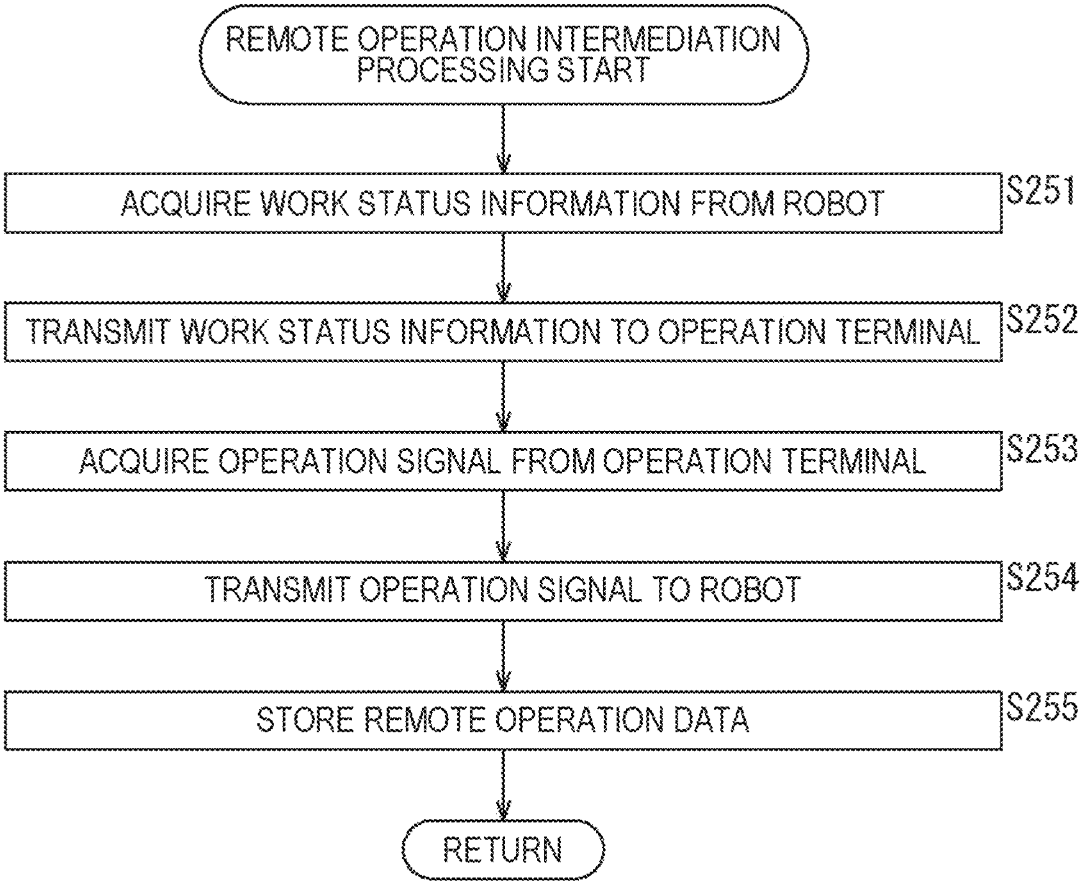
FIG. 13 is a flowchart for explaining details of remote operation intermediation processing.

Here, with reference to the flowchart of FIG. 13, details of the remote operation intermediation processing will be described.

In step S251, the intermediary unit 212 receives work status information from the robot 14 via the communication unit 204.

The work status information includes, for example, work image data and work sensor data. The work image data is image data obtained by capturing an image of a work site where the robot 14 performs work, and is, for example, image data obtained by capturing an image of a state where the robot 14 performs work. The work sensor data is, for example, sensor data necessary for remote operation of the robot 14.

In step S252, the intermediary unit 212 transmits the work status information received from the robot 14 to the operation terminal 12 via the communication unit 204.

Here, the intermediary unit 212 processes the work image data to be transmitted to the operation terminal 12 as necessary.

For example, the intermediary unit 212 performs information protection processing on the work image data.

Specifically, for example, the intermediary unit 212 generates the work image data in which only a work area is presented (only the work area is visually recognizable) by blurring an area other than the work area designated by the requester or replacing the area with an image of computer graphics (CG). The work area is an area that needs to be visually recognized for the operator to work using the robot 14 by remote operation.

For example, the intermediary unit 212 blurs, replaces with an image of CG, or erases a concealed area designated by the requester to make the concealed area invisible, thereby generating work image data in which confidential information is concealed. The concealed area is, for example, an area including a product before release, a design drawing, a design image, and the like, an area including a non-public manufacturing processing, and the like.

For example, the intermediary unit 212 performs gamification processing on the work image data. The gamification processing is processing of performing processing such as effect processing to make the work image data to be an image imitating a screen of a game. As a result, it is possible to expect an effect that the operator continuously concentrates on the work without getting bored.

Note that the robot 14 may process the work image data, and transmit the processed work image data to the management server 15. As a result, risk of leakage of confidential information can be further reduced. Furthermore, for example, the management server 15 or the robot 14 may also perform processing of concealing confidential information on the work sensor data.

In step S253, the intermediary unit 212 receives an operation signal from the operation terminal 12 via the communication unit 204.

In step S254, the intermediary unit 212 transmits the operation signal received from the operation terminal 12 to the robot 14 via the communication unit 204.

In step S255, the learning unit 215 starts storing the remote operation data. Specifically, the learning unit 215 starts processing of arranging the operation signals received from the operation terminal 12 in time series and causing the operation signals to be stored in the storage unit 205 as the remote operation data. This remote operation data is used for learning data as described later.

Returning to FIG. 10, in step S206, the management server 15 executes operation competency monitoring processing.

Figure 14:
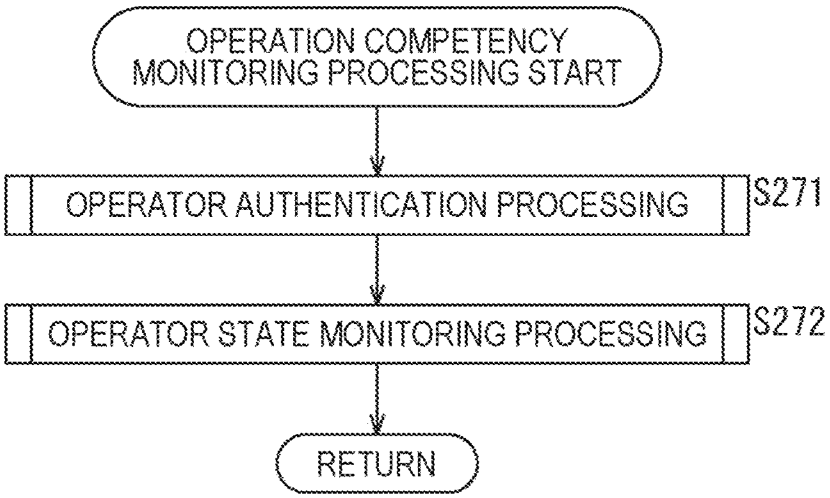
FIG. 14 is a flowchart for explaining details of operation competency monitoring processing.

Here, with reference to the flowchart of FIG. 14, details of the operation competency processing will be described.

Figure 10:
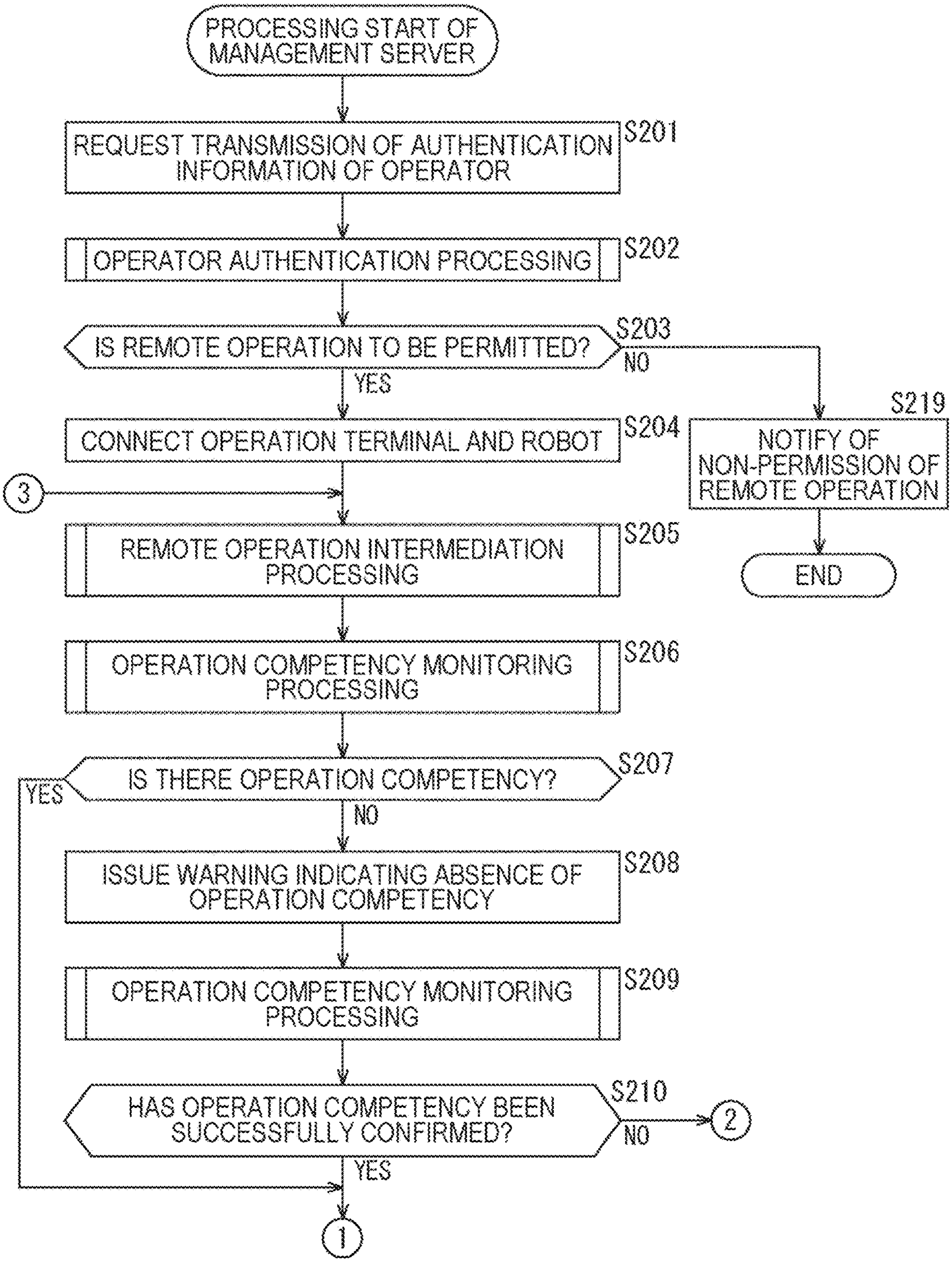
FIG. 10 is a flowchart for explaining processing of the management server in remote control processing.

In step S271, operator authentication processing is executed similarly to the processing in step S202 in FIG. 10.

In step S272, the management server 15 executes operator state monitoring processing, and thereafter, the operation competency monitoring processing ends.

Figure 15:
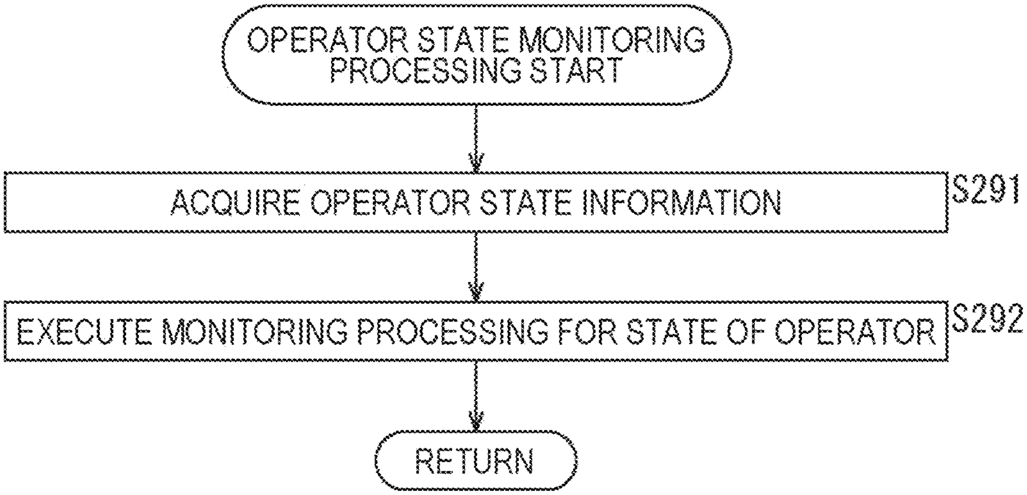
FIG. 15 is a flowchart for explaining details of operator state monitoring processing.

Here, with reference to the flowchart of FIG. 15, details of the operator state monitoring processing will be described.

In step S291, the management server 15 receives operator state information. That is, the operator monitoring unit 221 receives the operator state information from the operation terminal 12 via the communication unit 204.

The operator state information includes, for example, image data (hereinafter, referred to as operator image data) obtained by capturing an image of the operator, and biological information (hereinafter, referred to as operator biological information) indicating a state of the operator.

The operator biological information includes, for example, a perspiration amount, a heart rate, a blood pressure, and the like of the operator.

In step S292, the operator monitoring unit 221 executes monitoring processing for a state of the operator on the basis of the operator state information. For example, the operator monitoring unit 221 monitors a movement, a concentration degree, a wakefulness level, a tension level, a physical condition, and the like of each part (for example, a head part, a line-of-sight, an arm, a hand, a finger, and the like) of the operator. For example, the operator monitoring unit 221 monitors a method, a speed, a procedure, and the like of the remote operation of the operator on the basis of the movement of each part of the operator. The operator monitoring unit 221 determines the presence or absence of an abnormality in the state of the operator on the basis of a monitoring result.

Thereafter, the operator state monitoring processing ends.

Returning to FIG. 10, in step S207, the operator monitoring unit 221 determines whether or not the operator has operation competency. For example, in a case where the authentication of the operator fails or a case where a state of the operator is abnormal, the operator monitoring unit 221 determines that the operator does not have the operation competency, and the processing proceeds to step S208.

In step S208, the management server 15 issues a warning indicating absence of the operation competency. For example, the intermediary unit 212 generates warning information (hereinafter, referred to as operation incompetency warning information) for notifying the operator that operation competency is absent and a reason therefor. The intermediary unit 212 transmits the operation incompetency warning information to the operation terminal 12 via the communication unit 204.

On the other hand, the operation terminal 12 receives the operation incompetency warning information, and warns the operator that operation competency is absent.

In step S209, operation competency monitoring processing is executed similarly to the processing in step S206. That is, after the warning of absence of the operation competency is issued, the presence or absence of the operation competency of the operator is determined again.

In step S210, the operator monitoring unit 221 determines whether or not the operation competency of the operator has been confirmed. For example, in a case where it is determined that authentication of the operator is successful and a state of the operator is normal in the processing in step S209, the operator monitoring unit 221 determines that the operation competency of the operator has been successfully confirmed, and the processing proceeds to step S211.

Whereas, in step S207, for example, in a case where the authentication of the operator is successful and the state of the operator is normal in the processing of step S206, the operator monitoring unit 221 determines that the operator has the operation competency, the processing in steps S208 to S210 is skipped, and the processing proceeds to step S211.

In step S211, the management server 15 executes work monitoring processing.

Figure 16:
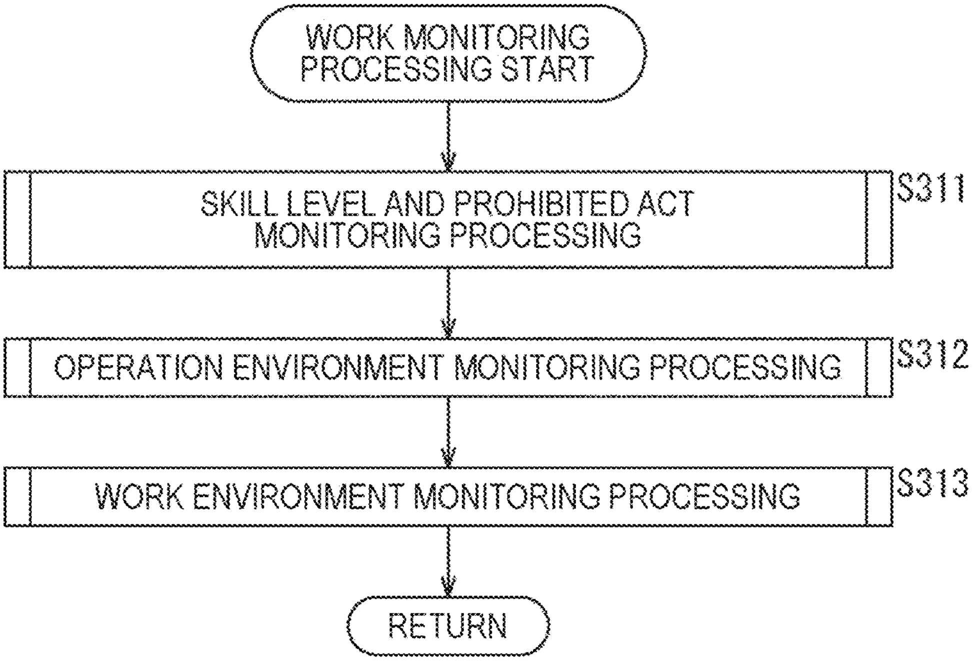
FIG. 16 is a flowchart for explaining details of work monitoring processing.

Here, with reference to a flowchart of FIG. 16, details of the work monitoring processing will be described.

In step S311, the management server 15 executes a skill level and prohibited act monitoring processing.

Figure 17:
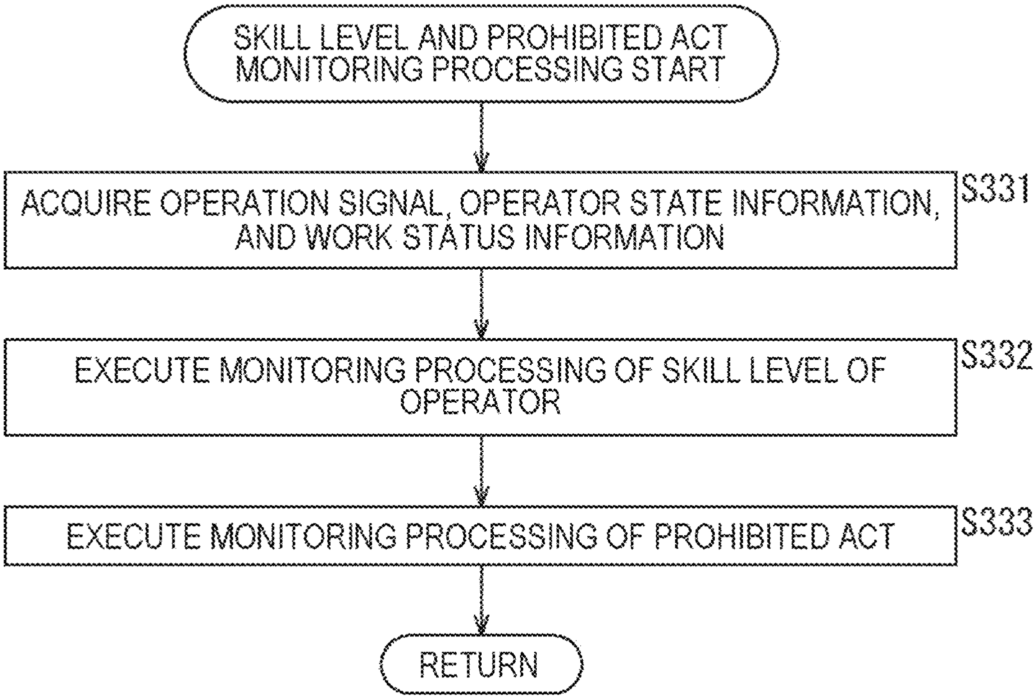
FIG. 17 is a flowchart for explaining details of skill level and prohibited act monitoring processing.

Here, with reference to the flowchart of FIG. 17, details of the skill level and prohibited act monitoring processing will be described.

In step S331, the management server 15 acquires an operation signal, operator state information, and work environment information. Specifically, the communication unit 204 receives the operation signal and the operator state information transmitted from the operation terminal 12. Furthermore, the communication unit 204 receives the work environment information transmitted from the robot 14.

Figure 7:
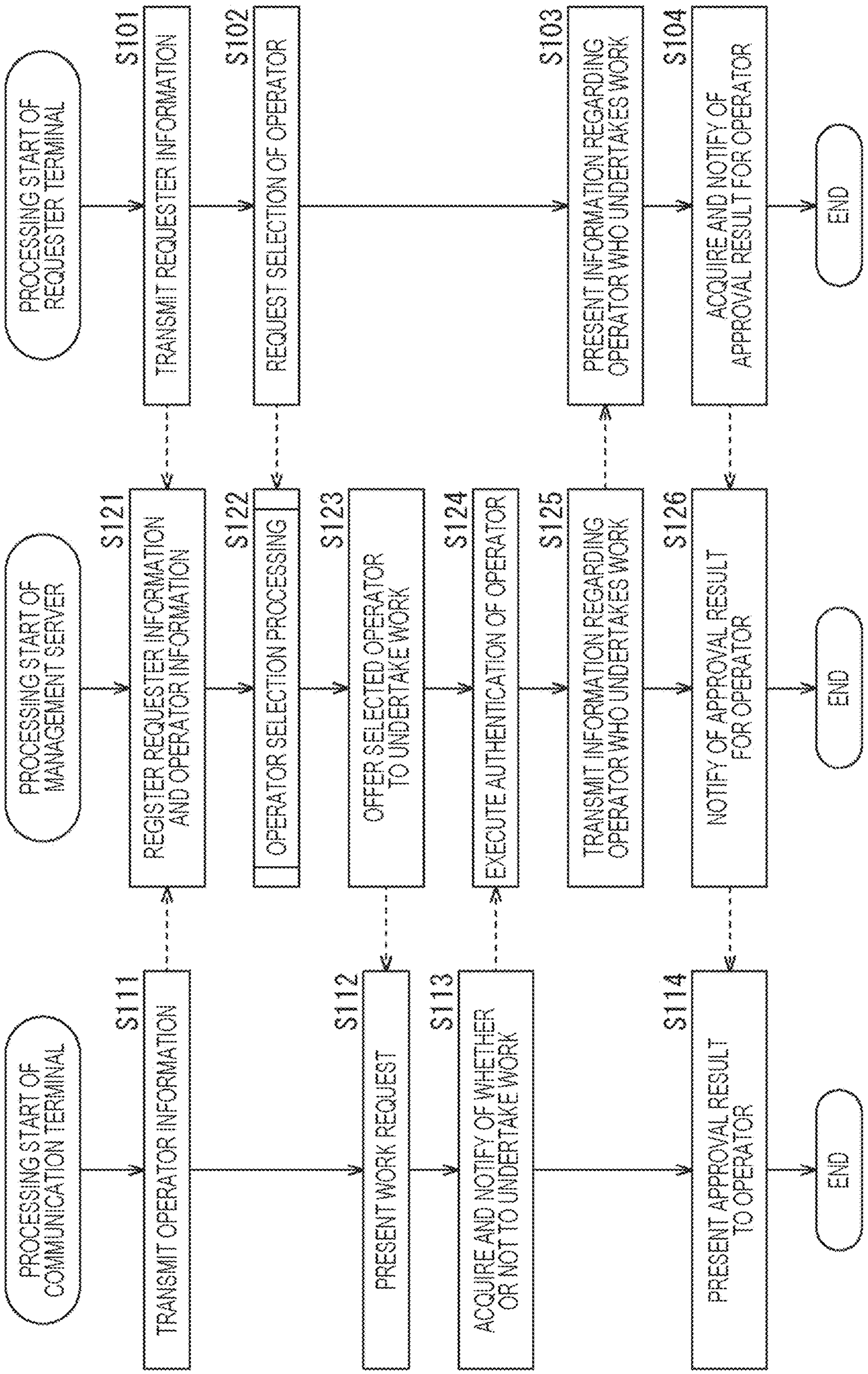
FIG. 7 is a flowchart for explaining the first embodiment of matching processing.

The work environment information received at this time is, for example, information similar to the work environment information transmitted from the requester terminal 13 in the processing in step S101 in FIG. 7.

In step S332, the work monitoring unit 222 executes monitoring processing for the skill level of the operator, on the basis of the operation signal, the operator state information, and the work status information.

For example, the work monitoring unit 222 detects an operation of the operator on the basis of the operator image data and the operator biological information included in the operation state information. Specifically, for example, the work monitoring unit 222 detects a movement of each part (for example, a head part, a line-of-sight, an arm, a hand, a finger, and the like) of the operator. Furthermore, for example, the work monitoring unit 222 detects a method, a speed, a procedure, and the like of the remote operation of the operator on the basis of the movement of each part of the operator.

For example, the work monitoring unit 222 detects an operation of the robot 14 by the remote operation of the operator, on the basis of the operation signal, and the work image data and the work sensor data included in the work status information. Specifically, for example, the work monitoring unit 222 detects a content, a speed, accuracy, a method, a procedure, and the like of the work of the robot 14.

The work monitoring unit 222 determines whether or not the operator has a required skill level on the basis of detection results of the operation of the operator and the operation of the robot 14. The skill level is recognized on the basis of, for example, an operation method of the operation terminal 12, and a procedure, a speed, accuracy, and the like of the work performed by the robot 14.

In step S333, the work monitoring unit 222 executes monitoring processing for a prohibited act. For example, the work monitoring unit 222 detects the presence or absence of execution of a prohibited act on the basis of a detection result of the operation of the robot 14.

Here, the prohibited action is, for example, an act of deteriorating progress and quality of work. In particular, for example, an act of significantly deteriorating progress and quality of work and an act of intentionally deteriorating progress and quality of work correspond to the prohibited act. For example, in a case where assembly work of a product is performed, acts are assumed in which a wrong component is installed, a component is installed at a wrong position, and a product or a component is damaged or destroyed by falling or the like.

Note that, in a case where an act of deteriorating progress or accuracy of the work is repeated a predetermined number of times or more, or continues for a predetermined time or more, for example, the work monitoring unit 222 may determine that the operator has executed the prohibited act. As a result, it becomes possible to identify whether the operator has erroneously executed the prohibited act or has executed the prohibited act with a malicious intent.

Thereafter, the skill level and prohibited act monitoring processing ends.

Returning to FIG. 16, in step S312, the management server 15 executes operation environment monitoring processing.

Figure 18:
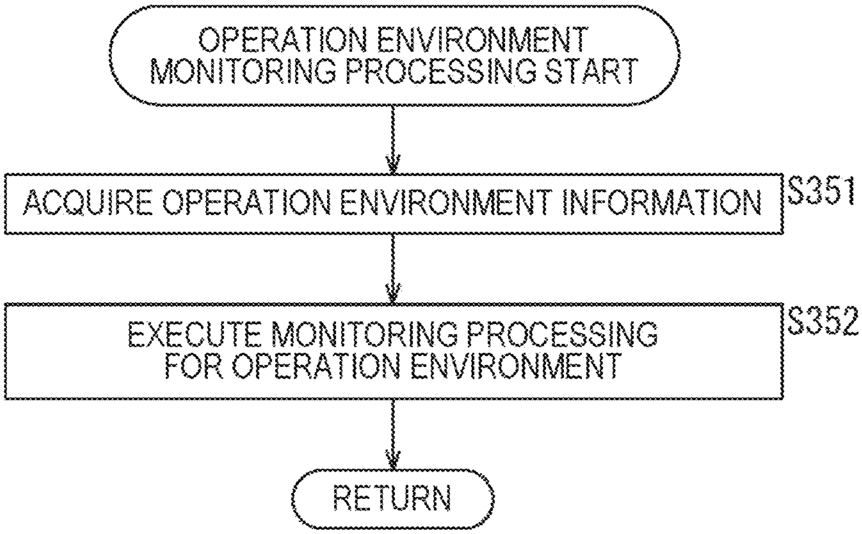
FIG. 18 is a flowchart for explaining details of operation environment monitoring processing.

Here, with reference to the flowchart of FIG. 18, details of the operation environment monitoring processing will be described.

In step S351, the management server 15 acquires operation environment information. Specifically, the communication unit 204 receives operation environment information transmitted from the operation terminal 12.

The operation environment information transmitted and received at this time is, for example, information similar to the operation environment information transmitted from the communication terminal 11 in the processing in step S111 of FIG. 7 described above.

In step S352, the work monitoring unit 222 executes monitoring processing for an operation environment on the basis of the operation environment information. For example, the work monitoring unit 222 detects the presence or absence of an abnormality of the operation terminal 12 on the basis of the operation environment information. For example, the work monitoring unit 222 detects a communication status and the presence or absence of a communication failure between the operation terminal 12 and the management server 15. The communication status includes, for example, at least one of a communication speed, delay time, a communication capacity, a communication band, or a packet loss rate.

The work monitoring unit 222 determines the presence or absence of an abnormality in the operation environment, on the basis of the presence or absence of an abnormality in the operation terminal 12, and on the basis of the communication status and the presence or absence of a communication failure between the operation terminal 12 and the management server 15. For example, in a case where the operation terminal 12 is normal, the communication status between the operation terminal 12 and the management server 15 satisfies a required condition, and no communication failure occurs between the operation terminal 12 and the management server 15, the work monitoring unit 222 determines that no abnormality has occurred in the operation environment. For example, in a case where an abnormality has occurred in the operation terminal 12, in a case where the communication status between the operation terminal 12 and the management server 15 does not satisfy the requested condition, or in a case where a communication failure has occurred between the operation terminal 12 and the management server 15, the work monitoring unit 222 determines that an abnormality has occurred in the operation environment.

Note that the case where an abnormality has occurred in the operation terminal 12 also includes, for example, a case where the operation terminal 12 that does not satisfy the requested condition is used (for example, in a case where a resolution of a display does not satisfy the required condition, or the like).

Thereafter, the operation environment monitoring processing ends.

Returning to FIG. 16, in step S313, the work monitoring unit 222 executes work environment monitoring processing, and thereafter, the work monitoring processing ends.

Figure 19:
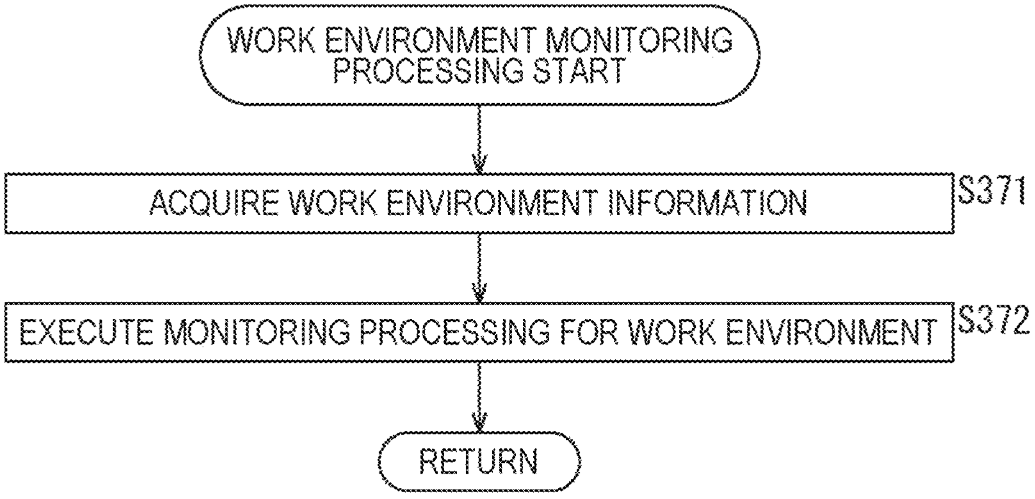
FIG. 19 is a flowchart for explaining details of work environment monitoring processing.

Here, with reference to the flowchart of FIG. 19, details of the work environment monitoring processing will be described.

In step S371, the management server 15 acquires work environment information. Specifically, the communication unit 204 receives the work environment information transmitted from the robot 14.

In step S372, the work monitoring unit 222 executes monitoring processing for a work environment on the basis of the work environment information. For example, the work monitoring unit 222 detects the presence or absence of an abnormality of the robot 14 on the basis of the work environment information. For example, the work monitoring unit 222 detects a communication status and the presence or absence of a communication failure between the robot 14 and the management server 15. The communication status includes, for example, at least one of a communication speed, delay time, a communication capacity, a communication band, or a packet loss rate.

The work monitoring unit 222 determines the presence or absence of an abnormality in the work environment, on the basis of the presence or absence of an abnormality in the robot 14, and on the basis of the communication status and the presence or absence of a communication failure between the robot 14 and the management server 15. For example, in a case where the robot 14 is normal, the communication status between the robot 14 and the management server 15 satisfies a required condition, and no communication failure occurs between the robot 14 and the management server 15, the work monitoring unit 222 determines that no problem has occurred in the work environment. For example, in a case where an abnormality has occurred in the robot 14, in a case where a communication status between the robot 14 and the management server 15 does not satisfy a required condition, or in a case where a communication failure has occurred between the robot 14 and the management server 15, the work monitoring unit 222 determines that an abnormality has occurred in the work environment.

Thereafter, the work environment monitoring processing ends.

Returning to FIG. 11, in step S212, the work monitoring unit 222 determines whether or not a problem has occurred, on the basis of a result of the processing in step S211.

For example, in a case where the operator does not have a required skill level, in a case where a prohibited act is detected, in a case where an abnormality has occurred in the operation environment, or in a case where an abnormality has occurred in the work environment, the work monitoring unit 222 determines that a problem has occurred in the work status. Whereas, in a case where the operator has a required skill level, no prohibited act is detected, the operation environment is normal, and the work environment is normal, the work monitoring unit 222 determines that no problem has occurred in the work status.

Then, in a case where it is determined that a problem has occurred, the processing proceeds to step S213.

In step S213, the intermediary unit 212 assists operation or work as necessary.

For example, in a case where a problem has occurred in the operator or the operation environment, the intermediary unit 212 generates operation assistance information for assisting the operator to solve the problem, and transmits the operation assistance information to the operation terminal 12 via the communication unit 204.

The operation assistance information includes, for example, information notifying of occurrence and contents of the problem. As a result, the operator can recognize the occurrence and contents of the problem, and deal with the problem.

The operation assistance information includes, for example, information indicating a method for solving the problem. For example, the operation assistance information includes assist information for assisting the remote operation of the operator in a case where quality of work is lower than a predetermined standard. The assist information includes, for example, information for guiding a method or a procedure of the remote operation. For example, the operator can improve quality of work by performing remote operation according to the assist information.

For example, the operation assistance information includes information for calling attention of the operator in a case where attention of the operator is reduced, for example, in a case where the operator falls asleep or is not concentrating on work. Specifically, the operation assistance information includes information for vibrating an operation device included in the input unit 121 of the operation terminal 12 or outputting a warning sound from the output unit 124. As a result, the attention of the operator can be attracted, and the quality of the work can be improved.

The intermediary unit 212 transmits operation assistance information to the operation terminal 12 via the communication unit 204.

For example, in a case where a problem has occurred in the work environment, the intermediary unit 212 generates the work assistance information for assisting the requester or the worker at the work site to solve the problem.

The work assistance information includes, for example, information notifying of occurrence and contents of the problem. As a result, the requester or the worker can recognize the occurrence and contents of the problem, and deal with the problem.

The work assistance information includes, for example, information indicating a method for solving the problem. For example, the work assistance information includes assist information indicating a method for eliminating an obstacle of the robot 14. As a result, for example, the requester or the worker can solve the obstacle of the robot 14 in accordance with the assist information.

The intermediary unit 212 transmits the work assistance information to the requester terminal 13 or the robot 14 via the communication unit 204.

In step S214, work monitoring processing is executed similarly to the processing in step S211. That is, after the assistance of the operation or the work is performed, the work monitoring processing is executed again.

In step S215, the work monitoring unit 222 determines whether or not the work status has been improved, on the basis of a result of the processing in step S214. For example, in a case where the problem recognized in the processing in step S211 is solved, the work monitoring unit 222 determines that the work status has been improved, and the processing proceeds to step S216.

Whereas, in a case where it is determined in step S212 that no problem has occurred, the processing in steps S213 to S215 is skipped, and the processing proceeds to step S216.

In step S216, the intermediary unit 212 determines whether or not cancellation of the remote operation has been requested. In a case where it is determined that cancellation of the remote operation has not been requested, the processing proceeds to step S217.

In step S217, the work monitoring unit 222 determines whether or not the work has been completed. In a case where it is determined that the work has not been completed, the processing returns to step S205.

Thereafter, the processing in step S205 to S217 is repeatedly executed until it is determined that operation competency of the operator has failed to be confirmed in step S210, it is determined that the work status has not been improved in step S215, it is determined that the cancellation of the remote operation is requested in step S216, or it is determined in step S217 that the work has been completed.

As a result, while the operation terminal 12 remotely operates the robot 14, intermediation of the remote operation is executed, and monitoring of the operation competency of the operator (monitoring of the authentication processing and the state of the operator) and monitoring of the work status are continuously executed.

Whereas, in step S217, for example, in a case where all the scheduled work has been completed or in a case where work end time has reached, the work monitoring unit 222 determines that the work has been completed, and the processing proceeds to step S218.

Furthermore, in step S216, in a case where the cancellation of the remote operation is instructed from the operation terminal 12 or the robot 14 via the communication unit 204, the intermediary unit 212 determines that the cancellation of the remote operation is requested, and the processing proceeds to step S218.

Moreover, in step S215, for example, in a case where the problem continues even in a case where a predetermined time elapses after the occurrence of the problem of the work, the work monitoring unit 222 determines that the work status is not improved, and the processing proceeds to step S218.

Furthermore, in a case where it is determined in step S210 that the operation competency has failed to be confirmed, the processing proceeds to step S218.

In step S218, the management server 15 stops intermediation of the remote operation. Specifically, the intermediary unit 212 notifies the operation terminal 12 and the robot 14 of the stop of intermediation of the remote operation via the communication unit 204, and stops intermediation of the remote operation.

Thereafter, the processing of the management server 15 ends.

Whereas, in step S203, in a case where the authentication of the operator fails, the intermediary unit 212 determines not to permit the remote operation, and the processing proceeds to step S219.

In step S219, the intermediary unit 212 notifies the operation terminal 12 and the robot 14 of non-permission of remote operation via the communication unit 204.

Thereafter, the processing of the management server 15 ends.

<Processing of Operation Terminal 12>

Figure 20:
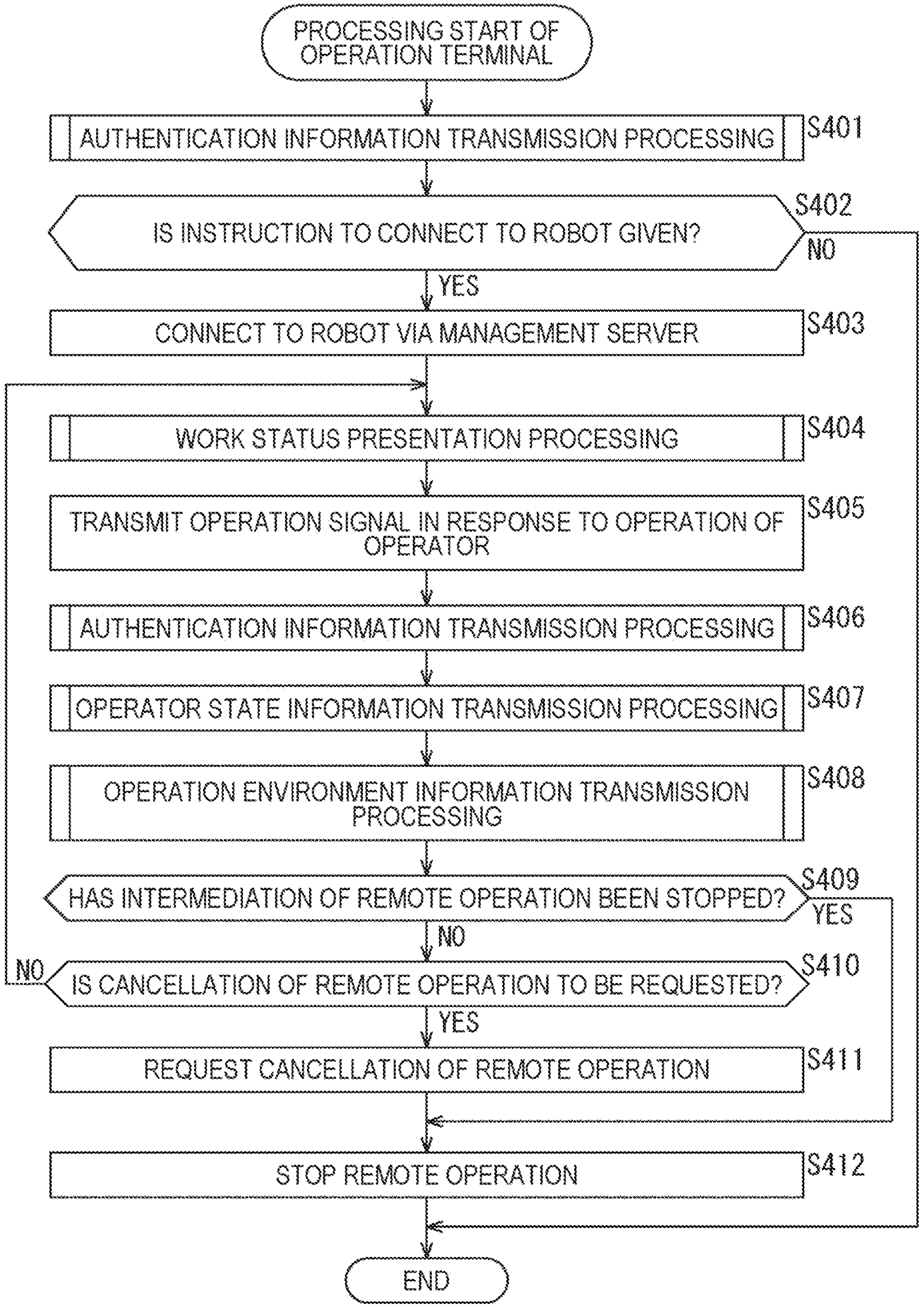
FIG. 20 is a flowchart for explaining processing of an operation terminal in the remote control processing.

Next, with reference to the flowchart of FIG. 20, processing of the operation terminal 12 to be executed corresponding to the processing of the management server 15 of FIG. 10 will be described.

This processing is started, for example, when the control unit 123 of the operation terminal 12 receives a request for transmission of authentication information of the operator from the management server 15 by the processing of step S201 in FIG. 10 via the communication unit 125.

In step S401, the operation terminal 12 executes authentication information transmission processing.

Figure 21:
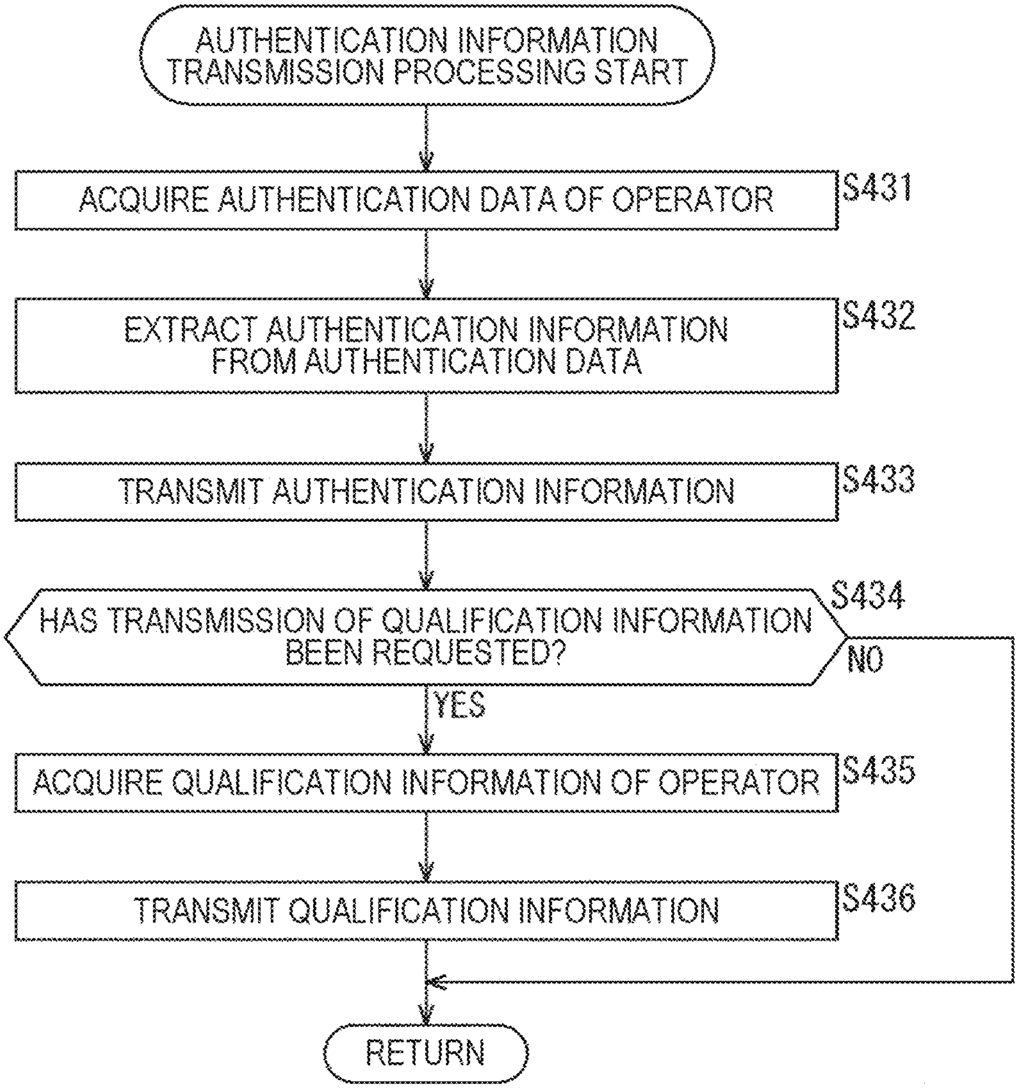
FIG. 21 is a flowchart for explaining details of authentication information transmission processing.

Here, with reference to the flowchart of FIG. 21, details of the authentication information processing will be described.

In step S431, the operation terminal 12 acquires authentication data of the operator. For example, the control unit 123 acquires authentication data including biometric information to be used for biometric authentication of the operator, from sensor data output from the detection unit 122. For example, as the authentication information, face image data obtained by capturing an image of the face of the operator, fingerprint image data obtained by capturing an image of a fingerprint, vein image data obtained by capturing an image of a vein, iris image data obtained by capturing an image of an iris, voice data obtained by recording voice of the operator, and the like are acquired. These pieces of authentication data are acquired by a camera that captures an image of the operator, a biometric sensor attached to the operator, or the like.

In step S432, the control unit 123 extracts the authentication information from the authentication data. For example, the control unit 123 extracts biometric information to be used for biometric authentication of the operator as the authentication information, from the authentication data.

In step S433, the communication unit 125 transmits the authentication information to the management server 15.

In step S434, the control unit 123 determines whether or not transmission of qualification information has been requested. In a case where the control unit 123 receives a request for transmission of the qualification information from the management server 15 via the communication unit 125 by the processing in step S234 in FIG. 12, the control unit 123 determines that the transmission of the qualification information has been requested, and the processing proceeds to step S435.

In step S435, the control unit 123 acquires the qualification information of the operator. For example, the control unit 123 acquires the qualification information input by the user via the input unit 121 or the qualification information stored in the storage unit 126.

In step S436, communication unit 125 transmits the qualification information to the management server 15.

Thereafter, the authentication information transmission processing ends.

Whereas, in a case where it is determined in step S434 that the transmission of the qualification information has not been requested, the processing in steps S435 and S436 is skipped, and the authentication information transmission processing ends.

Returning to FIG. 20, in step S402, the control unit 123 determines whether or not an instruction to connect to the robot 14 is given. In a case where the instruction to connect to the robot 14 is received from the management server 15 via the communication unit 125 in the processing in step S203 in FIG. 10, the control unit 123 determines that the instruction to connect to the robot 14 is given, and the processing proceeds to step S403.

In step S403, the operation terminal 12 is connected to the robot 14 via the management server 15. Specifically, the communication unit 125 executes connection processing between with the robot 14 via the network 21 and the management server 15, under the control of the control unit 123. As a result, the communication unit 125 is connected to the robot 14 via the network 21 and the management server 15, and can communicate with the robot 14.

In step S404, the operation terminal 12 executes work status presentation processing.

Figure 22:
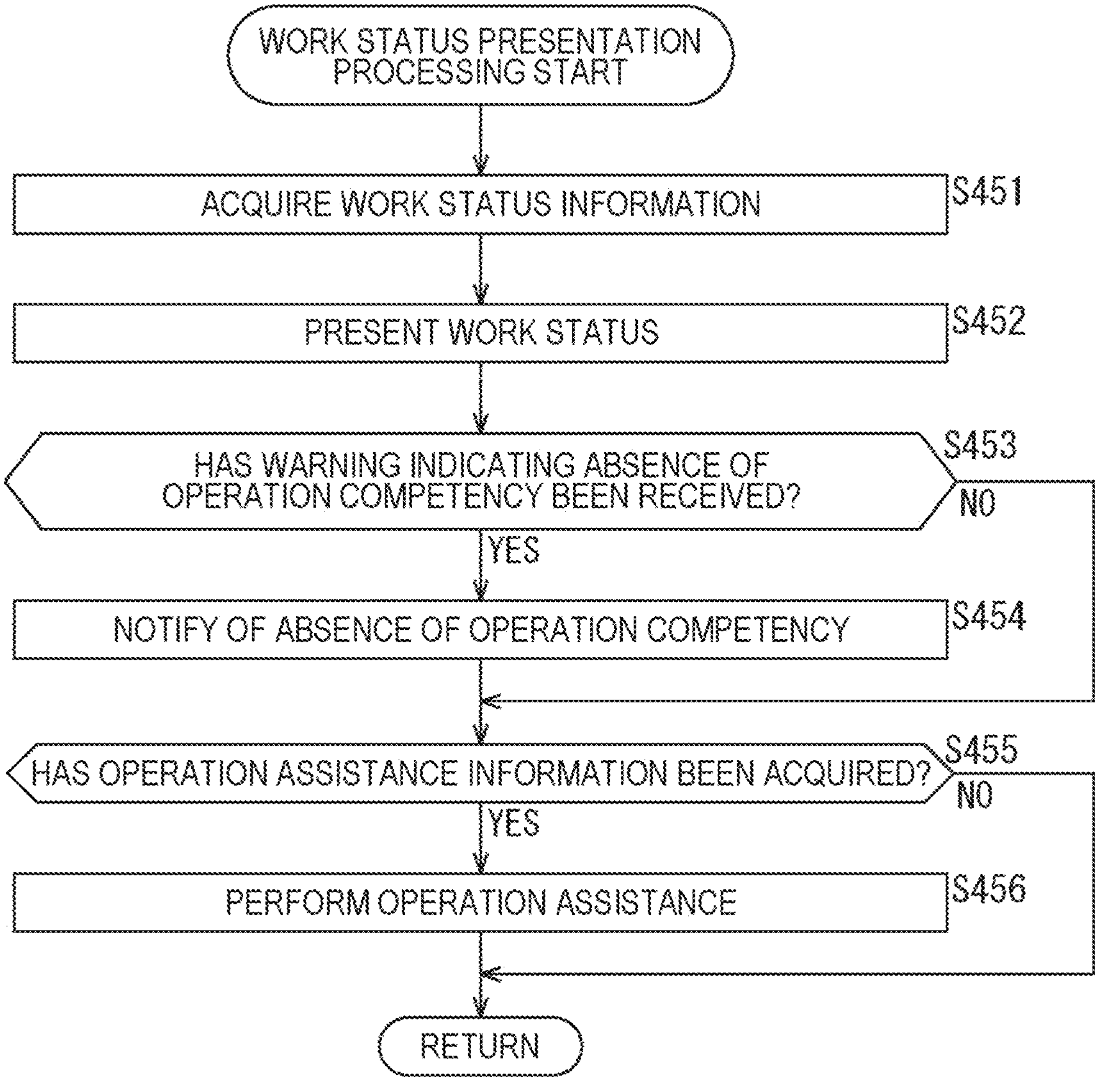
FIG. 22 is a flowchart for explaining details of work status presentation processing.

Here, with reference to the flowchart of FIG. 22, details of the work status presentation processing will be described.

In step S451, the operation terminal 12 acquires work status information. Specifically, the communication unit 125 receives the work status information transmitted from the management server 15 in step S252 of FIG. 13.

In step S452, the operation terminal 12 presents a work status. For example, the output unit 124 displays an image of a work site of the robot 14 on the basis of work image data included in the work status information, under the control of the control unit 123. Furthermore, for example, under the control of the control unit 123, the output unit 124 displays a value of a sensor necessary for the remote operation of the robot 14, on the basis of work sensor data included in the work status information.

In step S453, the control unit 123 determines whether or not a warning indicating absence of operation competency has been received. Specifically, in a case where the operation incompetency warning information transmitted by the management server 15 in step S208 of FIG. 10 is received via the communication unit 125, the control unit 123 determines that the warning of absence of operation competency has been received, and the processing proceeds to step S454.

In step S454, the operation terminal 12 warns that operation competency is absent. For example, under the control of the control unit 123, the output unit 124 warns the operator that operation competency is absent on the basis of the operation incompetency warning information. At this time, a reason why it is determined that operation competency is absent, information necessary for confirming the operation competency, and the like may be presented to the operator.

Thereafter, the processing proceeds to step S455.

Whereas, in a case where it is determined in step S453 that no warning of absence of operation competency has been received, the processing of step S454 is skipped, and the processing proceeds to step S455.

In step S455, the control unit 123 determines whether or not the operation assistance information has been acquired. Specifically, in a case where the operation assistance information transmitted by the management server 15 in step S213 of FIG. 11 described above is received via the communication unit 125, the control unit 123 determines that the operation assistance information has been acquired, and the processing proceeds to step S456.

In step S456, the operation terminal 12 performs operation assistance. For example, in a case where a problem has occurred in the operator or the operation environment, the output unit 124 presents information notifying of occurrence and contents of the problem and information indicating a method for solving the problem (for example, the assist information described above) to the operator by an image or voice, under the control of the control unit 123. For example, in a case where attention of the operator is reduced, the output unit 124 outputs a warning for calling attention of the operator, under the control of the control unit 123. For example, in a case where the attention of the operator is reduced, the input unit 121 vibrates an operation device used by the operator for the remote operation of the robot 14 under the control of the control unit 123.

Thereafter, the work status presentation processing ends.

Whereas, in a case where it is determined in step S455 that the operation assistance information has not been acquired, the processing of step S456 is skipped, and the work status presentation processing ends.

Returning to FIG. 20, in step S405, the operation terminal 12 transmits an operation signal in response to operation of the operator. For example, in a case where the operator performs operation for remotely operating the robot 14 by using the input unit 121, the control unit 123 generates an operation signal for remotely operating the robot 14. The communication unit 125 transmits the operation signal to the management server 15.

In step S406, authentication information transmission processing is executed similarly to the processing in step S401.

In step S407, the operation terminal 12 executes operator state information transmission processing.

Figure 23:
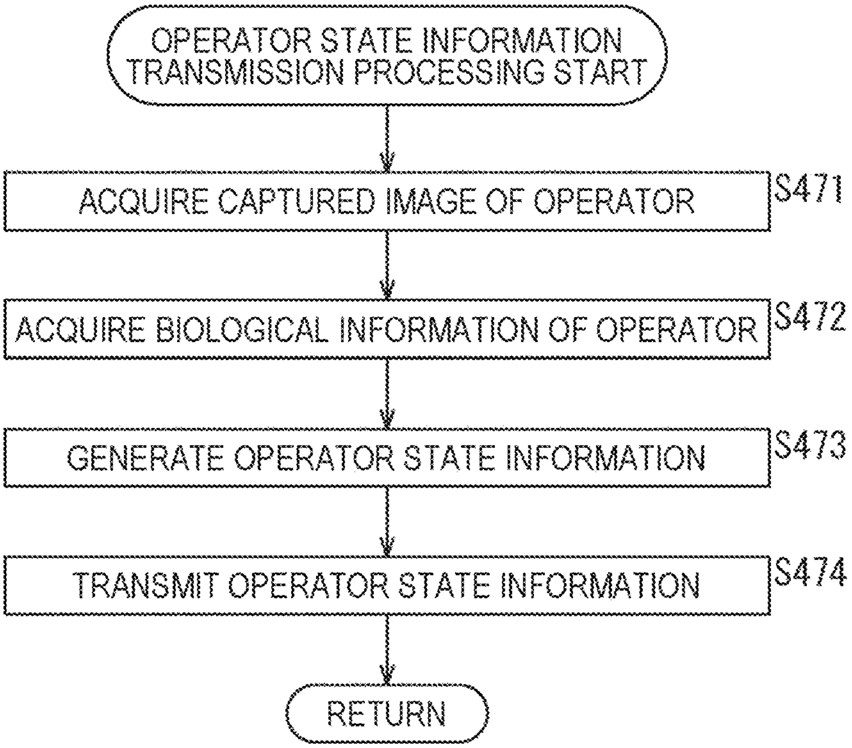
FIG. 23 is a flowchart for explaining details of operator state information transmission processing.

Here, with reference to the flowchart of FIG. 23, details of the operator state information transmission processing will be described.

In step S471, the operation terminal 12 acquires a captured image of the operator. Specifically, for example, the detection unit 122 captures an image of a state where the operator is operating the operation terminal 12, and supplies the obtained operator image data to the control unit 123.

In step S472, the operation terminal 12 acquires biological information of the operator. For example, the control unit 123 extracts operator biological information indicating a state of the operator, from sensor data output from the detection unit 122.

In step S473, the control unit 123 generates operator state information. Specifically, the control unit 123 generates operator state information including the operator image data and the biological information of the operator.

In step S474, the communication unit 125 transmits the operator state information to the management server 15.

Thereafter, the operator state information transmission processing ends.

Returning to FIG. 20, in step S408, the operation terminal 12 executes operation environment information transmission processing.

Figure 24:
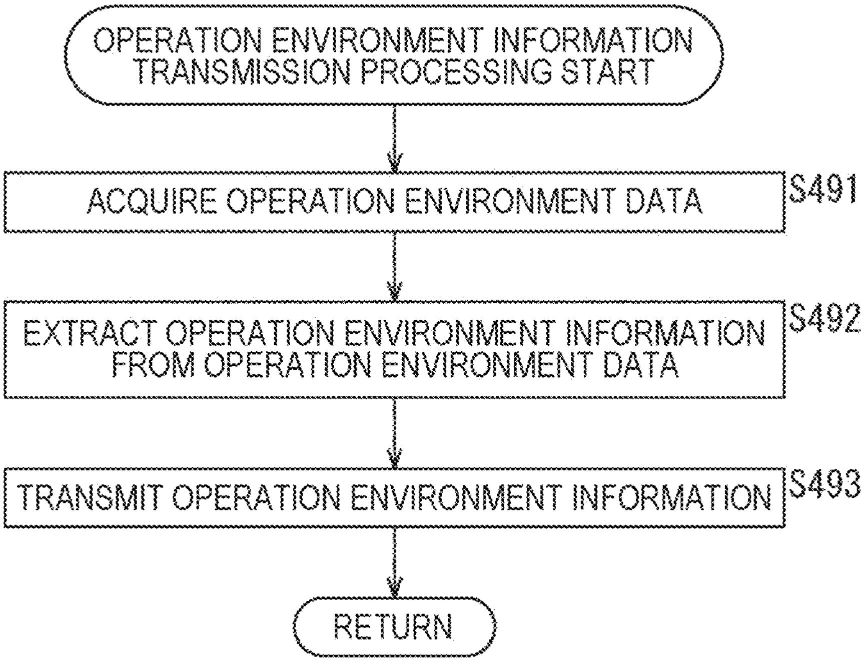
FIG. 24 is a flowchart for explaining details of operation environment information transmission processing.

Here, with reference to the flowchart of FIG. 24, details of the operation environment information transmission processing will be described.

In step S491, the control unit 123 acquires operation environment data. For example, the control unit 123 acquires data regarding identification information, a type, and a specification of the operation terminal 12 from the storage unit 126. For example, the control unit 123 acquires data regarding a position of the operation terminal 12 from the detection unit 122. For example, the control unit 123 acquires data regarding a state of the operation terminal 12. For example, the communication unit 125 actually performs a communication test between with the management server 15 via the network 21, acquires data regarding a communication status between the operation terminal 12 and the management server 15, and supplies the data to the control unit 123.

In step S492, the control unit 123 extracts operation environment information from the operation environment data. The authentication information extracted at this time is, for example, information similar to the operation environment information transmitted from the communication terminal 11 in the processing in step S111 of FIG. 7.

In step S493, the communication unit 125 transmits the operation environment information to the management server 15.

Thereafter, the operation environment information transmission processing ends.

Returning to FIG. 20, in step S409, the control unit 123 determines whether or not intermediation of the remote operation has been stopped. In a case where it is determined that the intermediation of the remote operation has not been stopped, the processing proceeds to step S410.

In step S410, the control unit 123 determines whether or not to request cancellation of the remote operation. In a case where it is determined not to request the cancellation of the remote operation, the processing returns to step S404.

Thereafter, the processing in step S404 to S410 is repeatedly executed until it is determined in step S409 that the intermediation of the remote operation has been stopped or it is determined in step S410 to request the cancellation of the remote operation.

Whereas, in step S410, for example, in a case where the operator performs operation for stopping the remote operation by using the input unit 121, or in a case where a failure occurs and it is difficult to continue the remote operation of the robot 14, the control unit 123 determines to stop the remote operation, and the processing proceeds to step S411.

In step S411, the control unit 123 requests the management server 15 to cancel the remote operation via the communication unit 125.

Thereafter, the processing proceeds to step S412.

Figure 11:
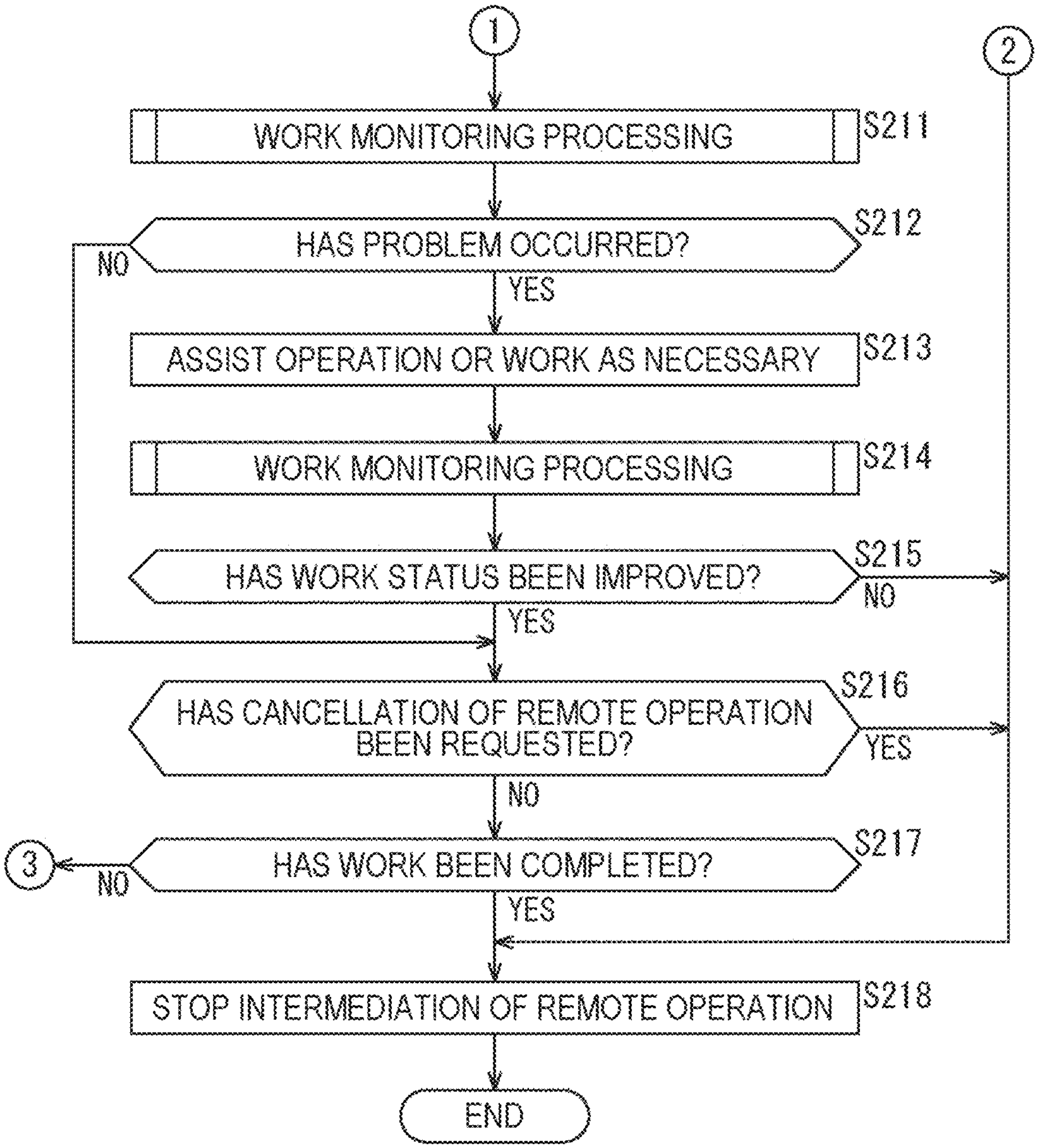
FIG. 11 is a flowchart for explaining processing of the management server in the remote control processing.

Whereas, in step S409, in a case where the control unit 123 is notified of the stop of the intermediation of the remote operation from the management server 15 by the processing in step S218 of FIG. 11 via the communication unit 125, the control unit 123 determines that the intermediation of the remote operation has been stopped, and the processing proceeds to step S412.

In step S412, the control unit 123 stops the remote operation.

Thereafter, the processing of the operation terminal 12 ends.

Whereas, in step S402, in a case where notification of non-permission of the remote operation is given from the management server 15 via the communication unit 204 by the processing in step S219 of FIG. 10, the control unit 123 determines that the connection with the robot 14 has not been instructed, and the processing of the operation terminal 12 ends.

<Processing in Robot 14>

Figure 25:
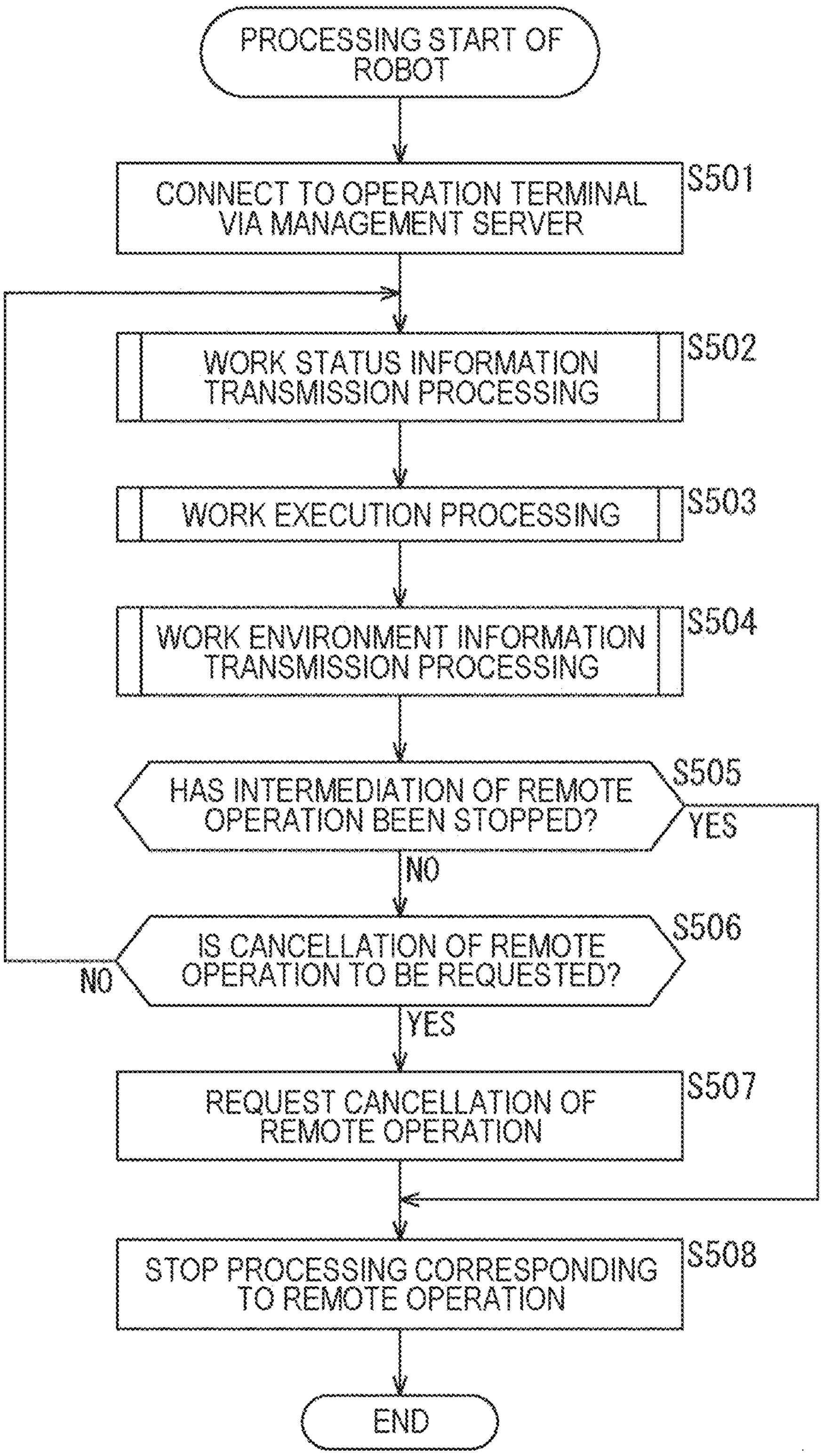
FIG. 25 is a flowchart for explaining processing of a robot in the remote control processing.

Next, with reference to the flowchart of FIG. 25, processing of the robot 14 to be executed corresponding to the processing of the management server 15 of FIG. 10 will be described.

This processing is started, for example, when the control unit 163 of the robot 14 receives a connection instruction between with the operation terminal 12 from the management server 15 by the processing of step S204 in FIG. 10 via the communication unit 166.

In step S501, the robot 14 is connected to the operation terminal 12 via the management server 15. Specifically, the communication unit 166 executes connection processing between with the operation terminal 12 via the network 21 and the management server 15, under the control of the control unit 163. As a result, the communication unit 166 is connected to the operation terminal 12 via the network 21 and the management server 15, and can communicate with the operation terminal 12.

In step S502, the robot 14 executes work status information transmission processing.

Figure 26:
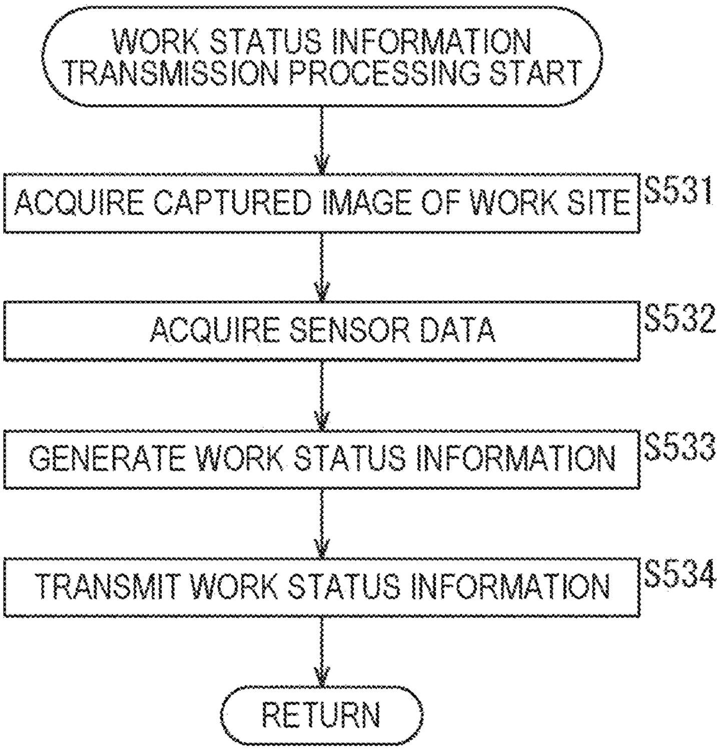
FIG. 26 is a flowchart for explaining details of work status information transmission processing.

Here, with reference to the flowchart of FIG. 26, details of the work status information transmission processing will be described.

In step S531, the robot 14 acquires a captured image of a work site. Specifically, the detection unit 162 captures an image of the work site of the robot 14, and supplies the obtained work image data to the control unit 163.

In step S532, the robot 14 acquires sensor data. Specifically, the control unit 163 acquires work sensor data necessary for the remote operation of the robot 14 from the detection unit 162.

In step S533, the control unit 163 generates work status information. Specifically, the control unit 163 generates work status information including the work image data and the work sensor data.

In step S534, the communication unit 166 transmits the work status information to the management server 15.

Thereafter, the work status information transmission processing ends.

Returning to FIG. 25, in step S503, the robot 14 executes work execution processing.

Figure 27:
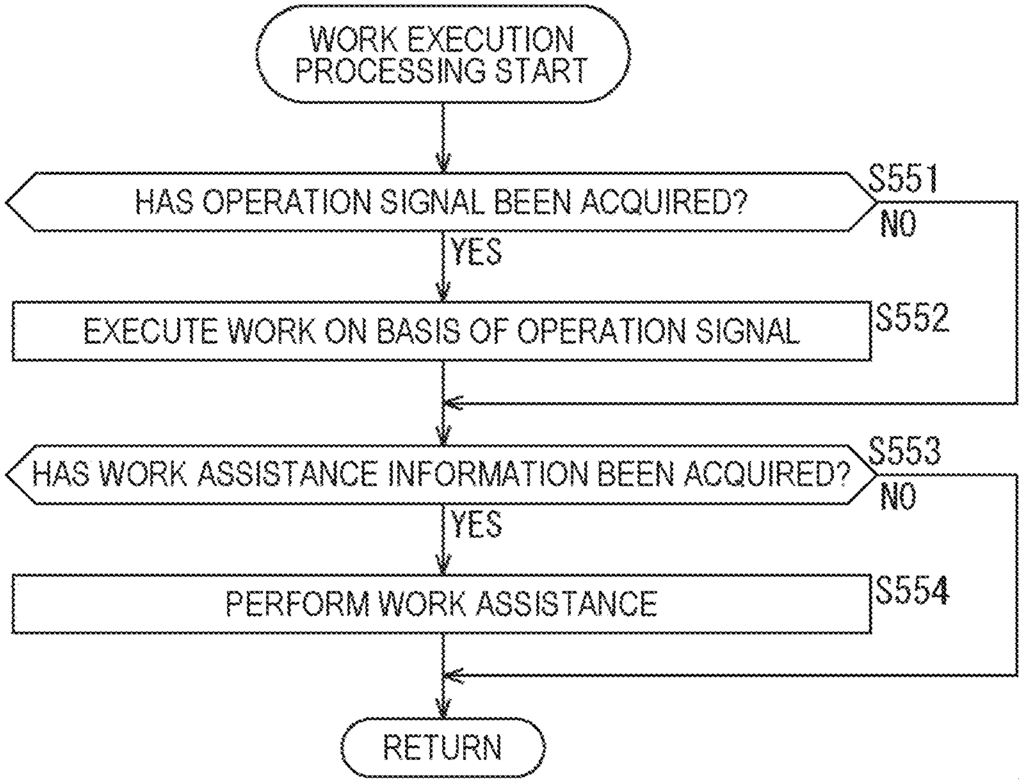
FIG. 27 is a flowchart for explaining details of work execution processing.

Here, with reference to the flowchart of FIG. 27, details of the work execution processing will be described.

In step S551, the control unit 163 determines whether or not an operation signal has been acquired. Specifically, in a case where the operation signal transmitted from the management server 15 in step S254 of FIG. 13 is received via the communication unit 166, the control unit 163 determines that the operation signal has been acquired, and the processing proceeds to step S552.

In step S552, the robot 14 executes work on the basis of the operation signal. For example, the control unit 163 controls the movable unit 164 on the basis of the operation signal, and causes the robot 14 to execute processing corresponding to the operation signal. As a result, the robot 14 is remotely operated using the operation terminal 12, and work requested by the requester is executed.

Thereafter, the processing proceeds to step S553.

Whereas, in a case where it is determined in step S551 that the operation signal has not been acquired, the processing of step S552 is skipped, and the processing proceeds to step S553.

In step S553, the control unit 163 determines whether or not work assistance information has been acquired. Specifically, in a case where the work assistance information transmitted from the management server 15 in step S213 of FIG. 11 is received via the communication unit 166, the control unit 163 determines that the work assistance information has been acquired, and the processing proceeds to step S554.

In step S554, the robot 14 performs work assistance on the basis of the work assistance information. For example, in a case where a problem has occurred in the robot 14 or the work environment, the output unit 165 presents information for notifying of occurrence and contents of the problem or information (for example, the assist information described above) indicating a method for solving the problem, to the requester or the worker at the work site by using an image or voice under the control of the control unit 163.

Thereafter, the work execution processing ends.

Whereas, in a case where it is determined in step S553 that the work assistance information has not been acquired, the processing of step S554 is skipped, and the work execution processing ends.

Returning to FIG. 25, in step S504, the robot 14 executes work environment information transmission processing.

Figure 28:
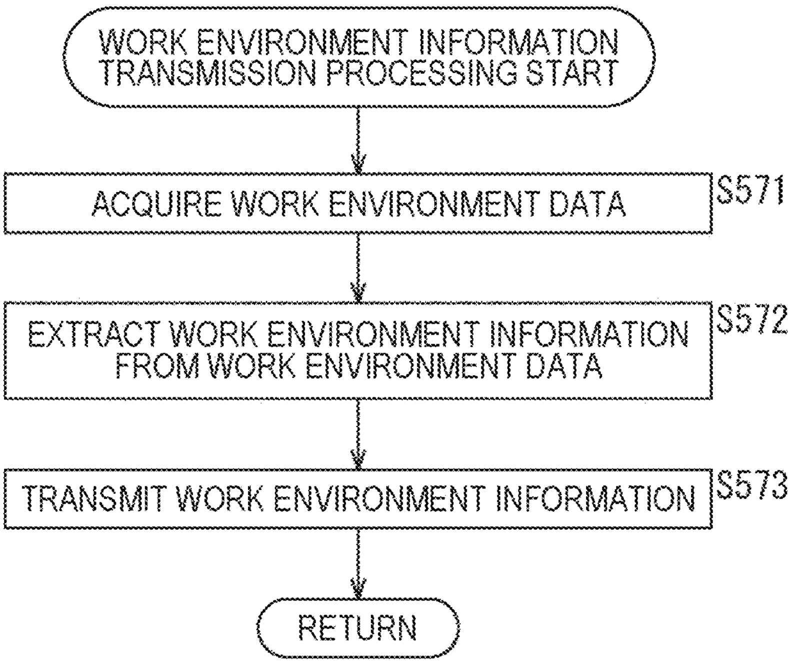
FIG. 28 is a flowchart for explaining details of work environment information transmission processing.

Here, with reference to the flowchart of FIG. 28, details of the work environment information transmission processing will be described.

In step S571, the robot 14 acquires work environment data. For example, the control unit 163 acquires data regarding identification information, a type, and a specification of the robot 14 from the storage unit 167. For example, the control unit 163 acquires data regarding a position of the robot 14 from the detection unit 162. For example, the control unit 163 acquires data regarding an operation status, an error occurrence status, and the like of the robot 14. For example, the control unit 163 acquires data regarding a communication status between the robot 14 and the management server 15 from the communication unit 166.

In step S572, the control unit 163 extracts work environment information from the work environment data. The work environment information extracted at this time is, for example, information similar to the work environment information transmitted from the requester terminal 13 in the processing in step S101 in FIG. 7.

In step S573, the communication unit 166 transmits the work environment information to the management server 15.

Thereafter, the work environment information transmission processing ends.

Returning to FIG. 25, in step S505, the control unit 163 determines whether or not intermediation of the remote operation has been stopped. In a case where it is determined that the intermediation of the remote operation has not been stopped, the processing proceeds to step S506.

In step S506, the control unit 163 determines whether or not to request cancellation of the remote operation. In a case where it is determined not to request the cancellation of the remote operation, the processing returns to step S502.

Thereafter, the processing in step S502 to S506 is repeatedly executed until it is determined in step S505 that the intermediation of the remote operation has been stopped or it is determined in step S506 to request the cancellation of the remote operation.

Whereas, in step S506, for example, in a case where the requester performs operation for stopping the remote operation by using the input unit 161, or in a case where a failure occurs and it is difficult to continue the operation of the robot 14, the control unit 163 determines to stop the remote operation, and the processing proceeds to step S507.

In step S507, the control unit 163 requests the management server 15 to cancel the remote operation.

Thereafter, the processing proceeds to step S508.

Whereas, in step S505, in a case where the control unit 163 is notified of the stop of the intermediation of the remote operation from the management server 15 by the processing in step S218 of FIG. 11 via the communication unit 166, the control unit 163 determines that the intermediation of the remote operation has been stopped, and the processing proceeds to step S508.

In step S508, the control unit 163 stops the processing corresponding to the remote operation.

Thereafter, the processing of the robot 14 ends.

<Post-Work Processing>

Figure 29:
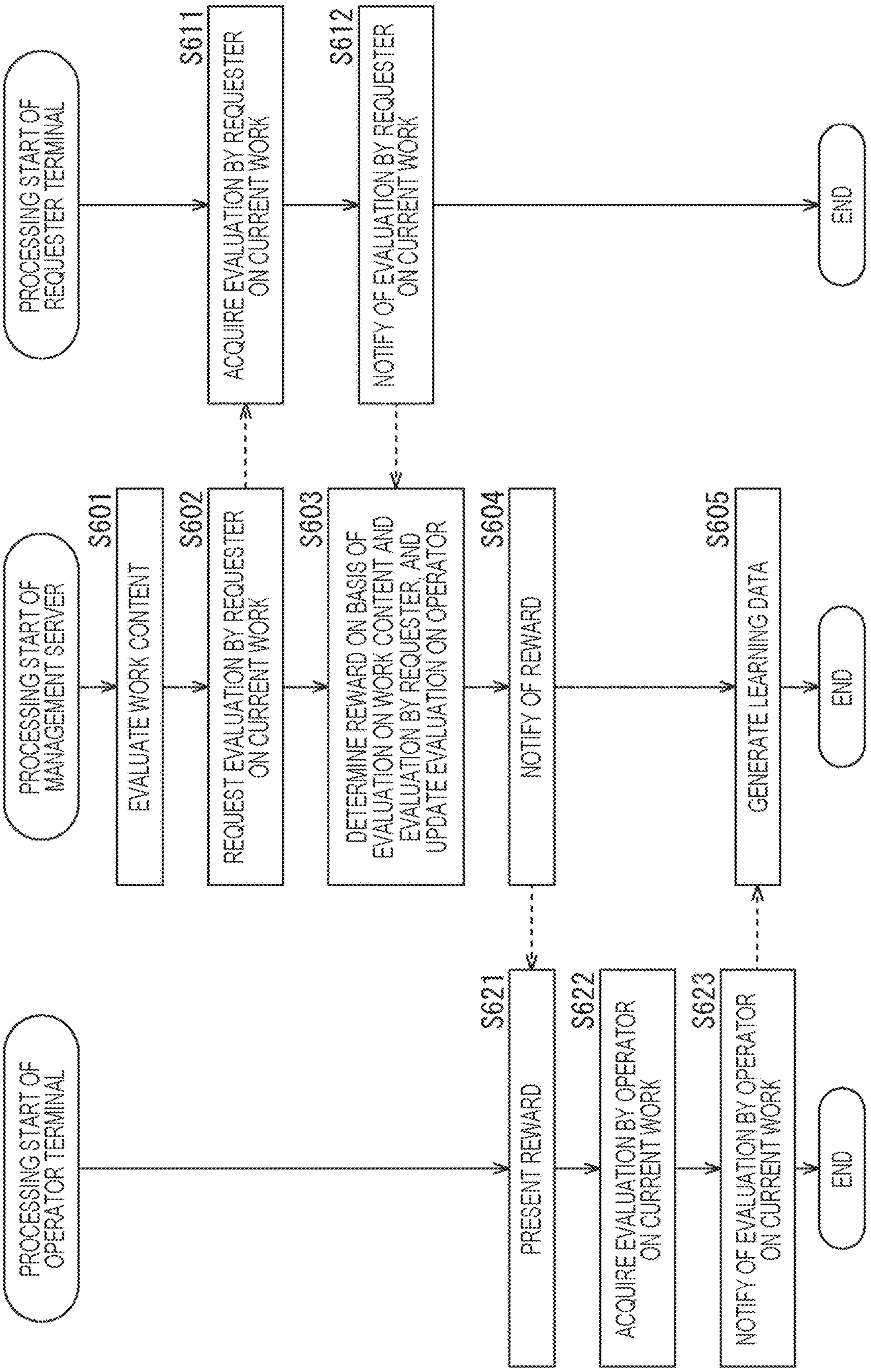
FIG. 29 is a flowchart for explaining post-work processing.

Next, with reference to a flowchart of FIG. 29, post-work processing executed by the information processing system 1 will be described.

This processing is executed, for example, after the above-described processing in FIGS. 10 to 28 is completed.

In step S601, the management server 15 evaluates a work content. For example, the evaluation unit 214 evaluates a work content executed by the operator by the remote operation on the basis of monitoring results and the like obtained during the work by the operator monitoring unit 221 and the work monitoring unit 222. The work content is evaluated by, for example, one or more of a speed, accuracy, and an achievement rate of the work, and quality of a deliverable obtained by the work.

Note that, for example, in a case where a defective product is generated, the evaluation unit 214 may add such information to a record of the operator who is a target of the operator DB so that the operator who has generated the defective product and the operation content can be specified. As a result, traceability is improved in investigation of a cause of a defective product or the like.

In step S602, the evaluation unit 214 of the management server 15 requests the requester terminal 13 for evaluation by the requester on the current work via the communication unit 204.

On the other hand, in step S611, the requester terminal 13 acquires evaluation by the requester on the current work. For example, the output unit 144 displays an input screen for inputting evaluation by the requester on the current work, under the control of the control unit 143.

The evaluation by the requester on the current work includes, for example, evaluation on the operator and evaluation on the work content executed by the operator. The evaluation on the operator includes, for example, evaluation on a response, ability (for example, skill level), and the like of the operator. The evaluation on the work content includes, for example, evaluation on work quality and the like.

On the other hand, the requester inputs the evaluation on the current work to the requester terminal 13 by using the input unit 141.

In step S612, the control unit 143 of the requester terminal 13 notifies the management server 15 of the evaluation by the requester on the current work via the communication unit 145.

On the other hand, in step S603, the management server 15 determines a reward on the basis of the evaluation on the work content and the evaluation by the requester, and updates the evaluation on the operator.

For example, in a case where a work achievement rate is less than 100%, that is, in a case where the work requested to the operator has not been completed, the evaluation unit 214 reduces the reward to be given to the operator from the reward presented at the time of requesting the work, on the basis of the work achievement rate.

For example, in a case where the achievement rate of the work is 100%, the evaluation unit 214 determines the reward on the basis of the evaluation by the requester on the work. For example, in a case where the evaluation by the requester is 100% or less, the evaluation unit 214 determines the reward to be given to the operator as the reward presented at the time of requesting the work. For example, in a case where the evaluation by the requester exceeds 100%, the evaluation unit 214 determines the reward to be given to the operator as a reward of 120% of the reward presented at the time of requesting the work.

For example, the evaluation unit 214 updates ability information (for example, a skill level or the like) of the operator as a target of the operator DB, on the basis of the evaluation on the work content.

For example, the evaluation unit 214 updates the evaluation score of the operator as a target of the operator DB on the basis of the evaluation by the requester.

In step S604, the evaluation unit 214 notifies the communication terminal 11 of the reward via the communication unit 204.

On the other hand, in step S621, the communication terminal 11 presents the reward. For example, the output unit 104 presents the reward the management server 15 has notified of, to the operator under the control of the control unit 103.

In step S622, the communication terminal 11 acquires the evaluation by the operator on the current work. Specifically, the output unit 104 displays a screen for inputting the evaluation by the operator on the current work under the control of the control unit 103.

The evaluation by the operator on the current work includes, for example, evaluation on the requester and evaluation on the requested work. The evaluation on the requester includes, for example, evaluation on a response, a reward, and the like of the requester. The evaluation on the requested work includes, for example, an evaluation on a difficulty level, a work environment, and the like of the work.

On the other hand, the operator inputs the evaluation on the current work to the communication terminal 11 by using the input unit 101.

In step S623, the control unit 103 notifies the management server 15 of the evaluation by the operator on the current work via the communication unit 105.

On the other hand, in step S605, the management server 15 generates learning data. Specifically, the learning unit 215 generates learning data that includes remote operation data accumulated in the storage unit 205 in the current work as input data and is provided with a label based on the evaluation by the requester and the evaluation by the operator on the work. For example, the learning unit 215 assigns, to the learning data, a label indicating whether the work has succeeded or failed or a label obtained by quantifying the quality of the work on the basis of the evaluation by the requester and the evaluation by the operator on the work. The learning unit 215 accumulates the generated learning data in the storage unit 205.

As a result, learning data including the remote operation data of a case where the work has succeeded or learning data including the remote operation data of a case where the work has failed is accumulated in the storage unit 205.

Note that the learning unit 215 learns a learning model that automates work of the robot 14, by using the learning data accumulated in the storage unit 205. Then, by applying the obtained learning model to the robot 14, the robot 14 can automatically perform predetermined work without requesting remote operation.

As described above, matching between the operator who performs the remote operation and the robot 14 is appropriately performed. As a result, quality of work performed by the remote operation is improved, and a satisfaction level of the requester is improved. Furthermore, since the work according to the ability of the operator is matched, the satisfaction level is improved.

Furthermore, since the operation competency and the work status are constantly monitored, the remote operation of the robot 14 is appropriately executed. For example, the operator executes the remote operation while sufficiently exerting the ability without cutting corners or switching, and the work quality is further improved. Moreover, in a case where the quality of the work cannot be guaranteed due to lack of the ability of the operator or the like, it is possible to take measures such as changing the operator.

Furthermore, every time each operator performs work by remote operation, learning data based on the remote operation is accumulated. Then, the learning model is learned using the accumulated learning data, and work of the robot 14 can be automated using the generated learning model.

Second Embodiment of Processing of Information Processing System 1

Figure 30:
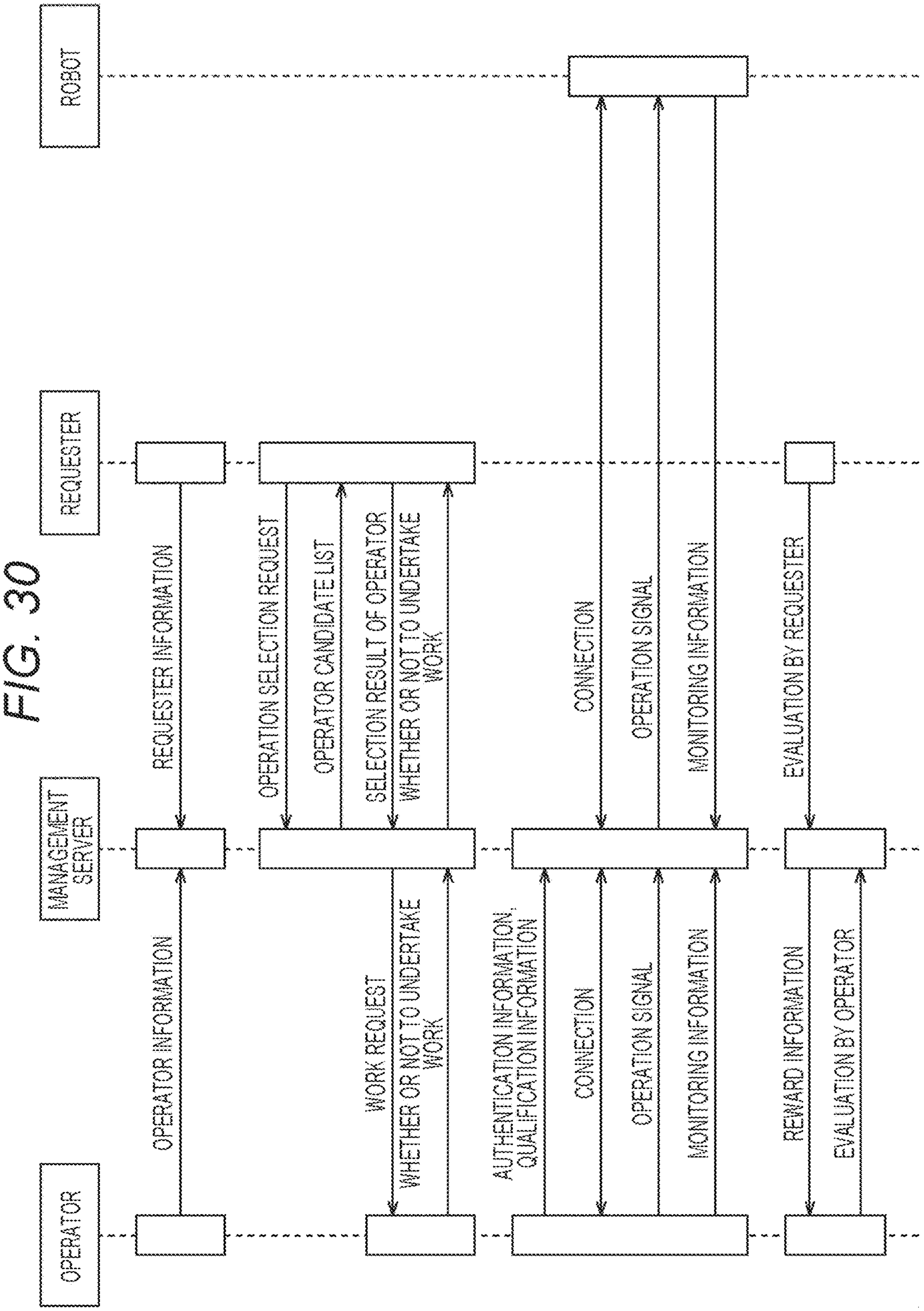
FIG. 30 is a sequence diagram for explaining an outline of a second embodiment of processing of an information processing system.

Next, with reference to FIGS. 30 to 32, a second embodiment of processing of the information processing system 1 will be described.

The second embodiment of the processing of the information processing system 1 is different from the first embodiment in matching processing.

Outline of Second Embodiment of Processing of Information Processing System 1

First, with reference to a sequence diagram of FIG. 30, an outline of the second embodiment of the processing of the information processing system 1 will be described. The sequence diagram of FIG. 30 illustrates an outline of processing of the information processing system 1 similarly to the sequence diagram of FIG. 6.

First, matching processing between the operator (operation terminal 12) and the requester (robot 14) is executed.

Specifically, for example, the requester transmits requester information regarding the requester, to the management server 15.

The operator transmits operator information regarding the operator to the management server 15.

On the other hand, the management server 15 registers the requester information and the operator information.

The processing up to this point is similar to that of the first embodiment.

Next, the requester requests the management server 15 to select an operator to execute a desired work.

The management server 15 extracts candidates of the operator to which the work is to be requested, and generates an operator candidate list in which the operator candidates are listed. The management server 15 transmits the operator candidate list to the requester.

The requester selects an operator to which the work is to be requested, from among the operator candidates indicated in the operator candidate list. The operator notifies the management server 15 of a selection result of the operator.

The management server 15 requests work to the operator selected by the requester.

The operator determines whether or not to undertake the requested work. The operator notifies the management server 15 of whether not to undertake the work.

The management server 15 notifies the requester of whether or not the operator selected by the requester undertakes the work.

In a case where the operator undertakes the work, remote control processing and post-work processing are executed next. Since the remote control processing and the post-work processing are similar to those of the first embodiment, the description thereof will be omitted.

Whereas, in a case where the operator does not undertake the work, the processing is performed again from the processing in which the requester selects the operator from the operator candidate list.

Second Embodiment of Matching Processing

Next, with reference to a flowchart of FIG. 31, matching processing according to the second embodiment will be described.

In step S701, the requester terminal 13 transmits requester information to the management server 15 similarly to the processing in step S101 of FIG. 7.

In step S711, the communication terminal 11 transmits operator information to the management server 15 similarly to the processing in step S111 in FIG. 7.

In step S721, the management server 15 registers the requester information and the operator information similarly to the processing in step S121 of FIG. 7.

In step S702, the requester terminal 13 requests the management server 15 to select an operator similarly to the processing in step S102 of FIG. 11.

On the other hand, in step S722, the management server 15 executes operator selection processing.

Here, with reference to the flowchart of FIG. 32, the operator selection processing will be described in detail.

Figure 9:
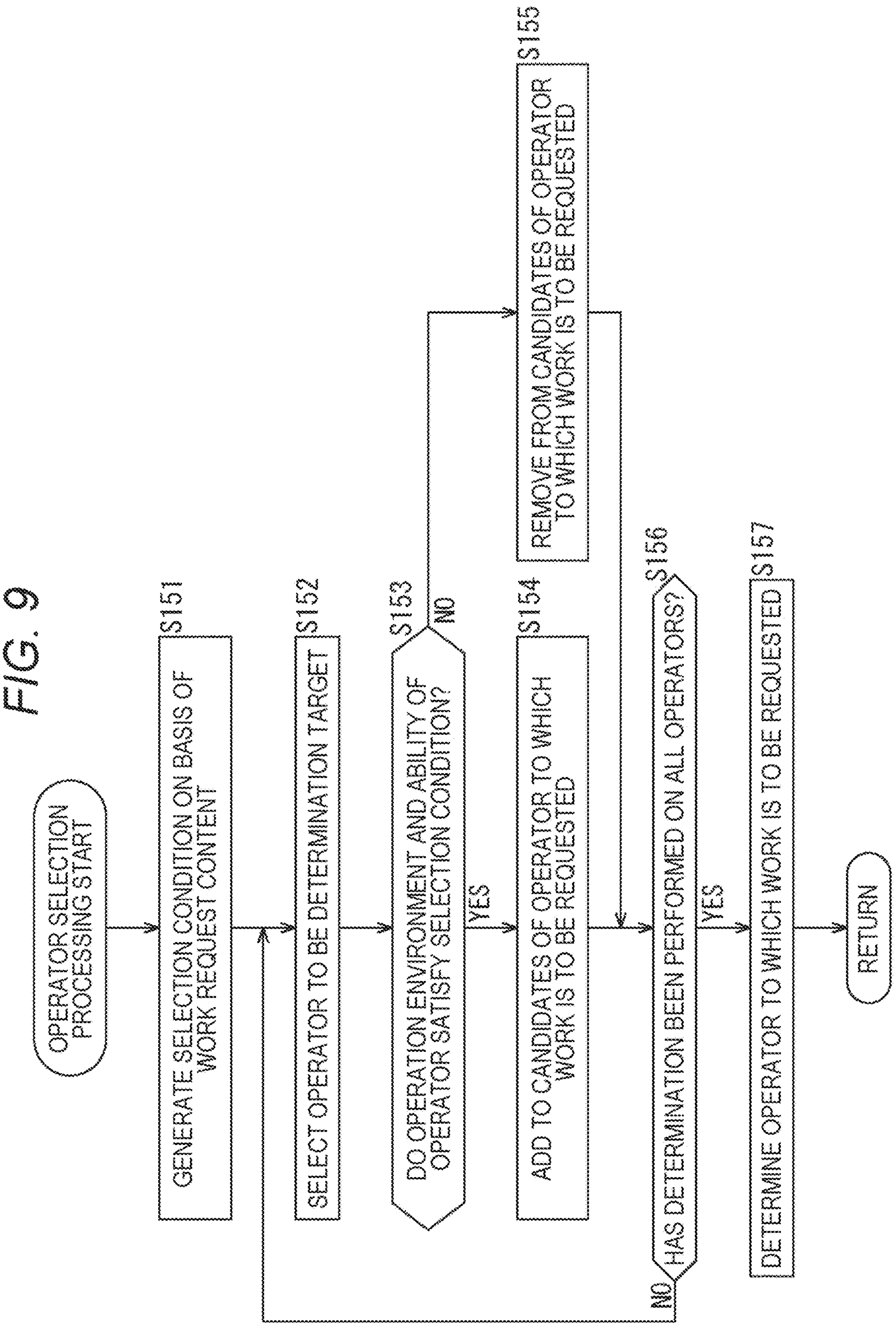
FIG. 9 is a flowchart for explaining details of operator selection processing.

In steps S751 to S756, processing similar to that in steps S151 to S156 in FIG. 9 is executed. As a result, operator candidates are extracted from among the operators registered in the operator DB.

In step S757, the matching unit 211 generates an operator candidate list. That is, the matching unit 211 generates an operator candidate list in which the extracted candidates of the operator are listed.

Note that, for example, the matching unit 211 may extract a predetermined number of operators from an operator having the highest matching degree or extract operators with a matching degree equal to or greater than a predetermined threshold value, to generate the operator candidate list in which the extracted operator candidates are listed.

The operator candidate list includes, for example, information regarding ability and an operation environment of each operator candidate. Note that, for example, the operator candidate list may include a matching degree and an evaluation score of each operation candidate.

Thereafter, the operator selection processing ends.

Returning to FIG. 31, in step S723, the matching unit 211 transmits the operator candidate list to the requester terminal 13 via the communication unit 204. As a result of this processing, the matching unit 211 controls presentation of the extracted operator candidates to the requester.

On the other hand, in step S703, the requester terminal 13 presents the operator candidate list. Specifically, the communication unit 145 receives the operator candidate list from the management server 15. The output unit 144 presents the operator candidate list to the requester under the control of the control unit 143. As a result, the operator candidates extracted by the management server 15 are recommended to the requester.

In step S704, the requester terminal 13 acquires and notifies of a selection result of the operator. Specifically, the requester selects an operator to which the work is to be requested from the operator candidate list, and inputs a selection result of the operator to the requester terminal 13 by using the input unit 141. The control unit 143 notifies the management server 15 of a selection result of the operator via the communication unit 145.

On the other hand, in step S724, the management server 15 offers the selected operator to undertake the work. Specifically, the matching unit 211 transmits work request information to the communication terminal 11 of the operator selected by the operator via the communication unit 204, and inquires whether or not to undertake the work.

On the other hand, in step S712, the communication terminal 11 presents a work request similarly to the processing in step S112 in FIG. 7.

In step S713, the communication terminal 11 acquires whether or not the work is to be undertaken similarly to the processing in step S113 of FIG. 7, and notifies the management server 15 of whether or not the work is to be undertaken.

On the other hand, in step S725, the management server 15 executes authentication of the operator similarly to the processing in step S124 of FIG. 7.

In step S726, the management server 15 notifies of whether or not the operator undertakes the work. Specifically, in a case where the operator undertakes the work and the authentication of the operator is successful, the matching unit 211 notifies the requester terminal 13 via the communication unit 204 that the operator undertakes the work. Whereas, in a case where the operator does not undertake the work or in a case where the authentication of the operator fails, the matching unit 211 notifies the requester terminal 13 via the communication unit 204 that the operator does not undertake the work.

On the other hand, in step S705, the requester terminal 13 presents whether or not the operator undertakes the work. Specifically, the output unit 144 presents to the requester whether or not the operator undertakes the work, under the control of the control unit 143.

Note that, in a case where the operator selected by the requester cannot undertake the work, for example, the processing in and after step S703 is executed. As a result, an operator is reselected from the operator candidate list by the requester, and the selected operator is offered to undertake the work.

Third Embodiment of Processing of Information Processing System 1

Figure 33:
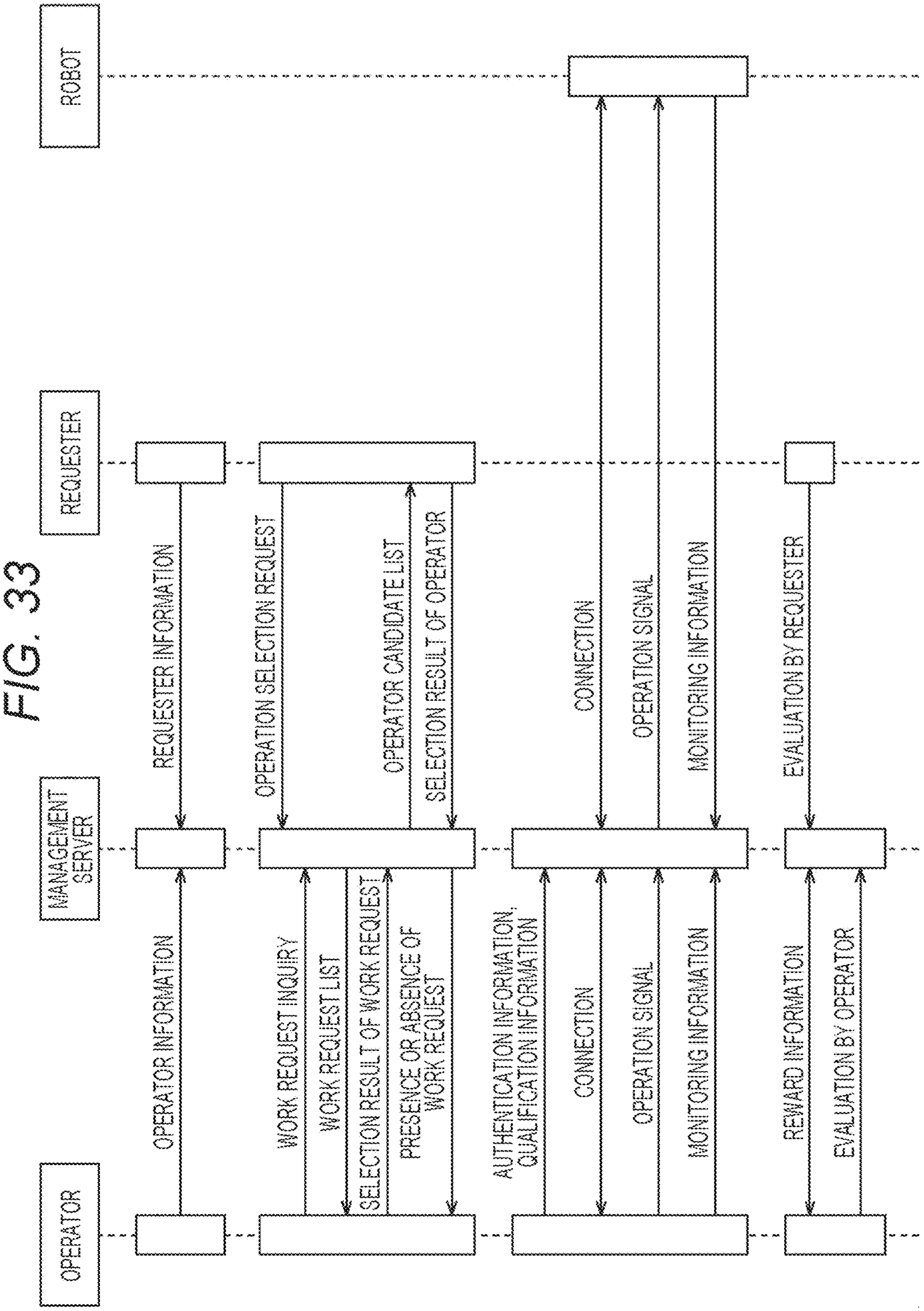
FIG. 33 is a sequence diagram for explaining an outline of a third embodiment of processing of an information processing system.
Figure 34:
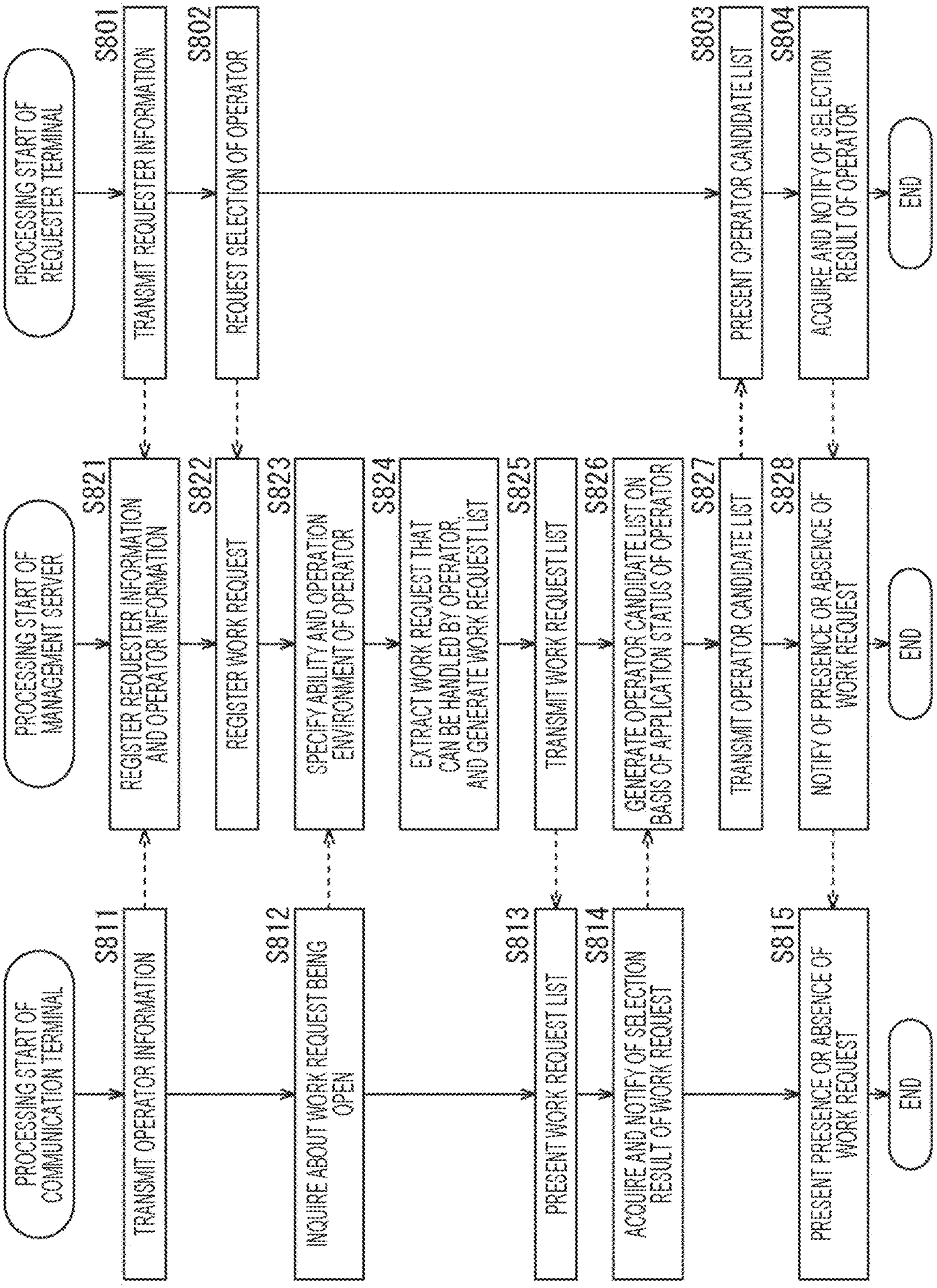
FIG. 34 is a flowchart for explaining the third embodiment of matching processing.

Next, with reference to FIGS. 33 and 34, a third embodiment of processing of the information processing system 1 will be described.

The third embodiment of the processing of the information processing system 1 is different from the first embodiment and the second embodiment in matching processing.

Outline of Third Embodiment of Processing of Information Processing System 1

First, with reference to a sequence diagram of FIG. 33, an outline of the third embodiment of the processing of the information processing system 1 will be described. The sequence diagram of FIG. 30 illustrates an outline of processing of the information processing system 1 similarly to the sequence diagrams of FIGS. 6 and 30.

First, matching processing between the operator (operation terminal 12) and the requester (robot 14) is executed.

Specifically, for example, the requester transmits requester information regarding the requester, to the management server 15.

The operator transmits operator information regarding the operator to the management server 15.

On the other hand, the management server 15 registers the requester information and the operator information.

The processing so far is similar to that of the first embodiment and the second embodiment.

Next, the requester requests the management server 15 to select an operator to execute a desired work.

On the other hand, the management server 15 registers a request for work for which selection of an operator has been requested.

Furthermore, the operator inquires of the management server 15 about a work request for which an operator is currently being sought.

On the other hand, the management server 15 extracts work requests that can be handled by an operator on the basis of ability and an operation environment of the operator, and generates a work request list in which the extracted work requests are listed. The management server 15 transmits the work request list to the operator.

On the other hand, the operator selects a desired work request from the work request list. The operator notifies the management server 15 of a selection result of the work request.

On the other hand, the management server 15 generates an operator candidate list in which operators who have applied for the work request for which the requester has requested selection of an operator are listed. The management server 15 transmits the operator candidate list to the requester.

On the other hand, the requester selects an operator to which the work is to be requested, from the operator candidate list. The requester notifies the management server 15 of a selection result of the operator.

On the other hand, the management server 15 notifies each operator who has applied for the work request of the presence or absence of the work request, on the basis of the selection result of the operator by the requester. That is, the operator is notified that the work is requested in a case where the operator is selected by the requester, and the operator is notified that the work is not requested in a case where the operator is not selected by the requester.

In a case where the work is requested to the operator, remote control processing and post-work processing are executed next. Since the remote control processing and the post-work processing are similar to those of the first embodiment and the second embodiment, the description thereof will be omitted.

As described above, the management server 15 can appropriately recommend the operator candidates to the requester. Furthermore, the requester can select a desired operator from among a plurality of operator candidates recommended from the management server 15.

Third Embodiment of Matching Processing

Next, with reference to a flowchart of FIG. 34, matching processing according to the third embodiment will be described.

In step S801, the requester terminal 13 transmits requester information to the management server 15 similarly to the processing in step S101 of FIG. 7.

In step S811, the communication terminal 11 transmits operator information to the management server 15 similarly to the processing in step S111 in FIG. 7.

In step S821, the management server 15 registers requester information and operator information similarly to the processing in step S121 of FIG. 7.

In step S802, the requester terminal 13 requests the management server 15 to select an operator similarly to the processing in step S102 of FIG. 11.

On the other hand, in step S822, the management server 15 registers a work request. Specifically, the communication unit 204 receives the work request information from the requester terminal 13. The matching unit 211 registers the newly received work request information in the work request DB accumulated in the storage unit 205.

In step S812, the communication terminal 11 inquires about a work request being open.

For example, the operator uses the input unit 101 to input, to the communication terminal 11, an instruction for an inquiry about a work request being open.

On the other hand, the control unit 103 generates work request inquiry information for inquiring about a work request being open. The work request inquiry information includes, for example, identification information and authentication information of the operator. The authentication information is generated by processing similar to step S113 in FIG. 7. The communication unit 105 transmits the work request inquiry information to the management server 15.

On the other hand, in step S823, the management server 15 specifies ability and an operation environment of the operator. Specifically, the communication unit 204 receives the work request inquiry information from the communication terminal 11. The matching unit 211 executes authentication of the operator on the basis of authentication information included in the work request inquiry information and authentication information registered in the operator DB. In a case where the authentication of the operator is successful, the matching unit 211 specifies the ability and the operation environment of the operator on the basis of the operator DB.

In step S824, the matching unit 211 extracts work requests that can be handled by an operator, and generates a work request list. Specifically, on the basis of the work request DB, the matching unit 211 extracts work requests that can be handled with ability and an operation environment of the operator, from the work requests for which an operator is being sought. In other words, the matching unit 211 extracts work requests for which the ability and the operation environment of the operator satisfy a required selection condition. The matching unit 211 generates a work request list in which work request information corresponding to the extracted work requests is listed.

In step S825, the matching unit 211 transmits the work request list to the communication terminal 11 via the communication unit 204. As a result of this processing, the matching unit 211 controls presentation of the extracted work request to the operator.

On the other hand, in step S813, the communication terminal 11 presents the work request list. Specifically, the communication unit 105 receives the work request list from the management server 15. The output unit 104 presents the work request list to the operator under the control of the control unit 103. As a result, the work request extracted by the management server 15 is recommended to the operator.

In step S814, the communication terminal 11 acquires and notifies of a selection result of the work request.

Specifically, the operator uses the input unit 101 to select a work request to apply from the presented work request list.

On the other hand, the control unit 103 notifies the management server 15 of the selection result of the work request via the communication unit 105.

In step S826, the management server 15 generates an operator candidate list on the basis of an application status of the operator. Specifically, the matching unit 211 generates an operator candidate list in which all the operators who have applied are listed for the work request selected by the operator in the processing in step S814.

Figure 32:
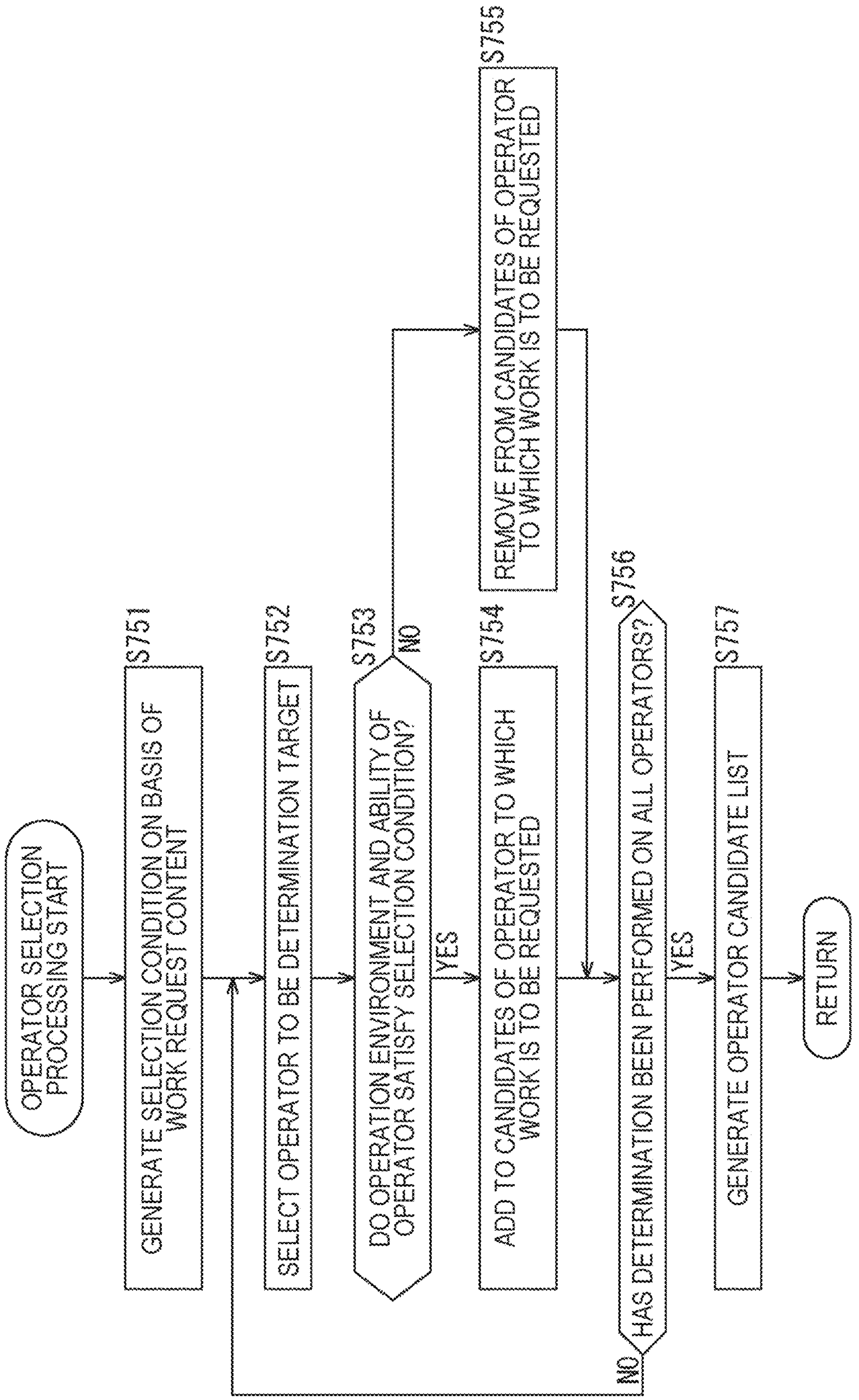
FIG. 32 is a flowchart for explaining details of operator selection processing.

Note that the contents of the operator candidate list are similar to those of the operator candidate list generated in the processing of step S757 in FIG. 32.

Figure 31:
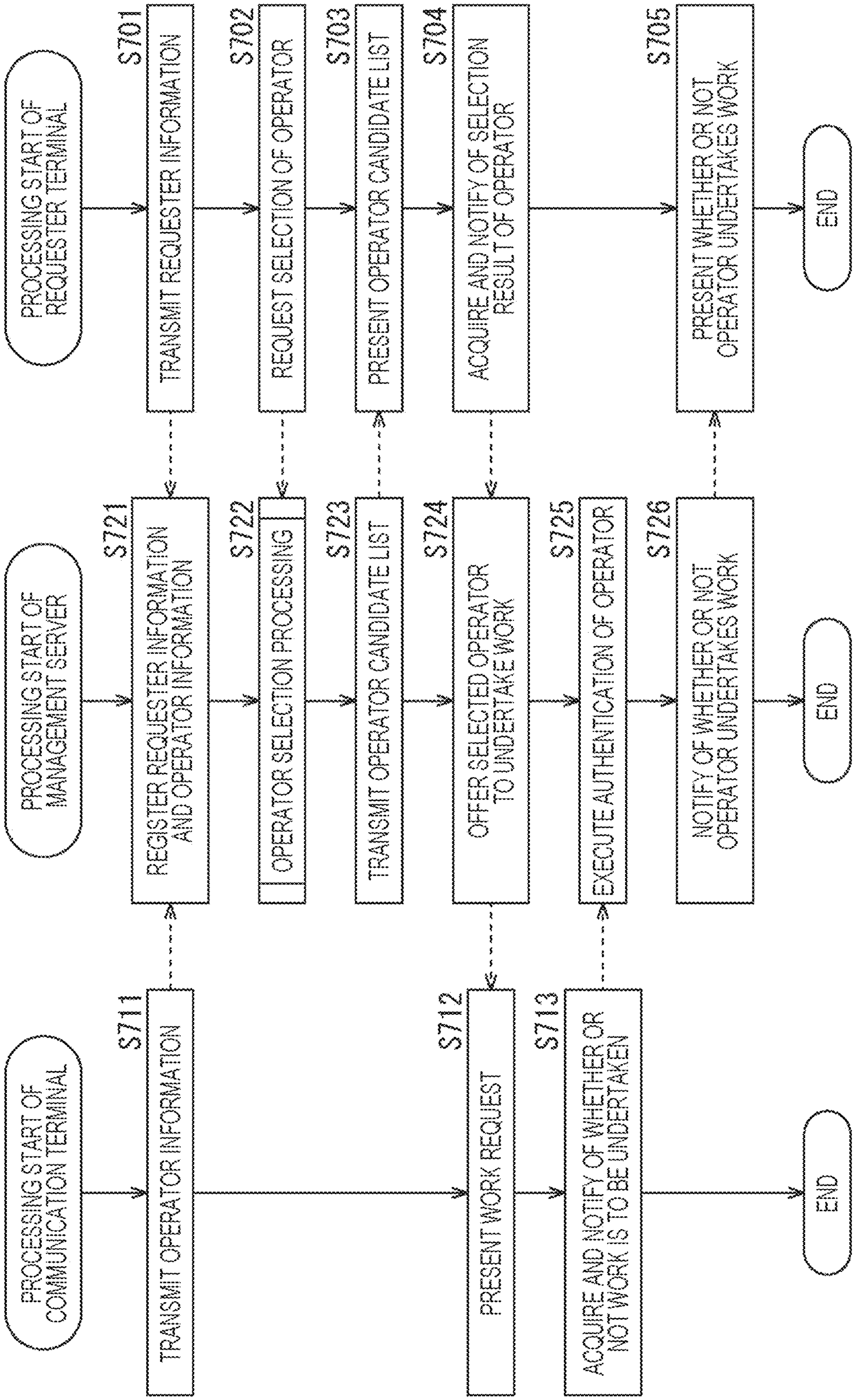
FIG. 31 is a flowchart for explaining the second embodiment of matching processing.

In step S827, the management server 15 transmits the operator candidate list to the requester terminal 13, similarly to the processing in step S723 of FIG. 31.

On the other hand, in step S803, the requester terminal 13 presents the operator candidate list similarly to the processing in step S703 of FIG. 31.

In step S804, the requester terminal 13 acquires the selection result of the operator and notifies the management server 15 of the selection result, similarly to the processing in step S804 in FIG. 31.

On the other hand, in step S828, the management server 15 notifies of the presence or absence of the work request. Specifically, on the basis of the selection result of the operator of which the requester terminal 13 has notified, the matching unit 211 notifies the communication terminal 11 of each operator who has applied for the target work of the presence or absence of a work request (whether or not the work is requested).

On the other hand, in step S815, the communication terminal 11 presents the presence or absence of the work request. Specifically, the output unit 104 presents the presence or absence of a work request to the operator under the control of the control unit 103.

As described above, the management server 15 can appropriately recommend work requests that can be handled by an operator. Furthermore, the operator can select a desired work request from the work requests that can be handled by the operator. Moreover, the requester can select a desired operator from among a plurality of operator candidates who have applied for the work request.

3. Second Embodiment

Next, with reference to FIG. 35, the second embodiment of the present technology will be described.

Configuration Example of Information Processing System 301

Figure 35:
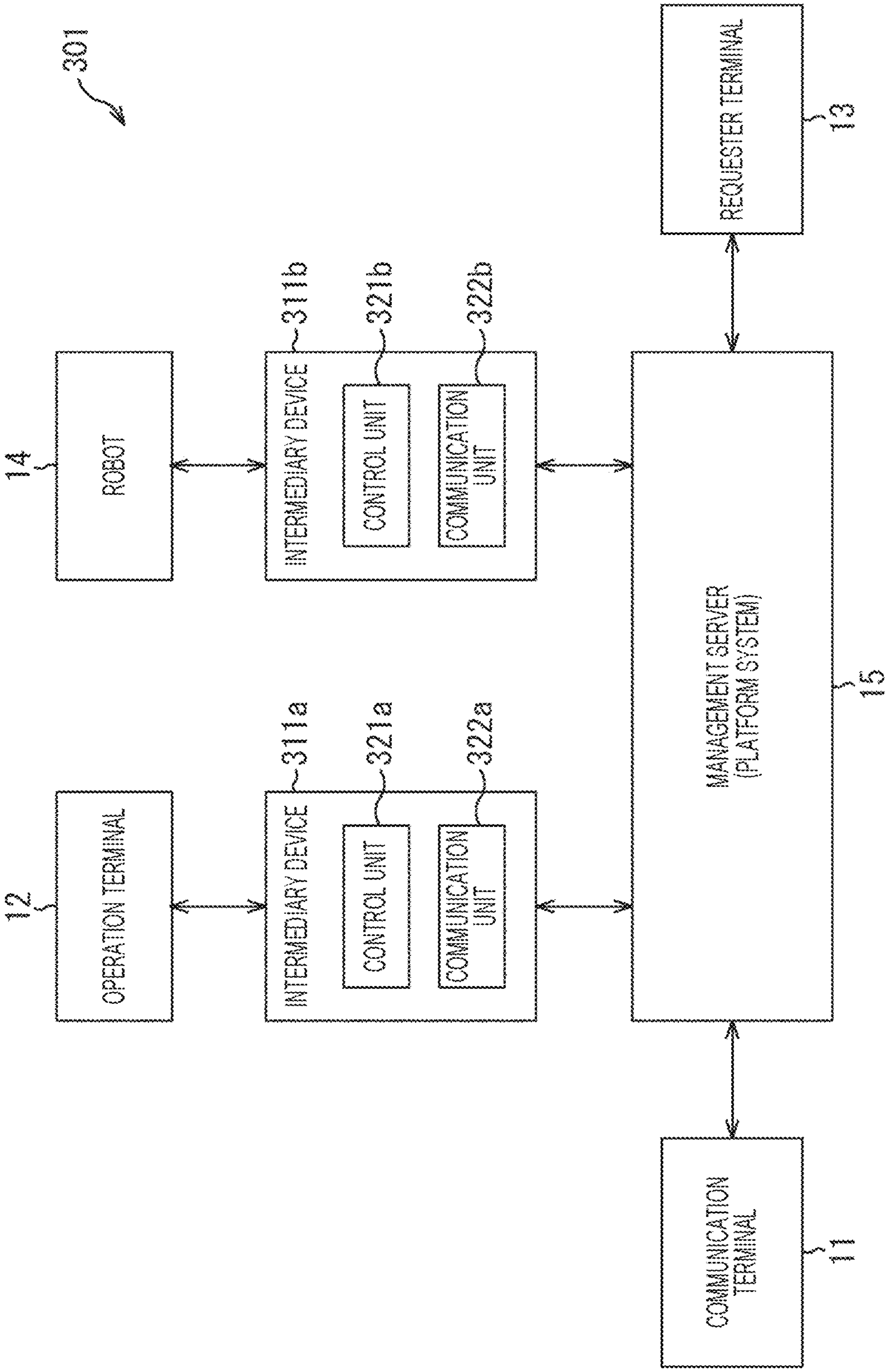
FIG. 35 is a block diagram illustrating a configuration example of functions of the second embodiment of the information processing system to which the present technology is applied.

FIG. 35 illustrates a configuration example of functions of an information processing system 301 according to the second embodiment of the present technology. Note that, in the figure, portions corresponding to those of the information processing system 1 in FIG. 3 are denoted by the same reference numerals, and the description thereof will be appropriately omitted.

The information processing system 301 is different from the information processing system 1 in that an intermediary device 311*a* and an intermediary device 311*b* are added.

The intermediary device 311*a* is disposed between the operation terminal 12 and the network 21 (not illustrated), and intermediates communication between the operation terminal 12 and the management server 15. In other words, the operation terminal 12 communicates with the management server 15 via the intermediary device 311*a*. Furthermore, for example, the intermediary device 311*a* serves as a substitute for a part of the processing of the operation terminal 12. The intermediary device 311*a* includes a control unit 321*a* and a communication unit 322*a*.

The control unit 321*a* includes, for example, a processor such as a CPU. The control unit 321*a* executes control of the intermediary device 311*a*, various types of information processing, and the like.

The communication unit 322*a* communicates with the operation terminal 12 and the management server 15.

The intermediary device 311*b* is disposed between the robot 14 and the network 21 (not illustrated), and intermediates communication between the robot 14 and the management server 15. In other words, the robot 14 communicates with the management server 15 via the intermediary device 311*b*. Furthermore, for example, the intermediary device 311*b* serves as a substitute for part of the processing of the robot 14. Similarly to the intermediary device 311*a*, the intermediary device 311*b* includes a control unit 321*b* and a communication unit 322*b*.

For example, the intermediary device 311*b* executes compression processing or feature amount extraction processing on image data generated by the detection unit 162 of the robot 14, and then transmits the image data to the management server 15. As a result, a communication amount between the robot 14 and the management server 15 is reduced.

For example, the intermediary device 311*a* and the intermediary device 311*b* perform security authentication with the management server 15. As a result, the operation terminal 12 and the robot 14 do not need to be directly connected to the platform system on the management server 15, and security of the operation terminal 12, the robot 14, and the management server 15 is easily guaranteed.

4. Third Embodiment

Next, with reference to FIG. 36, the third embodiment of the present technology will be described.

Configuration Example of Information Processing System 351

Figure 36:
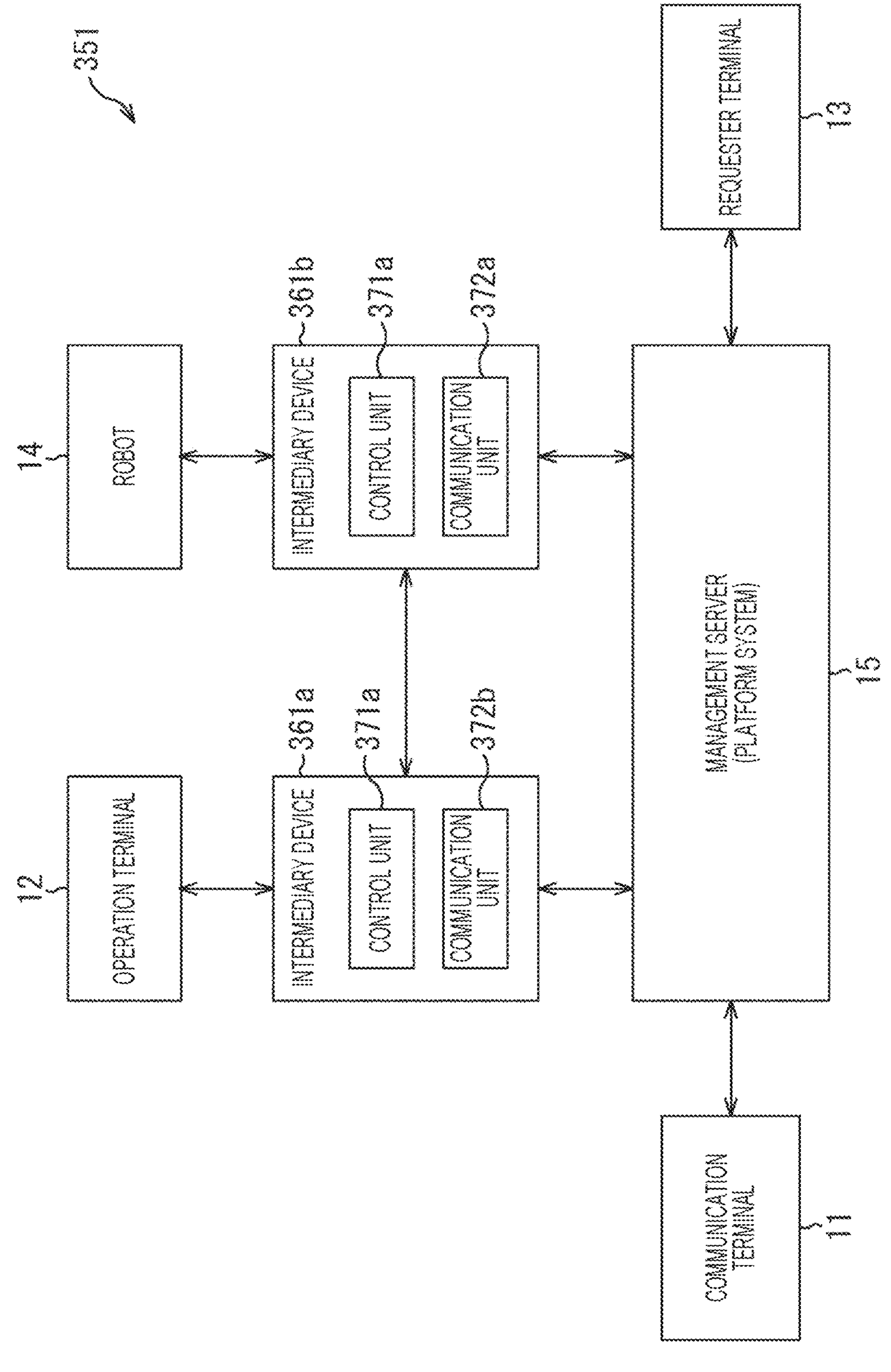
FIG. 36 is a block diagram illustrating a configuration example of functions of the second embodiment of the information processing system to which the present technology is applied.

FIG. 36 illustrates a configuration example of functions of an information processing system 351 according to the third embodiment of the present technology. Note that, in the figure, portions corresponding to those of the information processing system 1 in FIG. 3 and the information processing system 301 in FIG. 35 are denoted by the same reference numerals, and description thereof will be omitted as appropriate.

The information processing system 351 is different from the information processing system 301 in including an intermediary device 361*a* and an intermediary device 361*b* instead of the intermediary device 311*a* and the intermediary device 311*b*.

The intermediary device 361*a* and the intermediary device 361*b* have functions substantially similar to the intermediary device 311*a* and the intermediary device 311*b* in FIG. 35. However, the intermediary device 361*a* and the intermediary device 361*b* are different from the intermediary device 311*a* and the intermediary device 311*b* in that the intermediary device 361*a* and the intermediary device 361*b* can communicate with each other without the management server 15.

For example, after the management server 15 performs matching between the intermediary device 361*a* and the intermediary device 361*b*, the intermediary device 361*a* and the intermediary device 361*b* perform direct communication without via the management server 15. As a result, a delay in communication between the operation terminal 12 and the robot 14 is reduced.

In this case, it is desirable that the intermediary device 361*a* and the intermediary device 361*b* are connected to the management server 15 via a global network (for example, the Internet), and the intermediary device 361*a* and the intermediary device 361*b* are connected via a closed network. As a result, high-speed or low-delay communication are enabled.

For example, the intermediary device 361*a* of Hospital A and the intermediary device 361*b* of Hospital B communicate with each other via a platform system being executed on the management server 15 that is a cloud server, and are matched. Thereafter, the intermediary device 361*a* and the intermediary device 361*b* perform communication via a closed area network connecting the hospitals. Furthermore, the intermediary device 361*a* and the intermediary device 361*b* are controlled by the management server 15 to set which intermediary device to communicate with, and do not accept communication other than the intermediary device set by the management server 15.

5. Application Example

Next, with reference to FIGS. 37 to 41, application examples of the present technology will be described.

Example of Application to Remote Operation of Surgical Robot

The present technology can be applied to, for example, a case where remote operation of a surgical robot is performed.

Here, with reference to FIGS. 37 and 38, a description is given to a configuration example of a table for managing a skill necessary for remote operation of the surgical robot and a skill possessed by each operator.

FIG. 37 illustrates a configuration example of a skill table indicating a skill necessary for remote operation of the surgical robot. The skill table includes items of a skill code, a clinical department, a procedure, and a skill.

The skill code is a code for identifying each skill.

The clinical department indicates a clinical department in which the target skill is used in a hospital.

The procedure is a procedure executed by the surgical robot, and indicates a type of a procedure in which the target skill is used.

The skill indicates a skill used in the target procedure. Note that, in a case where a plurality of skills is used in the same procedure, different skill codes are assigned to the individual skills.

FIG. 38 illustrates a configuration example of a possessed-skill table indicating a skill possessed by each operator. The possessed-skill table is generated for each person who has the skill. The possessed-skill table includes a skill code, the presence or absence of the skill, and a skill level.

The skill code corresponds to the skill code in the skill table of FIG. 37.

The presence or absence of the skill indicates whether or not the operator has the target skill.

The skill level indicates a level of the operator for the target skill. The skill level is classified into, for example, four levels of A to D, and is in the order of A, B, C, and D from the highest level. Note that, in a case where the operator does not have the target skill, the skill level is set to D.

Note that, for example, the skill level of the operator for the surgical robot is evaluated on the basis of a movement of a line-of-sight of the operator on a monitor displaying a surgical site. For example, a high skill level is set for an operator who can smoothly and quickly move the line-of-sight to an area to be gazed or an operator who can continue work almost without moving the line-of-sight from the area to be gazed.

For example, the skill level of the operator for the surgical robot is evaluated on the basis of a movement of a hand of the operator for an operation terminal. For example, a high skill level is set for an operator with an appropriate and quick hand movement or an operator with a less unnecessary hand movement.

For example, the skill level of the operator for the surgical robot is evaluated on the basis of a movement of an instrument or a camera of the surgical robot by remote operation of the operator. For example, a high skill level is set for an operator who can quickly move the instrument to an appropriate position or an operator who can quickly move an imaging range of the camera to an appropriate position.

Note that, in a case where the operator performs remote operation of the surgical robot, in the operation competency monitoring processing, for example, operator image data (live video) obtained by imaging the operator is used as authentication information of the operator. As qualification information of the operator, for example, a copy image of a doctor's license of the operator or the like is used.

Furthermore, in the work monitoring processing, for example, the skill level of the operator is monitored on the basis of a procedure of the operator and the presence or absence of a surgical error of the robot 14.

Moreover, as a condition related to a communication status of the operation environment, for example, low latency is required.

Example of Application to Remote Operation of Industrial Robot

The present technology can be applied to, for example, a case where remote operation of an industrial robot is performed.

FIG. 39 illustrates an example of a skill table in a case where the present technology is applied to an industrial robot. The skill table includes a skill code, a process, and a skill.

The skill code is a code for identifying each skill.

The process indicates a process in which the target skill is used. For example, in a case where remote operation of an industrial robot in a vehicle factory is performed, processes such as vehicle body coating and vehicle body assembly are assumed.

The skill indicates a skill used in the target process. Note that, in a case where a plurality of skills is used in the same process, different skill codes are assigned to the individual skills.

Note that, also in a case where the industrial robot is remotely operated, a possessed-skill table having a configuration similar to the possessed-skill table of FIG. 38 described above is used.

Furthermore, the skill level of each skill of each operator is evaluated on the basis of at least one of, for example, a skill certification test, a total of remote operation time in the past of each operator in each process, the number of years of experience of each operator in each process, or the like.

Note that, in a case where the operator performs remote operation of the industrial robot, in the operation competency monitoring processing, for example, operator image data (live video) obtained by imaging the operator is used as authentication information of the operator. As qualification information of the operator, for example, a certificate of a qualification necessary for the operation of the industrial robot, a copy image of an IC card, or the like is used.

Furthermore, in the work monitoring processing, for example, the skill level of the operator is monitored on the basis of a degree of awakening and a degree of concentration of the operator and accuracy of work by the robot 14.

Moreover, as a condition related to a communication status of the operation environment, low latency (delay time) is required.

Example of Application to Remote Operation of Vehicle

The present technology can also be applied to, for example, a case where remote operation (remote driving) of a vehicle is performed.

A type of the vehicle as a remote operation target is not particularly limited, but for example, a delivery vehicle, a route bus, a taxi, a vehicle for transportation or work in a factory or a warehouse, or the like is assumed.

FIG. 40 illustrates an example of a skill table in a case where the present technology is applied to remote operation of a vehicle. This skill table includes a skill code, a vehicle rank, and a skill.

The skill code is a code for identifying each skill.

The vehicle rank code is a code for identifying a vehicle rank of the operation target vehicle. The vehicle rank is classified into, for example, a small-sized special motor vehicle, a standard motor vehicle, a mid-sized motor vehicle, a large motor vehicle, a large-sized special motor vehicle, and the like. Note that a classification method of the vehicle rank is not limited thereto.

The skill indicates a skill used in remote operation of a vehicle of the target vehicle rank. Note that, in a case where a plurality of skills is used in remote operation of a vehicle of the same vehicle rank, different skill codes are assigned for the individual skills.

Note that, also in a case where the vehicle is remotely operated, a possessed-skill table having a configuration similar to the possessed-skill table of FIG. 38 described above is used.

FIG. 41 illustrates an example of a reward table indicating a reward rank of each operator. The reward table includes items of an operator code, a skill level, and a reward rank.

The operator code is a code for identifying each operator.

The skill level indicates a skill level of each operator for each vehicle rank. This skill level is evaluated manually or automatically, for example, on the basis of a remote operation (driving operation) history in the past of each operator for each vehicle rank. For example, as the number of times of driving operation of the vehicle rank in the past is higher or driving operation time of the vehicle rank in the past is longer, the skill level is set higher.

The reward rank indicates a reward rank of each operator. The reward rank is classified into, for example, four stages of A to D, and is in the order of A, B, C, and D from the highest reward rank. For example, a reward to be given to the operator is set on the basis of the reward rank.

Note that, for example, the present technology can also be applied to a case of performing remote operation of a flying car such as electric vertical take-off and landing (eVOLT). In this case, for example, a record corresponding to a flight skill is registered in the skill table.

Note that, in a case where the operator performs remote operation of the industrial robot, in the operation competency monitoring processing, for example, operator image data (live video) obtained by imaging the operator is used as authentication information of the operator. As the qualification information of the operator, for example, a copy image or the like of a driver's license of the operator is used.

Furthermore, in the work monitoring processing, for example, the skill level of the operator is monitored on the basis of a degree of awakening and a degree of concentration of the operator and a driving safety level of the robot 14 (vehicle).

Moreover, as a condition related to a communication status of the operation environment, low latency is required.

Example of Application to Human Resource Arrangement in Company

The present technology can be applied to, for example, a case where personnel are assigned among a plurality of factories located in distant places.

For example, in a case where one company has a plurality of factories in distant places and produces different products in the individual factories, there is a case where a difference occurs in an operation rate of each factory due to sales of the products or the like. As a result, for example, the number of workers may be insufficient in a factory with a high operation rate, and the number of workers may be excess in a factory with a low operation rate.

On the other hand, by applying the present technology, when a worker in the factory with a low operation rate performs work in the factory with a high operation rate by remote operation, it is possible to optimize the number of workers in each factory without increasing or decreasing the number, rearranging the workers, and the like in the individual factories.

6. Modification

Hereinafter, modifications of the above-described embodiments of the present technology will be described.

Modification Regarding Matching Processing

For example, the evaluation unit 214 of the management server 15 may measure a skill level of each operator by causing the operation terminal 12 of each operator to execute a simulator or a game simulating actual work. Then, the matching unit 211 may select an operator to which work is to be requested on the basis of the measured skill level.

For example, the matching unit 211 of the management server 15 may cause a selected operator to execute the above-described simulator or game, and the matching unit 211 may actually request the operator to perform work in a case where it is determined that the skill level has reached a predetermined standard as a result.

For example, the matching unit 211 may select an operator on the basis of a desired condition of the operator, in addition to the selection condition.

As the desired condition of the operator, for example, a desired type of work, reward, reward system, date and time when the work can be executed, and the like are assumed.

For example, in a case where the operator desires a predetermined type of work, the matching unit 211 may preferentially assign the desired type of work to the operator.

For example, in a case where the operator desires more reward, the matching unit 211 may preferentially assign work with a higher reward to the operator. For example, as illustrated in FIG. 42, the matching unit 211 may assign work with the highest reward to the operator for every time zone so as to maximize the reward. In the case of this example, Work A is assigned in the time zone of 9:00 to 12:00, Work B is assigned in the time zone of 13:00 to 15:00, and Work C is assigned in the time zone of 16:00 to 19:00.

For example, the matching unit 211 may preferentially assign, to an operator, work of a reward system desired by the operator. For example, the reward system is defined by payment forms such as daily payment, weekly payment, and monthly payment, types of rewards such as cash, virtual passage, and points, and the like.

Modification Regarding Cooperative Work

The present technology can also be applied to, for example, a case where a plurality of operators performs work in cooperation.

For example, the present technology can also be applied to a case where different operators execute remote operation of the robot 14 for each work process to execute one work. In this case, the matching unit 211 of the management server 15 executes the above-described matching processing for each work process, and selects an operator suitable for each work process.

For example, the present technology can also be applied to a case where a plurality of operators simultaneously remotely operates one robot 14 or a plurality of robots 14 to execute one work in cooperation. The case where a plurality of operators simultaneously remotely operates one robot 14 is, for example, a case where the robot 14 includes a plurality of movable units 164 and different operators perform remote operation for the movable units 164 each, and the like. In this case, the matching unit 211 of the management server 15 executes the above-described matching processing, and selects a plurality of operators for one work.

Note that, in a case where a plurality of operators performs work in cooperation, for example, when a work status of a certain operator is deteriorated, for example, when a work delay or a decrease in accuracy occurs, the intermediary unit 212 of the management server 15 may notify the communication terminal 11 or the operation terminal 12 of another operator of the deterioration of the work status of the operator. As a result, for example, another operator can assist the operator or urge the operator to improve the work. Furthermore, for example, in a case where a plurality of operators performs work in order, an operator of a downstream process can grasp a work delay of an upstream process in advance and take appropriate measures.

Modification Regarding Handover Processing

For example, in a case where intermediation of remote operation is stopped at some midpoint of work by the processing in step S218 in FIG. 11, the matching unit 211 of the management server 15 may determine that replacement of the operator is necessary and execute handover processing of the operator.

For example, the matching unit 211 executes matching processing again and selects a new operator. Alternatively, the matching unit 211 selects preliminary candidates in advance. The intermediary unit 212 executes intermediation processing of remote operation between the operation terminal 12 of the new operator and the robot 14 as the operation target. As a result, it is possible to appropriately select a substitute operator and continue the work.

Furthermore, for example, work may be handed over to a preliminary operator selected in advance during break time of an operator. Furthermore, in a case where an operator ends operation due to an end of working hours or the like, work may be handed over to a preliminary operator selected in advance. As a result, the robot 14 is prevented from being left in an unoperated state, and the robot 14 can be efficiently used.

Note that, in a case where the handover processing is necessary, for example, the intermediary unit 212 of the management server 15 may give a notification to the communication terminal 11 or the operation terminal 12 of a management operator (for example, an operator such as a management worker of a factory) who manages a plurality of operators. As a result, for example, the management operator can temporarily perform the remote operation of the robot 14 as substitution until handover to the new operator is performed or the operator returns from a break or the like.

Furthermore, in a case where the handover processing is necessary, for example, the intermediary unit 212 of the management server 15 may notify the requester terminal 13 of the requester that the handover of the operator is necessary.

Modification Related to Sharing of Processing in Information Processing System 1

In the information processing system 1, sharing of individual processing can be changed as necessary.

For example, the operation terminal 12 may execute a part of the processing of the communication terminal 11 described above. For example, the operation terminal 12 may also serve as the communication terminal 11 to execute all the processing of the communication terminal 11.

For example, the robot 14 may execute a part of the processing of the requester terminal 13 described above. For example, the robot 14 may also serve as the requester terminal 13 to execute all the processing of the requester terminal 13.

For example, the operation terminal 12 may execute a part of the processing of the management server 15 described above.

For example, the operation terminal 12 may execute authentication processing for an operator and notify the management server 15 of an authentication result. Then, the monitoring unit 213 or the like of the management server 15 may determine whether or not authentication of the operator has succeeded, by using a result of the authentication processing of the operation terminal 12.

For example, the operation terminal 12 may monitor a state of an operator and notify the management server 15 of the state of the operator. For example, the operation terminal 12 may monitor an operation environment and a state of the operation environment, and notify the management server 15 of a result of the monitoring processing. Then, the monitoring unit 213 of the management server 15 may monitor work by using the result of the monitoring processing by the operation terminal 12.

Note that the monitoring processing of those may be executed, for example, by another device provided around the operation terminal 12, or may be executed in cooperation by the operation terminal 12 and another device.

For example, the robot 14 may execute a part of the processing of the management server 15 described above. For example, the robot 14 may execute a part of the processing of the monitoring unit 213 of the management server 15. Specifically, for example, the robot 14 may monitor a state, an operation, and a communication status of the robot 14, and notify the management server 15 of a result of the monitoring processing. Then, the monitoring unit 213 of the management server 15 may monitor work by using a result of the monitoring processing by the robot 14.

Note that the monitoring processing of those may be executed, for example, by another device provided around the robot 14, or may be executed in cooperation by the robot 14 and another device.

For example, a device around the robot 14 may capture work image data.

Other Modifications

For example, in step S203 of FIG. 10, the intermediary unit 212 may acquire information regarding a communication status between the operation terminal 12 and the management server 15 from the operation terminal 12, and determine whether or not to permit the remote operation further on the basis of the communication status. For example, in a case where the communication environment does not satisfy a required condition, the intermediary unit 212 may determine not to permit the remote operation.

7. Others

Configuration Example of Computer

The above-described series of processing can be executed by hardware or software. In a case where the series of pieces of processing is executed by software, a program constituting the software is installed in a computer. Here, examples of the computer include a computer incorporated in dedicated hardware, and a general-purpose personal computer capable of executing various functions by installing various programs, for example.

Figure 43:
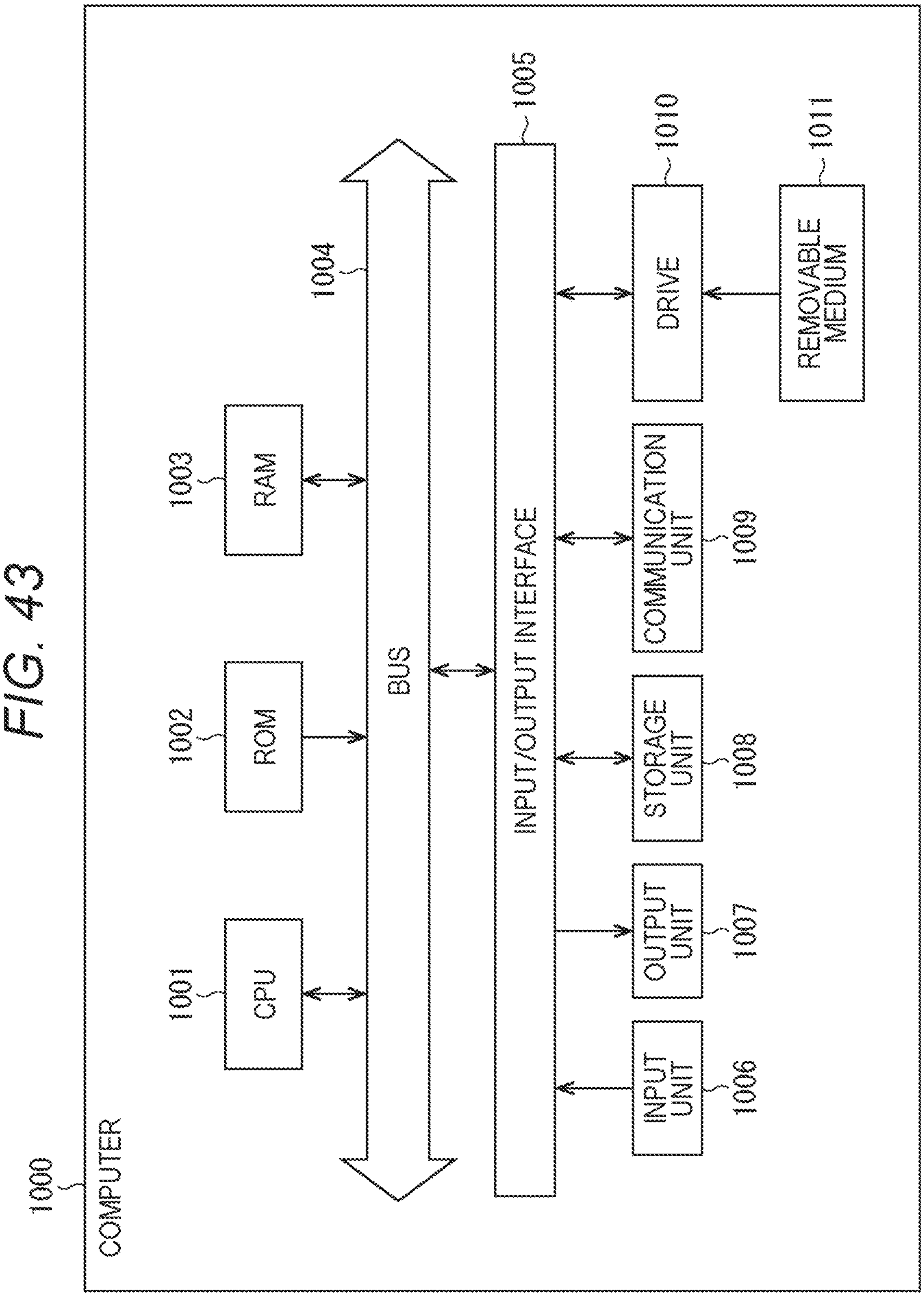
FIG. 43 is a block diagram illustrating a configuration example of a computer.

FIG. 43 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

An input/output interface 1005 is further connected to the bus 1004. An input unit 1006, an output unit 1007, a storage unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The storage unit 1008 includes a hard disk, a non-volatile memory, and the like. The communication unit 1009 includes a network interface or the like. The drive 1010 drives a removable medium 1011 such as a magnetic disk, an optical disc, a magneto-optical disk, or a semiconductor memory.

In the computer 1000 configured as described above, the series of processing described above is performed, for example, by the CPU 1001 loading a program stored in the storage unit 1008 into the RAM 1003 via the input/output interface 1005 and the bus 1004, and executing.

The program executed by the computer 1000 (CPU 1001) can be provided by being recorded in the removable medium 1011 as a package medium or the like, for example. Furthermore, the program can be provided via a wired or wireless transmission medium such as a local area network, the Internet, or digital satellite broadcasting.

In the computer 1000, by attaching the removable medium 1011 to the drive 1010, the program can be installed in the storage unit 1008 via the input/output interface 1005. Furthermore, the program can be received by the communication unit 1009 via a wired or wireless transmission medium, and installed in the storage unit 1008. In addition, the program can be installed in the ROM 1002 or the storage unit 1008 in advance.

Note that, the program to be executed by the computer may be a program that is processed in time series in the order described in the present specification, or may be a program that is processed in parallel or at required timings such as when a call is made.

Furthermore, in the present specification, a system is intended to mean assembly of a plurality of components (devices, modules (parts), and the like) and it does not matter whether or not all the components are in the same casing. Therefore, a plurality of devices housed in separate housings and coupled via a network and one device in which a plurality of modules is housed in one housing are both systems.

Moreover, the embodiments of the present technology are not limited to the above-described embodiments, and various modifications can be made without departing from the gist of the present technology.

For example, the present technology may employ a configuration of cloud computing in which one function is shared and processed in cooperation by a plurality of devices via a network.

Furthermore, each step described in the flowchart described above may be executed by one device, or may be executed in a shared manner by a plurality of devices. Moreover, in a case where a plurality of pieces of processing is included in one step, the plurality of pieces of processing included in the one step can be executed by one device or shared to be executed by a plurality of devices.

Example of Configuration Combinations

The present technology can also be configured as follows.

(1)

An information processing system for executing matching related to remote operation by a robot that can be remotely operated and an operation terminal that can operate the robot via a network, the information processing system including:

a matching unit configured to select the operator who performs remote operation of the robot, on the basis of a selection condition including an operation environment necessary for remotely operating the robot to execute work and on the basis of an operation environment of the operator each.

(2)

The information processing system according to (1) above, in which the operation environment includes at least one of a type, a specification, or a communication status of the operation terminal.

(3)

The information processing system according to (2) above, in which a communication status of the operation terminal includes at least one of a communication speed, allowable delay time, a communication capacity, a communication band, or an allowable packet loss rate.

(4)

The information processing system according to any one of (1) to (3) above, in which the matching unit sets the operation environment that is necessary, on the basis of at least one of a type of the robot, a specification of the robot, or a content of the work.

(5)

The information processing system according to any one of (1) to (4) above, in which the selection condition further includes ability of the operator necessary for remote operation of the robot, and the matching unit selects the operator who performs remote operation of the robot further on the basis of ability of the operator each.

(6)

The information processing system according to (5) above, in which ability of the operator includes at least one of a qualification, a skill, or a skill level possessed by the operator.

(7)

The information processing system according to any one of (1) to (6) above, in which the matching unit selects the operator on the basis of the selection condition and a desired condition of the operator.

(8)

The information processing system according to any one of (1) to (7) above, in which the matching unit calculates a matching degree between the operator each and the selection condition, and selects the operator on the basis of the matching degree.

(9)

The information processing system according to any one of (1) to (8) above, in which the matching unit selects the operator further on the basis of a distance between the operation terminal each and the robot.

(10)

The information processing system according to any one of (1) to (9) above, in which in a case where replacement of the operator who has been selected is necessary, the matching unit selects the operator who is new on the basis of the selection condition.

(11)

The information processing system according to (10) above, further including:

a monitoring unit configured to monitor at least one of operation competency of the operator or a status of the work, in which the matching unit determines whether or not replacement of the operator is necessary, on the basis of a monitoring result obtained by the monitoring unit.

(12)

The information processing system according to (11) above, in which the monitoring unit determines whether or not the operator has the operation competency on the basis of at least one of a result of authentication processing of the operator or a monitoring result of a state of the operator, and the monitoring unit monitors, as a status of the work, at least one of a skill level of the operator, whether or not the operator has performed a prohibited act, or an operation environment of the operator.

(13)

The information processing system according to any one of (1) to (12) above, in which the matching unit controls presentation of the operator that has been selected, to a requester of the work.

(14)

The information processing system according to any one of (1) to (13) above, in which the matching unit extracts a plurality of candidates of the operator on the basis of the selection condition, and controls presentation of the extracted candidates of the operator to a requester of the work.

(15)

The information processing system according to any one of (1) to (14) above, in which the matching unit extracts a work request that can be handled by the operator on the basis of the selection condition.

(16)

The information processing system according to (15) above, in which the matching unit sets the selection condition on the basis of information received from a requester terminal, and sets the operation environment on the basis of information received from a communication terminal and an operation terminal.

(17)

The information processing system according to any one of (1) to (16) above, further including:

an intermediary unit configured to intermediate remote operation between the operation terminal and the robot.

(18)

The information processing system according to (17) above, in which the intermediary unit connects the operation terminal and the robot via the network, and transmits an operation signal from the operation terminal to the robot.

(19)

An information processing method including, by an information processing system for executing matching related to remote operation by a robot that can be remotely operated and an operation terminal that can operate the robot via a network:

selecting the operator who performs remote operation of the robot, on the basis of a selection condition including an operation environment necessary for remotely operating the robot to execute work and on the basis of an operation environment of the operator each.

(20)

A program for causing a computer to execute processing, the computer being configured to execute matching related to remote operation by a robot that can be remotely operated and an operation terminal that can operate the robot via a network, the processing including:

selecting the operator who performs remote operation of the robot, on the basis of a selection condition including an operation environment necessary for remotely operating the robot to execute work and on the basis of an operation environment of the operator each.

Note that the effects described herein are merely examples and are not limited, and other effects may be provided.

REFERENCE SIGNS LIST

1 Information processing system
11-1 to 11-*m* Communication terminal
12-1 to 12-*n* Operation terminal
13-1 to 13-*p* Requester terminal
14-1 to 14-*q* Robot
15 Management server
21 Network
103 Control unit
122 Detection unit
123 Control unit

124 Output unit
143 Control unit
162 Detection unit
163 Control unit
164 Movable unit
202 Control unit
211 Matching unit
212 Intermediary unit
213 Monitoring unit
214 Evaluation unit
215 Learning unit
216 Information processing unit
221 Operator monitoring unit
222 Work monitoring unit
301 Information processing system
311*a*, 311*b* Intermediary device
351 Information processing system
361*a*, 361*b* Intermediary device

The invention claimed is:

1. An information processing system, comprising:
processing circuitry configured to
select an operator who performs remote operation of a robot that can be remotely operated via a network using an operation terminal that can operate the robot via the network to perform work, on a basis of
a selection condition including an operation environment that is necessary for remotely operating the robot to execute the work, the operation environment including at least one of a type of the operation terminal or a specification of the operation terminal, and
an operation environment of the operator;
intermediate the remote operation of the robot by the operator to execute the work, including
receiving an operation signal from the operation terminal, and
transmitting the operation signal to the robot, wherein the robot performs the work based upon the operation signal;
monitor at least one of a physical state or a psychological state of the operator during the remote operation of the robot by the operator to execute the work; and
intervene in the remote operation of the robot by the operator to execute the work based on the at least one of the physical state or the psychological state of the operator during the remote operation of the robot by the operator to execute the work.

2. The information processing system according to claim 1, wherein the operation environment includes a communication status of the operation terminal.

3. The information processing system according to claim 2, wherein the communication status of the operation terminal includes at least one of a communication speed, an allowable delay time, a communication capacity, a communication band, or an allowable packet loss rate.

4. The information processing system according to claim 1, wherein the processing circuitry is configured to set the operation environment that is necessary on a basis of at least one of a type of the robot, a specification of the robot, or a content of the work.

5. The information processing system according to claim 1, wherein
the selection condition further includes an ability of the operator necessary for the remote operation of the robot, and
the processing circuitry is configured to select the operator who performs the remote operation of the robot further on a basis of ability of the operator.

6. The information processing system according to claim 5, wherein the ability of the operator includes at least one of a qualification possessed by the operator, a skill possessed by the operator, or a skill level possessed by the operator.

7. The information processing system according to claim 1, wherein the processing circuitry is configured to select the operator on a basis of the selection condition and a desired condition of the operator.

8. The information processing system according to claim 1, wherein the processing circuitry is configured to:
calculate a matching degree between the operator and the selection condition, and
select the operator on a basis of the matching degree.

9. The information processing system according to claim 1, wherein the processing circuitry is configured to select the operator further on a basis of a distance between the operation terminal and the robot.

10. The information processing system according to claim 1, wherein the processing circuitry is configured to select a new operator on a basis of the selection condition in a case where replacement of the operator who has been selected is necessary.

11. The information processing system according to claim 10, wherein the processing circuitry is configured to:
monitor at least one of an operation competency of the operator or a status of the work, and
determine whether or not replacement of the operator who has been selected is necessary on a basis of a monitoring result obtained by the monitoring.

12. The information processing system according to claim 11, wherein the processing circuitry is configured to:
determine whether or not the operator has the operation competency on a basis of at least one of a result of authentication processing of the operator or a monitoring result of the at least one of the physical state or the psychological state of the operator, and
monitor, as the status of the work, at least one of a skill level of the operator, whether or not the operator has performed a prohibited act, or the operation environment of the operator.

13. The information processing system according to claim 1, wherein the processing circuitry is configured to control presentation of the operator that has been selected to a requester of the work.

14. The information processing system according to claim 1, wherein the processing circuitry is configured to:
extract a plurality of candidates of the operator on a basis of the selection condition, and
control presentation of the extracted candidates of the operator to a requester of the work.

15. The information processing system according to claim 1, wherein the processing circuitry is configured to extract a work request that can be handled by the operator on a basis of the selection condition.

16. The information processing system according to claim 1, wherein the processing circuitry is configured to:
set the selection condition on a basis of information received from a requester terminal, and
set the operation environment of the operator on a basis of information received from a communication terminal and the operation terminal.

17. An information processing method, comprising:
selecting, via processing circuitry, an operator who performs remote operation of a robot that can be remotely operated via a network using an operation terminal that can operate the robot via the network to perform work, on a basis of a selection condition including an operation environment that is necessary for remotely operating the robot to execute the work, the operation environment including at least one of a type of the operation terminal or a specification of the operation terminal, and an operation environment of the operator;

intermediating, via the processing circuitry, the remote operation of the robot by the operator to execute the work, including receiving an operation signal from the operation terminal, and transmitting the operation signal to the robot, wherein the robot performs the work based upon the operation signal;

monitoring at least one of a physical state or a psychological state of the operator during the remote operation of the robot by the operator to execute the work; and intervening in the remote operation of the robot by the operator to execute the work based on the at least one of the physical state or the psychological state of the operator during the remote operation of the robot by the operator to execute the work.

18. A non-transitory computer readable medium storing a program for causing a computer to execute processing, the processing comprising:

selecting an operator who performs remote operation of a robot that can be remotely operated via a network using an operation terminal that can operate the robot via the network to perform work, on a basis of a selection condition including an operation environment that is necessary for remotely operating the robot to execute the work, the operation environment including at least one of a type of the operation terminal or a specification of the operation terminal, and an operation environment of the operator;

intermediating the remote operation of the robot by the operator to execute the work, including receiving an operation signal from the operation terminal, and transmitting the operation signal to the robot, wherein the robot performs the work based upon the operation signal;

monitoring at least one of a physical state or a psychological state of the operator during the remote operation of the robot by the operator to execute the work; and intervening in the remote operation of the robot by the operator to execute the work based on the at least one of the physical state or the psychological state of the operator during the remote operation of the robot by the operator to execute the work.

* * * * *